(12) United States Patent
Shaughnessy

(10) Patent No.: US 11,036,703 B1
(45) Date of Patent: Jun. 15, 2021

(54) METHOD AND SYSTEM FOR LEXICAL DATA PROCESSING

(71) Applicant: Thomas Graham Shaughnessy, Minnetonka, MN (US)

(72) Inventor: Thomas Graham Shaughnessy, Minnetonka, MN (US)

(*) Notice: Subject to any disclaimer, the term of this patent is extended or adjusted under 35 U.S.C. 154(b) by 11 days.

(21) Appl. No.: 16/057,462

(22) Filed: Aug. 7, 2018

Related U.S. Application Data

(62) Division of application No. 14/830,995, filed on Aug. 20, 2015, now abandoned.

(51) Int. Cl.
*G06F 16/22* (2019.01)
*G06F 3/0484* (2013.01)
*G06F 3/0481* (2013.01)

(52) U.S. Cl.
CPC ...... *G06F 16/2228* (2019.01); *G06F 3/04817* (2013.01); *G06F 3/04842* (2013.01)

(58) Field of Classification Search
CPC ............ G06F 16/2228; G06F 3/04817; G06F 3/04842
See application file for complete search history.

(56) References Cited

U.S. PATENT DOCUMENTS

| | | | |
|---|---|---|---|
| 5,390,281 A | 2/1995 | Luciw et al. | |
| 8,295,590 B2* | 10/2012 | Filimonova | G06K 9/00449 382/155 |
| 2002/0100016 A1* | 7/2002 | Van De Vanter | G06F 8/33 717/112 |
| 2003/0018692 A1 | 1/2003 | Ebling et al. | |
| 2003/0140035 A1* | 7/2003 | Burrows | G06F 16/81 |
| 2006/0007189 A1* | 1/2006 | Gaines, III | G06K 9/222 345/179 |
| 2006/0235690 A1 | 10/2006 | Tomasic et al. | |
| 2009/0222799 A1* | 9/2009 | Stewart | G06F 8/427 717/143 |

(Continued)

OTHER PUBLICATIONS

Introduction to Microsoft Access 2007, Office of Information Technology Montclair State University, Nov. 27, 2007, https://www.montclair.edu/media/montclairedu/oit/documentation/whatsnewinoffice20072003/Access_2007,_Introduction_11-27-07.pdf, accessed Jun. 26, 2020 (Year: 2007).*

*Primary Examiner* — Richard L Bowen
(74) *Attorney, Agent, or Firm* — Richard John Bartz

(57) ABSTRACT

There is disclosed a method and system to operate a software application entirely based on a unitary lexicon data structure (LDS) comprising a plurality of data field definition blocks stored in memory, with one LDS record for each lexicon term. The LDS is used to develop computerized lexicons and deploy them for use to operate a lexical application with all data displayed for viewing and input by the user on a single screen to which all desired data items come, rather than the user navigating to fields statically located on a multitude of screens. Each LDS record contains a whole set of data in memory, with data duplicated across LDS records in order to bypass the need for the application to interoperate with a database to input and display related data. There is a graphical icon also of a unitary format into which all data is input and displayed. Input data items are related to one another in the icon, regardless of whether a relational database is configured to interoperate with the system.

6 Claims, 96 Drawing Sheets

(56) References Cited

U.S. PATENT DOCUMENTS

| | | |
|---|---|---|
| 2012/0078902 A1* | 3/2012 | Duboue ................ G06F 16/334 |
| | | 707/736 |
| 2012/0185425 A1 | 7/2012 | Reeves et al. |
| 2013/0035931 A1* | 2/2013 | Ferrucci ............ G06F 16/90332 |
| | | 704/9 |
| 2013/0311438 A1* | 11/2013 | Marquardt .......... G06F 16/2453 |
| | | 707/706 |
| 2014/0258818 A1 | 9/2014 | Schwartz |
| 2014/0337071 A1 | 11/2014 | Stiffler et al. |
| 2016/0062973 A1 | 3/2016 | Haines et al. |

* cited by examiner

This is the Base Lexicon Data Structure (BLDS) field format to display an ALDS payload in list format (340); an ALDS records for a lexicon term is created from a copy of the BLDS for payload display in list format This is an ALDS, it inherits the field format of the BLDS from which it was created (362); its start is identified by its ALDS Start Name Field (361), its end by its ALDS End Char Field (363)

360

This is an ILDS, it inherits the field format of the ALDS that was input to make it (372); its start is identified by its ILDS Start Name Field (371), its end by its ILDS End Char Field (373)

370

ALDS records are displayed for potential input; ILDS records are created upon input, they repeat the same data in the subject and actor sectors (401, 402); whole records at the input answer level enable display of related records directly from memory

400

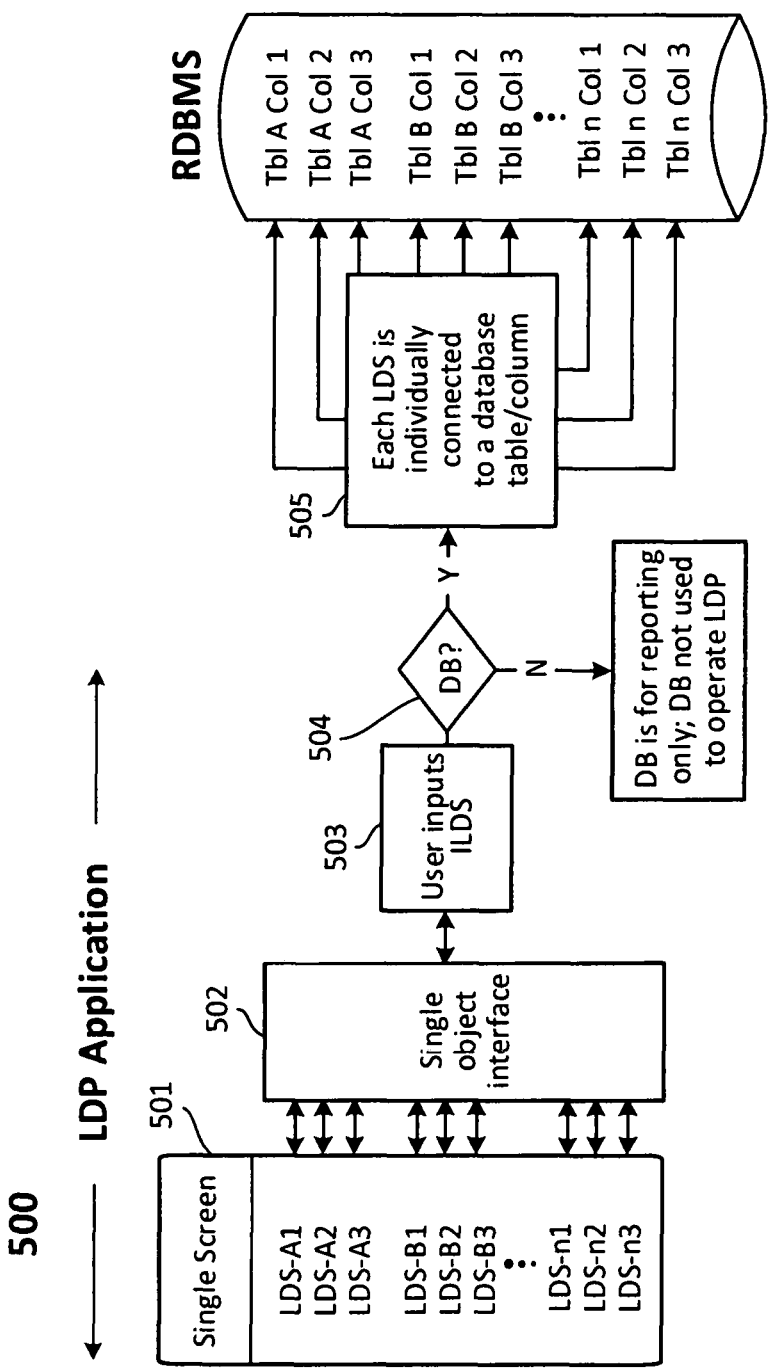

If no database is configured, stub ALDS records are created directly in memory (611); even when a database is configured for reporting only or for application operation and reporting, stub records can be manually created directly in memory

610

An external device (711) or another computer application (712) inputs a preset data item into the lexical application through an interface (713)
710

The base Icon Control (901) is uniform in a lexical application for all icon types (names); the Icon Control comprises five components (902 – 906); a particular icon type (name) is customized beyond the base Icon Control Icon Control (941) can have a plurality of icons inside it (942) in the level beneath its position in the icon type hierarchy; for a sublevel Icon Control to display, it must have ILDS record(s) stored at that level
(Repeat for levels 3, level 4, etc. deeper into the lexicon hierarchy)

940

User inputs ILDS payloads in list format by List ID Field (340); the ILDS Group Field (341) groups data items in a subsidiary relationship to a main data item; subsidiary data items are indented in the list (1021 & 1022)

If space is too short upon attempted input, the payload of an alternative ILDS with an abbreviated payload (1048) is substituted automatically for the ILDS with the longer payload Content in a particular view in icons at a level below another icon in the icon the lexical application's icon level hierarchy (1052 – 1054) is aggregated and displayed in the same view in the higher level icon (1051), whether payloads are list or shape/wrap format An ALDS is input into an Icon Control view using
either the List Box Control or the Base Control The List Box Control is for predefined data items with a variable number of List Box Term rows (1103); if an ALDS payload exceeds available horizontal display space it rolls the text (1106 & 1107), if the number of rows exceeds vertical display space it stacks list boxes (1108)

The Base Control is used to input a variable that is not pre-knowable (1114) that is applied to a data item that is pre-knowable (1112); the slider component (1115) displays only if the ALDS record in 1112 is so configured For an ALDS that requires data that is not pre-knowable (1153), user types or dictates data into Base Control Data Component's empty ALDS payload (1154); upon input the lexical application stores the payloads of both LDS records in memory as ILDS records (1155) and displays (1156)

Hybrid concatenation configuration for 1161 and 1162

Hybrid Map: $$$01

| Trigger Payload | DST |
|---|---|
| "Manage work product for" | LBC |

LBC = List Box Command row
LBT = List Box Term row
BC = Base Control Command

Hybrid Set 1163

| Hybrid String | DST | Hybrid Payload |
|---|---|---|
| "Project Upgrade Series" | LBT | ($$$01 trigger) ($$$01 string) |
| "Apex Product Series" | LBT | ($$$01 trigger) ($$$01 string) |
| "Europe Inventory 4.0" | LBT | ($$$01 trigger) ($$$01 string) |
| "Product Configurator 2.5" | LBT | ($$$01 trigger) ($$$01 string) |
| "Alpha Training Curriculum" | LBT | ($$$01 trigger) ($$$01 string) |

Hybrid concatenation configuration for 1164 and 1165

Hybrid Map: $$$01

| Trigger Payload | DST |
|---|---|
| ($$$01 trigger) ($$$01 string) | LBC |

LBC = List Box Command row
LBT = List Box Term row
BC = Base Control Command

Hybrid Set 1166

| Hybrid String | DST | Hybrid Payload |
|---|---|---|
| "Project documentation" | LBT | ($$$01 trigger) ($$$01 string) (ABC## string) |
| "Deadline" | BC | ($$$01 trigger) ($$$01 string) (ABC## string) |
| "Estimated hours" | BC | ($$$01 trigger) ($$$01 string) (ABC## string) |
| "Assignment status" | LBT | ($$$01 trigger) ($$$01 string) (ABC## string) |
| "Status & progress" | LBT | ($$$01 trigger) ($$$01 string) (ABC## string) | from 11H-1 to 11H-3

Fig. 11H-2

Hybrid Set

| Hybrid Map | Trigger Payload | DST | Hybrid String | DST | Hybrid Payload |
|---|---|---|---|---|---|
| $$$01 | ($$$01 trigger) ($$$01 string) (ABC## string) | LBC | | | |
| LBC = List Box Command row | +9> string | | "Work breakdown list" | LBT | ($$$01 trigger) ($$$01 string) (ABC## string) (+9> string) |
| LBT = List Box Term row | +9> string | | "Functional specification" | LBT | ($$$01 trigger) ($$$01 string) (ABC## string) (+9> string) |
| BC = Base Control Command | +9> string | | "Technical design" | LBT | ($$$01 trigger) ($$$01 string) (ABC## string) (+9> string) |
| | +9> string | | "Test cases, data and systems" | LBT | ($$$01 trigger) ($$$01 string) (ABC## string) (+9> string) |

1170 — Manage work product for Europe Inventory 4.0 project documentation
- Work breakdown list
- Functional specification — 1171
- Technical design
- Test cases, data and systems

Fig. 11H-3

When the user selects a new List Box Term payload (1173), if the payload's LDS is so configured (1174) at the ALDS Use Field (331) and at the Successor Field (338), a Base Control displays with the selected payload in the Base Control Command Component and the hybrid text string "is due on?" (1175)

1170

Upon inputting the not pre-knowable date value into the Base Control Data component (1177), the date displays it as a new (second) payload with the word "Due" inserted (1779) by the configuration in 1178

1176

| Manage work product for Europe Inventory 4.0 |
|---|
| Project documentation |
| Deadline |
| Estimated hours |
| Assignment status |
| Status & progress |

Europe Inventory 4.0 is due on?  [Enter] [Remove]

09/15/2019 — 1177

1179

| Manage work product for Europe Inventory 4.0 project documentation functional specification |
|---|
| Due 09/15/2019 |

Hybrid concatenation configuration for 1177 and 1179

1178

Hybrid Set

| Hybrid Map | Trigger Payload | DST | Hybrid String | DST | Hybrid Payload |
|---|---|---|---|---|---|
| $$$01 | ($$$01 trigger) ($$$01 string) | LBC | | | |
| | | | "Project documentation" | LBT | ($$$01 trigger) ($$$01 string) |
| | ABC## string | | "Deadline" (ALDS) | BC | ($$$01 trigger) ($$$01 string) "Is due on" |
| | ABC## string | | "Deadline" (ILDS) | VEW | ($$$01 trigger) ($$$01 string) "Due" |
| | ABC## string | | "Estimated hours" | BC | ($$$01 trigger) ($$$01 string) (BCD data) |
| | ABC## string | | "Assignment status" | LBT | ($$$01 trigger) ($$$01 string) |
| | ABC## string | | "Status and progress" | LBT | ($$$01 trigger) ($$$01 string) |

LBC = List Box Command row
LBT = List Box Term row
BC = Base Control Command
VEW = Icon View

Fig. 11J

Hybrid concatenation configuration for 1187 - 1189 and 1190 - 1192

| Hybrid Map | Trigger Payload | DST | Hybrid Set | | | |
|---|---|---|---|---|---|---|
| | | | Hybrid String | DST | Hybrid Payload | |
| $$$01 | "Est. hours:" | VEW | | | | |
| LBC = List Box Command row | | | 009110 string | "Business requirements" (ALDS) | BC | ($$$01 trigger) "Hours for" (BCD) |
| LBT = List Box Term row | | | 009110 string | "Business requirements" (ILDS) | VEW | ($$$01 trigger) |
| BC = Base Control Command | | | 009110 string | "Functional specification" (ALDS) | BC | ($$$01 trigger) "Hours for" (BCD) |
| BCD = Base Control Data | | | 009110 string | "Functional specification" (ILDS) | VEW | ($$$01 trigger) |
| VEW = Icon View | | | 009110 string | "Database design" (ALDS) | BC | ($$$01 trigger) "Hours for" (BCD) |
| | | | 009110 string | "Database design" (ILDS) | VEW | ($$$01 trigger) |

1186

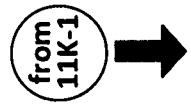
from 11K-1

Fig. 11K-2

As with 1180, the user selects a view item (1195) and two Base Controls display in succession, each with a hybrid natural language text string in the Base Control Command field (1198 & 1199); the preferred embodiment can prompt and store any type of numeric value (357) – a quantity, a percentage, an angle, a temperature, etc. – whatever is configured in the payload's ALDS (11100)

Lexical application can be configured to display ordinal numbers (11106) next to input payloads to let user input a payload by number (11107) instead of by clicking or dictating the payload itself, for convenience or discretion when using voice recognition

11105

The Help Narrative Control (1201) displays suggestions to user; each text block (1202) is an ALDS payload; user clicks arrow at either end (1203 & 1204) to see other suggestions Nav Control lets the user select an icon or sort
a plurality of icons for display on the screen

1400

If so configured, a Nav Term ALDS (1431, 1434 & 1437) displays successor control(s) to let the user refine the selected display option (1432 & 1433, 1435 & 1436, and 1438)

Mode Control lets a user enter special
modes of operation of a lexical application
1500

In the preferred embodiment, there are four modes of special operation; records used in while in a mode has the code for it stored in the ALDS Use Field (331) and requires that a user has permission to operate the mode in the ALDS Security Field (302)

On Behalf Of (OBO) Mode Control lets a user enter and delete data items on behalf of another user who authorized the data
1600

In this medical example, the OBO list box displays the particular users for whom the present user is authorized to enter data
1610

In this medical example, an assistant inputs diagnosis and recommended treatment on behalf of physician who gave the information by dictation (1616)
1615

ER Visit  Outpatient

Jan 23, 2019   Age 62   Catherine L. Vanek   White female, 5'7" 138 lbs
Walk-in

Summary

Chief complaint: Abdominal pain in lower left quadrant
Bleeding from rectum, minimal

History of present illness: Onset of mild pain about 3 days ago (est. level 4)
Pain severe this morning (est. level 8)
Onset of rectal bleeding yesterday
Bleeding unchanged since

Tests: CT scan of abdomen: perforation positive

Diagnosis: Diverticulitis of large intestine with perforation *  ⟵ 1617
SNOMED-CT 445162006
ICD-10 K57.21

Recommended treatment: Laparoscopic lavage and drainage without resection *

1616

* Entered by Vicki Mayo
Medical Transcriptionist
Jan 24, 2019

*Physician* Dr. Erik Thorklinsen
*Facility* Fairview Southdale Hospital ER
Edina, MN

Fig. 16C

Scoring Mode Control is used set up and execute automated evaluation of a particular icon type
1700

In the preferred embodiment, there are three steps to create a particular scoring system with which to score production icons (1707 – 1709)

1705

User completes inputting data items to serve as scoring criteria and saves the Scoring Icon as ready for use to score production icons (1739)

Messaging mode has its own icon type (1821), with bar fields for message info (1822 – 1825); request ILDS records are input into view (1829); response ILDS records can be input by the receiver and returned later One or a plurality of icons can be attached to a Message icon (1831)

Data items are input from ALDS records configured for messaging; in this medical example, a second opinion is requested on a diagnosis & recommended treatment (1836 & 1837), and an exam report is attached (1838)

Verify Mode Control (1901) lets a lexical application user request confirmation of ILDS records within an icon

1900

User can set up a Verify Icon type for a confirmation (1911), send a verification request (1912) to a person or organization, send Verify Icons (1913) and view Verify Icons (1913)

There is a lexical configurator subsystem – with its own screen interfaces – used to create and configure a new lexical application, or to maintain an existing one Developer configures successor ALDS payload(s) (2040) to display upon selection of a particular trigger LDS payload Developer configures a hybrid ALDS payload that combines other ALDS record payloads in a concatenated natural language-like text string payload (336 & 337)

Developer configures User ALDS records for input of data in On Behalf Of Mode (1600) by user or a group of users Developer configures data input via Enumerator instead of via ALDS payload (11105) by icon type and/or user Developer configures a Scoring Icon with a particular scoring system for a target icon type, deploys it in production to score icons
2090

Developer configures a Verify Icon with specific data items marked for confirmation, generates instances of them from production icons and issues the icon to a verifying person
20100

METHOD AND SYSTEM FOR LEXICAL DATA PROCESSING

CROSS REFERENCE TO RELATED APPLICATION

This application is a division of U.S. patent application Ser. No. 14/830,995 filed Aug. 20, 2015.

FIELD OF THE INVENTION

The present invention relates to computer-implemented software methods and a system for creating and operating business applications, more particularly as related to processing data entirely by use of computerized lexicons.

BACKGROUND

Over the past quarter century, virtually all input of data by humans into computers has been done using one of the same ten graphical user interface (GUI) screen controls: the dropdown box, check box, radio button, data grid, list box, slider, cycle button, spin button, combo box and text box. There are some newer data input controls, but they are limited to inputting data that could already be input through one of the ten; the graphical calendar control is the biggest example of this. It is notable to the present invention that, in addition to being used to input relational data, the text box is also used to input text as non-related information (called "non-data information" hereunder).

A major problem with today's GUI-based application software is that many information items have too many possible answers or are otherwise too complex to be input as relational data through any of the ten data input screen controls, and are instead input into a text box as non-data information, usually a big text box. The volume of possible answers is a problem because of the time and effort it would take to scroll through a list of hundreds or thousands of possible input options, or to navigate to the many screens and the multitude of controls that would be necessary to keep the number of input options in the controls down to a manageable number. Complexity is a problem because of the need to input information items in combinations that cannot be anticipated and handled by any of the ten controls.

The only automated function that can be performed on non-data information is to execute a text string search to identify an alphanumeric match. Non-data information cannot be used by software programs to perform more meaningful automated functions because it is not organized into pieces that can be put together—related—to do something useful. Non-data information can only be used manually by a human reading it, interpreting it and correlating it to other fields in the application, including those containing relational data.

Items input as non-data information are frequently the most important ones. For example, workforce management software products let the user input a worker's performance rating as a number in the form of relational data using one of the ten data input GUI screen controls, but force users to input the reasons justifying the rating in the form of non-data information. This is because the possible reasons for a work performance rating are far more voluminous and complex than the simple numerical rating itself. Another example is that much of the information input by a doctor to explain a diagnosis or treatment goes into text boxes as non-data information. Again, this is because many clinical information use scenarios require answers too voluminous in number and/or complex in use, to be input through any of the ten GUI data input screen controls. Non-data information is arbitrary in how it can be input and can only be used manually, which results in slow and expensive business processes to use it.

Another problem with today's GUI software is that every data item requires a dedicated field located on a screen, each consuming screen real estate. In enterprise applications, this entails having many screens, one for each logical group of fields, which forces users to navigate between them to find and use a desired field, adding to the time and effort required to use an application.

Yet another problem with modern GUI software is that it does not lend itself to processing lexical data, which heavily affects the healthcare industry, where the need to process lexicons is growing. The official International Classification of Diseases (ICD) lexicon administered by the World Health Organization has been in use for decades to pay healthcare providers for services rendered in the United States and most developed nations. The ICD lexicon is now being expanded from about 18,000 codes to about 140,000 in an effort to capture more detailed information from clinical environments (there is one lexicon term per code). Billions are spent on software application products to process medical bills with ICD codes, but all to one degree or another rely on text boxes to hold them as non-data information. This greatly increases paperwork for doctors and nurses, and requires that a billing expert manually review LCD codes before submitting them to an underwriter for payment, further adding to administrative overhead costs in healthcare.

Also, as of 2015, regulations issued by the U.S. Centers for Medicare and Medicaid Services require that Systematized Nomenclature of Medicine (SNOMED) codes be submitted along with certain ICD codes to qualify for higher Medicare reimbursement rates under a new set of rules collectively called "meaningful use" as part of its new Electronic Health Record Program incentives. SNOMED, with about 311,000 codes, is an official lexicon administered by the International Health Terminology Standards Development Organization.

Adding SNOMED to ICD totals about 452,000 lexicon codes in all. Using current GUI software technology, capturing all these lexicon code/term pairs as related data instead of as non-data information would require many more screens holding many more screen controls than clinical applications have now, some containing hundreds input options or more. This portends the need for the $3 trillion U.S. healthcare industry to migrate to a software technology designed from the ground up to process data by lexicon.

There is also a need to improve applications for which there are no official lexicons. Virtually all applications rely to one degree or another on non-data information to handle data items requiring possible answers too voluminous or complex to input through any of the ten GUI data input screen controls, as explained above. But some industries rely almost totally on non-data information. The best example of this is staffing, where users of job board and recruiting social network websites rely almost totally on just two relational data items to identify potential matches: job title and location of a job or a person's residence. Virtually all other important information items in hiring—skills, roles, tools used, materials used, work product, authority level, customers served, etc., and the experience time in each, along with preferences and availability—are stored as non-data information in a big text box on a computer screen, or in a résumé in an attached Microsoft Word document, itself a massive text box that can only be used manually. Work information is just too big and complicated to input into a relational database using the ten data input controls. Because it has remained almost totally manual, the staffing industry has held on to 30% to 40% gross profit margins while other industries have become more efficient by the use of computers.

Every industry or occupation has its own de facto lexicon developed over decades of doing business. Computerization of these lexicons by a software product that captures lexicon terms as related data would make possible substantial efficiency improvements in industries that still rely largely on non-data information in the form of unrelated text, such as staffing.

The present invention includes a set of screen controls that, in conjunction with a plurality of unitary data structure records with each record holding a lexicon term, makes possible the use of computerized lexicons to input all information as related data, thereby eliminating the need to input non-data information. This enables the automation of business processes that must be performed manually now.

Another benefit of the present invention is that today developing an application for a particular use requires programming a body of software source code from scratch, with screens and fields built to meet the application's specific requirements, along with specialized data structures for interoperation between each field and its corresponding column in a database table. The present invention can deliver an application product for a particular use by building and deploying a computerized lexicon for it, with all applications regardless of type running atop the same body of software source code using the same screen controls holding lexicon terms specific to the requirements of a particular application. In this way the invention can deploy software for an application by software configuration instead of by software source code programming, thereby greatly reducing development and maintenance costs, in addition to solving the problems of non-data information explained above. It does this by substituting computerized lexicons for computer software logic. In other words, it does this by leveraging human language through a software machine instead of leveraging human skills in software design and computer programming.

SUMMARY

The present invention lets a user create and deploy computerized lexicons to operate a software application in which all data is input and displayed in the form of a unitary data structure called the Lexicon Data Structure (LDS) comprising a plurality of data field definition blocks stored in memory, with one LDS record for each lexicon code/term pair in the record's payload section. When a data item is a predefined lexicon term, it is input into memory as is; if it requires data that is not pre-knowable, the user adds supplemental data to an LDS record and then inputs it into memory along with the LDS record holding the predefined lexicon term. All information items are input as data that can be related to other items in memory. In various embodiments, the lexical application can operate without a database, or with a database for reporting, or with a database for storing LDS data items in a database and deploying them as needed to operate the software, in addition to reporting. Multiple lexicons can operate within a lexical application, each used for a particular area of application functionality. Multiple lexical applications can operate simultaneously within a processing environment.

Because data items are manifested as discrete LDS records containing whole data to input through a single uniform object interface, it is possible to input and display all data on a single screen, with the user navigating the computerized lexicon to obtain a desired data item on the screen instead of navigating to a field on one of a multitude of screens. The lexical application lets the user input any data item into a graphical icon and display its payload there, some in static-position fields in bars on the icon, others at dynamic-position locations in data views inside the icon. There is a plurality of views in an icon, one for each category of data items. There are various types of icons, each to hold a particular category of data; each icon type has its own set of bar fields and views. Lexicons, screen controls and application behaviors are configured through a subsystem that can be connected to the lexical application.

Screen controls displayed for user advice and navigation and not for input—such as a button label, a legend, or a user help suggestion—also display LDS record payloads.

BRIEF DESCRIPTION OF THE DRAWINGS

FIG. 5A is a process flow diagram depicting how a data item on a screen can operate without use of a database, or can operate connected to a column in a table in a database if one is used for reporting;

FIG. 11J is a mockup illustrating that an ALDS record can be configured to form and display natural language-like ILDS view payloads;

FIG. 11O is a mockup illustrating that the application can be configured to let a user input data items by number in lieu of by ALDS payload;

FIG. 16C is a mockup illustrating an example of data input into an icon by a second party using On Behalf Of mode;

DETAILED DESCRIPTION

Figure 1A:
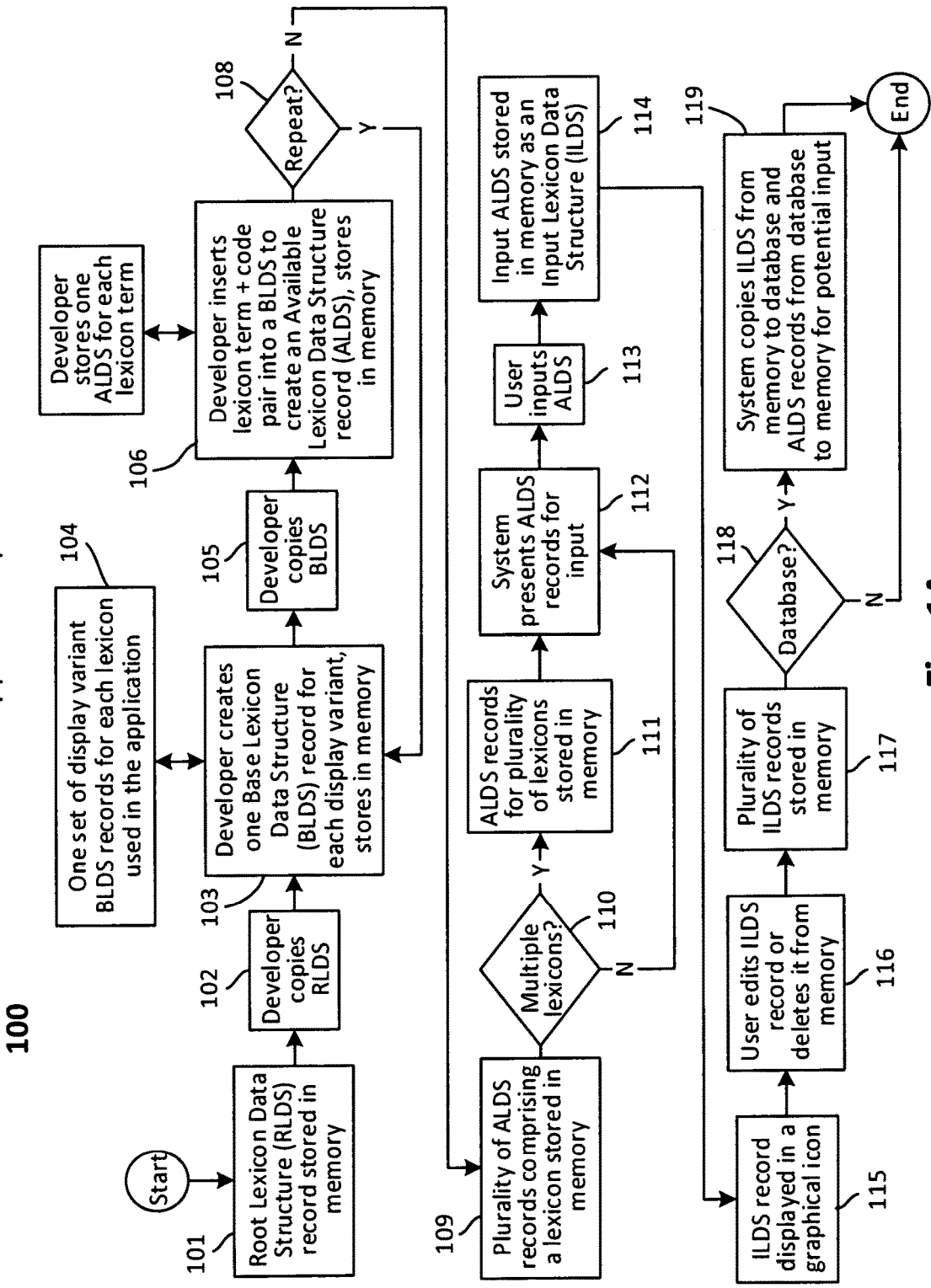
FIG. 1A is a process flow diagram depicting the process by which a lexical application is built and operated.

A "data item" is a unit of information displayed for potential input into or that has been input into an icon. The term "data item" may be used interchangeably with ALDS and ILDS records hereunder.

A "lexicon term" is a linguistic unit that cannot be divided into smaller meaningful parts. A lexicon term is paired with a lexicon code. A lexicon term can have synonyms.

A "lexicon" is a closed set of lexicon terms arranged in a hierarchical tree structure used in a particular field of endeavor (e.g., medicine, education, law, engineering, etc.).

A "computerized lexicon" is a plurality of lexicon terms for a particular field of endeavor stored in memory for use by humans and computer software programs.

A "lexical application" is a computer software system applied to a particular business activity that operates using computerized lexicon records for its input and output.

A "lexicon data structure" (LDS) is a data structure that defines a plurality of data definition blocks for fields in a record that carries a lexicon term payload along with associated data for display and, if a non-control ALDS, for potential input. An LDS is in one of four states: the Root Lexicon Data Structure (RLDS) that is copied to start the process of creating a computerized lexicon; the Base Lexicon Data Structure (BLDS) with data definition block fields laid out for processing lexical data items and for display of input data items in a particular format; the Available Lexicon Data Structure (ALDS) that is a copy of a BLDS populated with a particular lexicon code/term pair as its payload; and the Input Lexicon Data Structure (ILDS) that is an ALDS that has been input and displayed in an icon.

A "field" is either a data definition block in an LDS record or a statically-located GUI screen field in an icon bar, as defined by the context of the term's use herein.

A "record" is either a single ALDS or ILDS, or a collection of them related in an Icon Control, as defined by the context of the term's use herein.

A "whole record" is an ALDS or ILDS record in which actor and subject data is repeated in order to relate it to other records for display and input into a graphical icon without making a round trip to a database.

A "payload record" is a production ALDS with a lexicon code/term pair and subject and actor data ready for potential input into an icon.

A "stub record" is a non-production ALDS containing data on a subject, an actor or a lexicon payload without a subject or actor used to create a whole record by combining a subject stub record and an actor stub record with a payload record containing a lexicon code/term pair.

A "User ALDS" is a production ALDS record to define a particular lexical application user's security clearance and synonym preferences.

A "payload" is the portion of an ALDS record to be displayed upon input as an ILDS. An ALDS payload contains a lexicon code/term pair. An ILDS payload can comprise a lexicon term, or a lexicon term and its lexicon code, and can be supplemented by a number and/or a qualifier called an amendment. Thus, depending on application configuration and the data that is input, an ILDS payload displayed in an icon can comprise one, two, three or four fields (note that a lexical application can be configured to not display a lexicon code). ALDS payloads are used to populate screen controls that are not presented for potential input, for example a button label, a legend, or a help narrative text block.

A "production icon" is an Icon Control that contains data on a subject and actor. Stub icons and control icons are not production icons; nor are Scoring Icons and Verify Icons, which are applied to production icons to score them in Scoring Icons and to generate person- or entity-specific Verify Icons for confirmation of ILDS payloads by a second party.

A "label" is a text string displayed for user advice and navigation and not for input, including the List Box Control Command row, Base Control Enter and Remove tabs, button name, icon Control type name, Icon Control bar field label, Legend, and Help Narrative text block.

An "object" is a computer software program that performs specified operations upon entry into a certain state. States are changed by events performed by a human on the GUI, or by data input automatically from an external device or computer application.

An "object interface" is a computer software program that shares data between software objects to perform a particular function, such as data input.

A "screen control" is a graphical object on a computer screen with which a user interacts to perform a particular function such as navigating, changing what is displayed on a screen, or inputting data. A "system" is a lexical application combined with a processing environment.

A "processing environment" is one or more physical computer processing devices organized into a system on a standalone computer, or on a client/server system of computers connected on a local area network, or on an Internet cloud or on the open Internet, along with mass storage peripherals and human interface peripherals including a mouse, keyboard, monitor, speech recognition microphone, and speech simulation speaker.

It is within this context that various embodiments of the invention are now presented in FIGS. 1A-20N.

In the present invention, a lexical application operates using atomic data stored in memory; atomic data is defined as every possible input answer value stored in a discrete LDS record, along with an LDS record for every possible user advice or navigation element displayed but not for input (button labels, field labels, legends, etc.). A lexical application thus operates at every user step by searching through LDS records to find and display desired data items for viewing and/or input. As they are depicted in various block diagrams herein, fields within LDS records are processed from left-to-right during a search. Every action by a user is performed based on a search of LDS records in conjunction with software objects that operate by the LDS record format. In practice, a full working set of ALDS and ILDS records in a use scenario are sorted by fields in their subject and actor field sectors, with that data repeated in all ALDS and ILDS records related to a subject and an actor, called "whole records" in this document. (Note, LDS records used for screen control labels and legends contain empty fields in their subject and actor sectors.) To illustrate whole records in a medical application example, the subject is a patient, and there is an LDS record for every piece of personal and health history information for him, and the actor is a physician, with LDS records containing his identity and an LDS record for every medical term for his particular area of practice, such as cardiology. A working estimate is that there would be a few thousand ALDS and ILDS records in memory for a patient and his cardiologist to display existing data and to input new data during a patient visit, a minute percentage of the millions of LDS records for all patients and medical practice disciplines in a large clinic or hospital.

The present invention trades off requiring a user to navigate through a multitude of screens to reach hundreds of controls to view and select from thousands of potential input items in exchange for displaying all potential input items on a single screen in one of three controls: the List Box Control, the Base Control, or the Icon Control.

FIG. 1A shows the end-to-end lexical application process, started by displaying the RLDS at 101 to create a BLDS by copying the RLDS at 102, and then using its bootstrap programs to configure the BLDS' constituent fields at 103. One BLDS is created for each type of display (called a "display variant" herein) in the lexical application at 104 and stored in memory. At 105 through 109, one ALDS record is created for each code/term pair in a lexicon and stored in memory. At 110 and 111, there can be one or a plurality of lexicons in memory to operate simultaneously within a lexical application. At 112 the system presents any desired ALDS to the user on the interface. "Presents" is defined as either displayed in a screen control, or not displayed but obtainable by either typing or dictating a lexicon term into the Base Control at 1136. The user inputs an ALDS at 113 and it is stored in memory as an Input Lexicon Data Structure at 114. At 115 through 117, upon input an ILDS payload is displayed and the user can directly edit it (if in a bar field), resize it (if in a view shape or wrap), or delete it. At 118, the lexical application can store an ILDS payload with or without interoperation with a database. At 119, if a database is used for reporting purposes, the system automatically copies an ILDS record upon input from memory to a database, and if configured for application operation purposes, copies ALDS records from a database to memory for display, in addition to copying ILDS records to a database reporting.

Figure 1B:
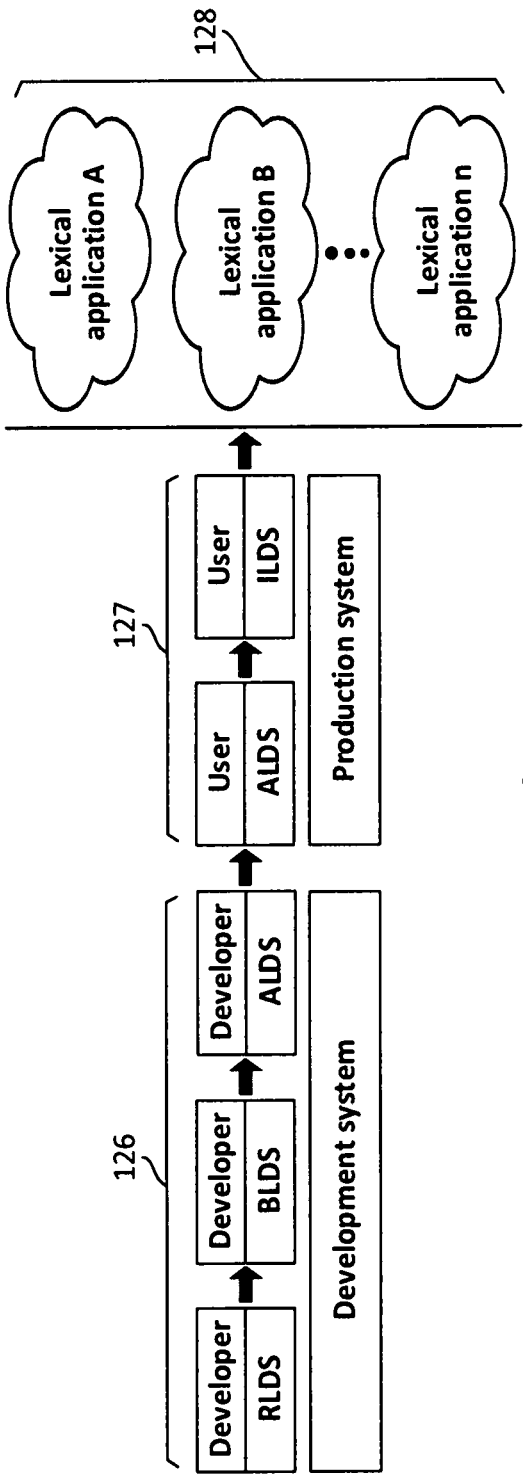
FIG. 1B is a block diagram depicting how a lexical application is developed and deployed, and that a plurality of applications can operate simultaneously.

FIG. 1B depicts the development and deployment of lexicons for a lexical application. At 126, a BLDS is copied into a plurality of ALDS records, each with a particular lexicon code/term pair to develop a computerized lexicon. At 127, each computerized lexicon code/term pair is moved into a lexical application and thereby deployed for use. At 128, a plurality of lexical applications can be simultaneously deployed into a processing environment and operated within an enterprise, for example a medical application in a hospital coexisting with workforce management application for supervising its workforce.

Note, the start and end character positions of LDS records are defined in memory, and change as the LDS moves between states, first from the RLDS to a BLDS, then from a BLDS to an ALDS with the addition of a lexicon code/term pair, and finally from an ALDS to an ILDS upon input of a data item into an icon.

Figure 2A:
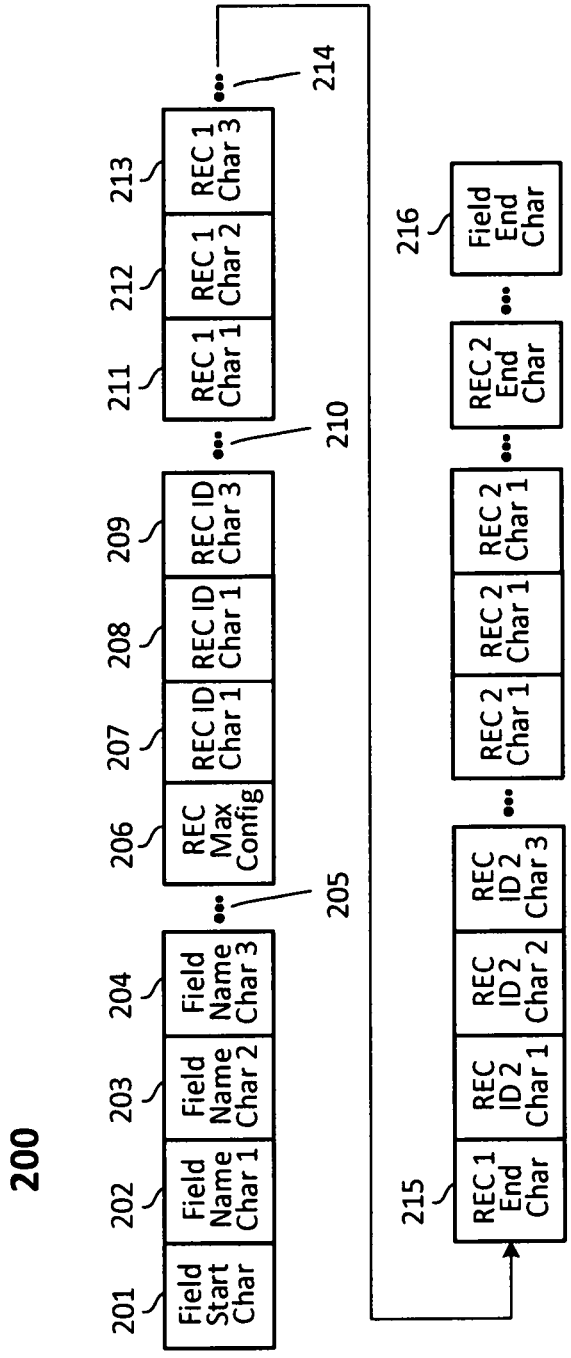
FIG. 2A is a block diagram of the unitary LDS field format, including the ability to configure a particular field to allow multiple recursion instances of the field within an ALDS record.

FIG. 2A depicts the format of an LDS field, the unitary element comprising all fields in the lexical application. At 201, the unitary LDS field's start character position in memory is the Field Start (Char) Character. At 202 through 205 are the character positions in memory that collectively define the Field Name Character (Char); this character set can be variable in length. At 206 is the Recursion Maximum Configuration (REC Max Config) character that defines the limit on the number of recursion instances allowed for a field within the BLDS as configured at 2010 and 2011. At 207 through 210 are the Recursion Identification Characters (REC ID Chars) to identify the name of the recursion based on the value configured at 2012; this character set can be a variable in length. At 211 through 214 are the characters to carry the field's content (or the recursion's, if it is one); this character set can be a variable in length. At 215 is the end character Recursion (REC) End Character (Char) of the recursion in memory to define the last character of the recursion instance in memory. At 216, the end character position of the LDS field in memory is the Field End Character (Char).

Figure 2B:
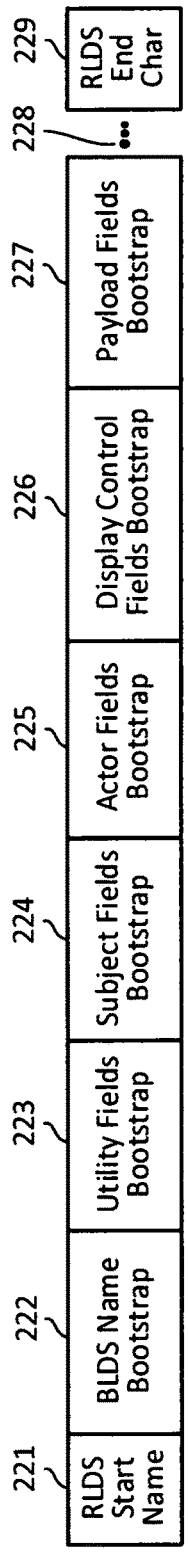
FIG. 2B is a block diagram depicting the root lexicon data structure (RLDS) in memory.

FIG. 2B depicts the RLDS format. There is only one RLDS record; the sole use of it is to be copied by a developer to create a BLDS. At 221 is the RLDS Start Name Field to define the RLDS record's start character position in memory. A developer uses the bootstrap program at 222 to give a BLDS its name, and uses the five bootstrap programs at 223 through 227 to define data definition block fields within each field sector. At 228, bootstrap programs may be added to, removed from, or reordered within the RLDS, and data values within them changed, to implement an alternative embodiment of the invention. At 229 is the RLDS End Character (Char) Field to define the end character position of an RLDS record in memory.

Figure 2C:
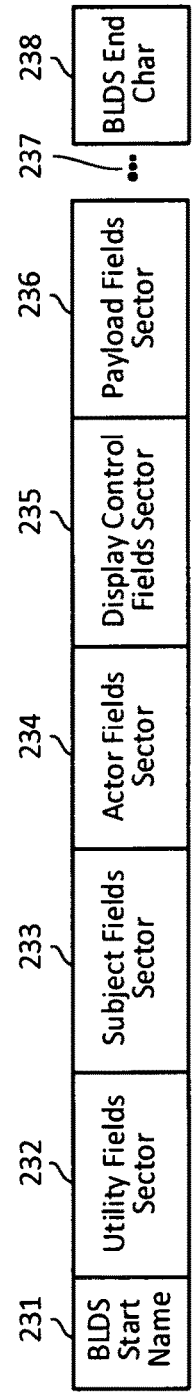
FIG. 2C is a block diagram depicting the base lexicon data structure (BLDS) in memory with its five field sectors to be formatted.

FIG. 2C depicts the BLDS format. At 231 is the BLDS Start Name Field to define a BLDS record's start character position in memory. At 232 through 236 are the five field sectors in which data definition blocks of the BLDS record's constituent fields are defined by a developer using the RLDS bootstrap program designated for each. One BLDS record is created for each display variant in a lexicon, which in the preferred embodiment of the invention is one BLDS variant to display ILDS record payloads in list format, and a second BLDS variant to display ILDS records in shape/wrap format. One set of BLDS display variant records is created for each lexicon in an application. A BLDS record is copied to create a discrete ALDS record for each code/term pair in a lexicon. At 237, field sectors may be added to, removed from, or reordered within the BLDS, and data values within them changed, to implement an alternative embodiment of the invention. At 238 is the BLDS End Character (Char) Field to define the end character position of a BLDS record in memory.

Figures 1, 3A:
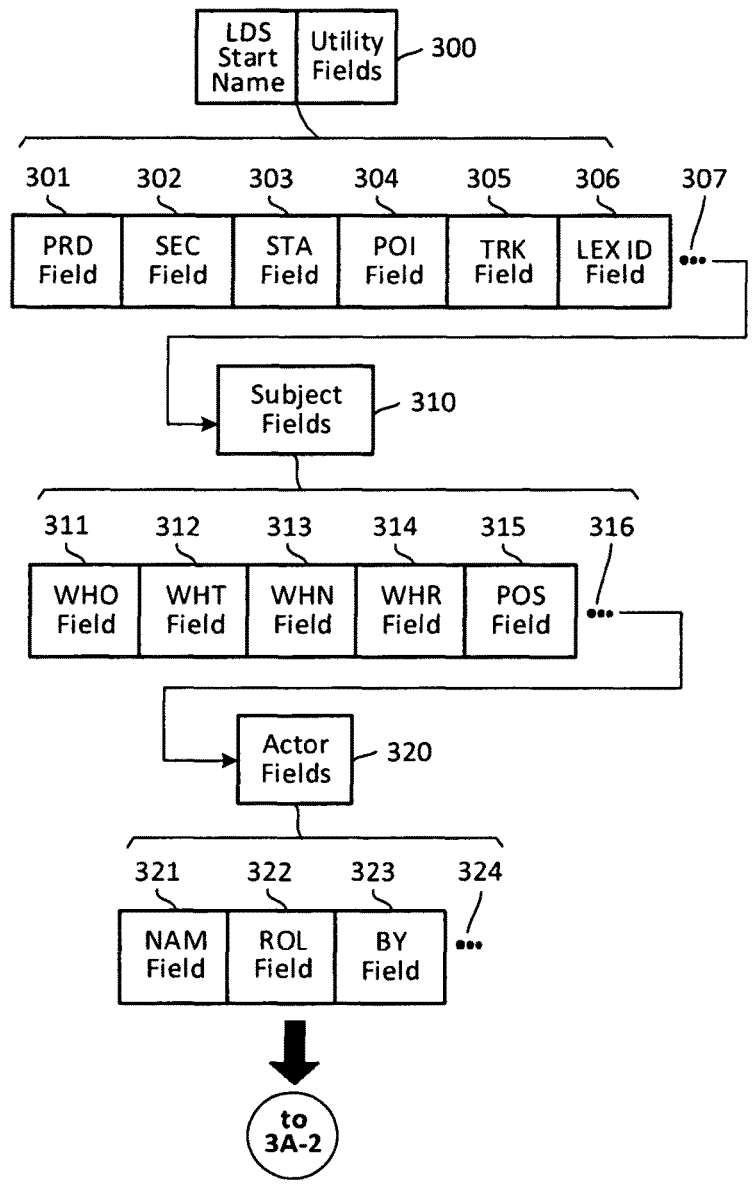
FIG. 3A is a block diagram depicting the field format of a BLDS record in memory to make an ALDS variant that upon input displays ILDS records in list format.
Figures 2, 3A:
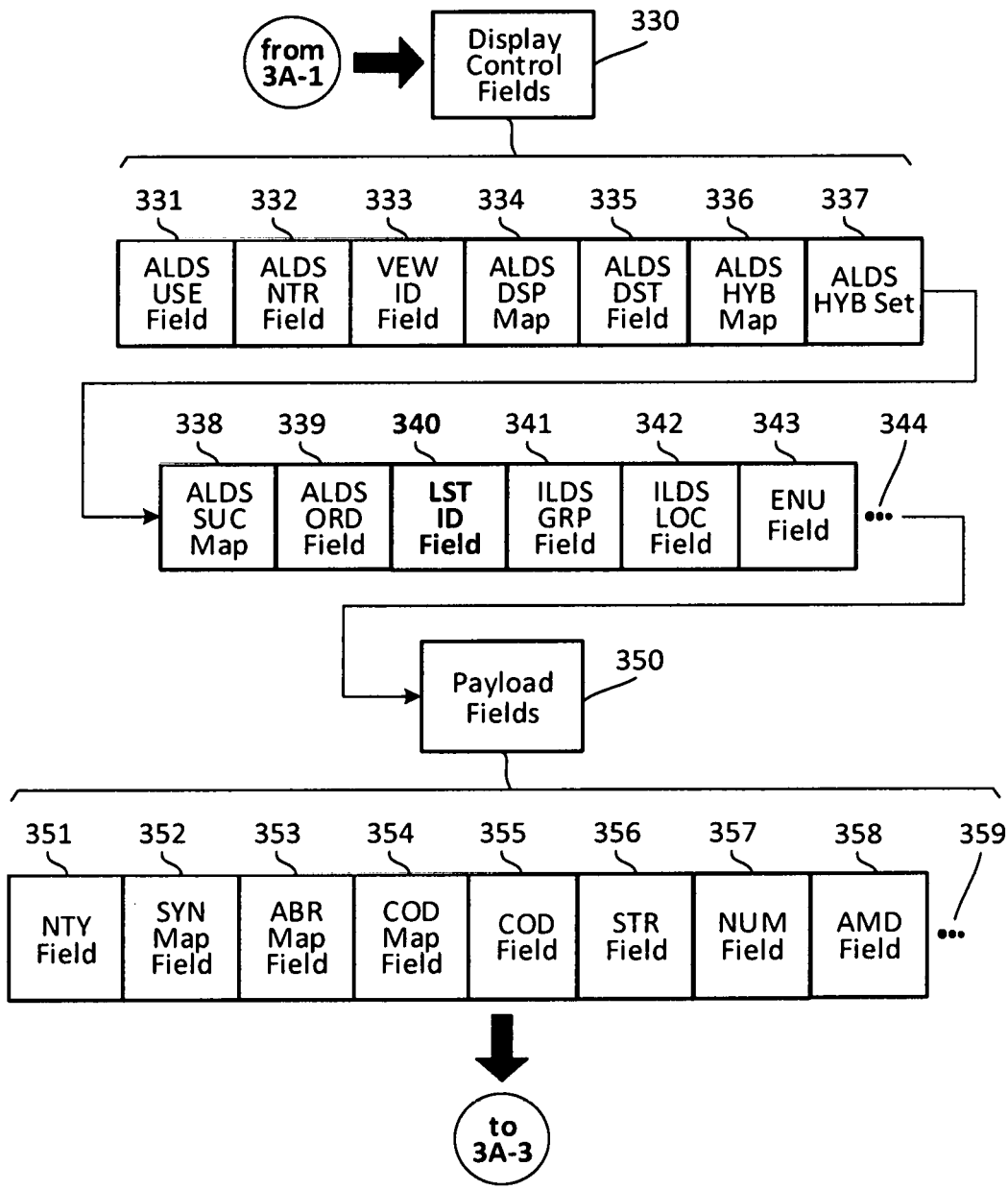
Figures 3, 3A:
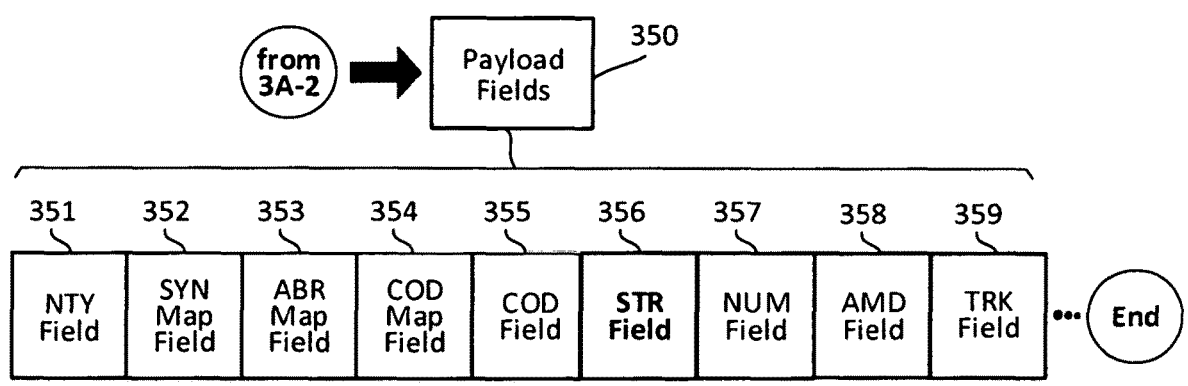

FIG. 3A depicts the field format of the BLDS that is copied to create ALDS records to display upon input the payload of an ILDS record in list format, as defined by the List Identification (ID) Field 340. ALDS records created from a copy of it inherit the BLDS record field format depicted here.

Note, an ALDS record based on the BLDS variant to display ILDS payloads in list format does not include the shape/wrap fields at 345 through 349.

At 301 is the Product (PRD) Field that defines the lexical application product to which the LDS record belongs. In the preferred embodiment of the invention, the values for the Product Field are (1) "MED" is for medical application, (2) "STF" is for staffing application, and (3) "WRK" is for workforce management application LDS records and icon types are not shared between lexical applications (products). When multiple applications are operated within an enterprise as depicted at 128, the Product Field is used by application search programs to keep the products separate by filtering out LDS records for products other than the present application product.

At 302 is the Security (SEC) Field that defines the actor's security clearance for a particular ALDS record and, if the ALDS has been input, an ILDS record based on the ALDS. Upon the moment of display, the DisplayMgr object checks security permission at the record level for both ALDS records and ILDS records by comparing the present user's security permissions in his User ALDS at 843 and compares that to the security requirement in the Security Field of the LDS records set for display at 845. Values for the Security Field are (1) "W" is read-write access, (2) "R" is read-only access, and (3) "N" is no access. If multiple LDS records in a display contain different values in their respective Security Fields, the DisplayMgr object will enforce security restrictions on a LDS-by-LDS basis. For example, if four of five ALDS displayed records contain the value "W" and the fifth contains the value "R", the application displays all five and allows input of the four, but does not allow the user to input, edit or delete the fifth.

At 303 is the Status (STA) Field that defines the status of the LDS record. In the preferred embodiment of the invention, the values for the Status Field are (1) "A" is active and in-production, (2) "R" is retired from data input and is read-only, (3) "D" is in-development, and (4) "T" is in-test. A search executed during a production user session collects LDS records with the values "A" and "R" in the Status Field; a developer works with LDS records containing the value "D", and a tester works with LDS records containing the value "T".

At 304 is the Pointer (POI) Field that defines the first character position of the String (STR) Field at 356 in memory. This field is used when a user types or dictates a pre-known and predefined lexicon term into the Base Control at 1136 to display it in a List Box Control for potential input with no use context, whereby the search program skips the fields between the Pointer Field and the String Field to enhance search execution speed.

At 305 is the Lexicon Identification (LEX ID) Field that defines the lexicon to which the ALDS record belongs; the only use of this field is for lexicon maintenance at 2013.

At 306, fields may be added to, removed from or reordered within the Utility Fields Sector, and data values within them changed, as required to implement an alternative embodiment of the invention.

At 311 is the Who (WHO) Field that defines the identity of the subject person or entity to whom or that the LDS record applies, for example a patient in a medical application or a job candidate in a staffing application.

At 312 is the What (WHT) Field that defines the purpose of the ALDS record.

In the preferred embodiment for a medical application, values for the What Field are (1) "APT" is appointment, (2) "RMD" is appointment reminder, (3) "VST" is patient visit to a facility, (4) "MON" is monitoring, (5) "F-U" is patient follow-up, and (6) "SVY" is patient survey.

In the preferred embodiment for a staffing application, values for the What Field are (1) "CAR" is career, (2) "EDU" is education and training, (3) "DEG" is a degree or certification, (4) "JOB" is a job, (5) "ASG" is an assignment within a job, (6) "PRF" is a job preference, and (7) "QLF" is a job qualification.

In the preferred embodiment for a workforce management application, the values for the What Field are (1) "TSK" is a work task, (2) "SKL" is a work skill, (3) "ASG" is a work assignment, (4) "PRJ" is a work project, and (5) "PLG" is a work planning item.

All three embodiments include (I) "MSG" is messaging, (2) "SCR" is scoring, and (3) "VFY" is verification, and (4) "VFP" is verifying person.

At 313 is the When (WHN) Field that stores the time and date a data item is entered. If a second party inputs data on behalf of the author of a data item using On Behalf Of Mode at 1600, the second party can enter the date the data item was authored and the time and date the data item ILDS was input by the second party is input automatically; both time/date pairs are stored in the When Field in separate field recursion instances as at 200.

At 314 is the Where (WHR) Field that defines the organization to which the LDS record applies. For example, in a medical application the name of a hospital or clinic.

At 315 is the Place of Service (POS) Field that defines a location within the organization defined at 314 to which the data item applies. For example, in a medical application the place of service is an emergency room, an urgent care clinic, an imaging center, a laboratory, etc.

At 316, fields may be added to, removed from or reordered within the Subject Fields Sector, and data values within them changed, as required to implement an alternative embodiment of the invention.

At 321 is the Name (NAM) Field that contains the name of the actor person who displays the ALDS record for potential input about a subject at 311, and if input who input the ILDS; a device or external computer application at 710 can also be an actor that inputs an ALDS about a subject.

At 322 is the Role (ROL) Field that defines the functional role of the user who input the data item. For example, in a medical application a role is a doctor, registered nurse, nursing assistant, pharmacist, imaging tech, lab tech, orderly, billing agent, etc.

At 323 is the By (BY) Field that identifies the user operating the application while in On Behalf Of Mode who input, edited or deleted a data item on behalf of its author as at 1616.

Note, when an ILDS record is input by a user in normal operating mode (i.e., not in On Behalf Of Mode at 1600), this field is empty.

At 324, fields may be added to, removed from or reordered within the Actor Fields Sector, and data values within them changed, as required to implement an alternative embodiment of the invention.

At 331 is the ALDS Use (USE) Field that defines whether the ALDS payload is used to populate a screen control or to populate a specified type of ILDS record, as depicted by place of use at 800, 840, 850 and 860.

At 332 is the ALDS Enter (NTR) Field that defines how the payload of the ALDS record is to be input, its values are: (1) "FF" for free form input by a user from a List Box Control or a List Box Control and a Base Control, (2) "DV" for input by an external device, and (3) "CP" for input by an external computer application.

At 333 is the View Identification (VEW ID) Field that defines the view in which the ALDS payload is to be displayed. The identification for a view is unique for all icon types in the application.

At 334 is the ALDS Display (DSP) Field that defines a group of ALDS records available for a particular display. For example, at 1100 this field defines the particular list box which the ALDS record is to display; at 1180 and 1430 the ALDS Display Field defines the checklist in which the ALDS record is to display.

At 335 is the ALDS Destination (DST) Field that defines whether selection of the ALDS is to be input as an ILDS payload or if it is to navigate to a succeeding list box according to the value in this field, as depicted at 1120 (1) "*B" is display a succeeding List Box Control, (2) "BC" is display in a Base Control, (3) "BR" is input into a bar field, (4) "LI" is input into a view as a list data item, and (5) "SH" is input into a view as a shape data item. The asterisk ("*") indicates that specific values are used for list box variants at 1100, 1400, 1500, 1600, 1700, 1800 and 1900.

At 336 is the ALDS Hybrid (HYB) Map Field that defines a group ALDS records configured at 2041 to serve as the component payloads used to form and display a natural language-like combined (hybrid) payload at 2046.

At 337 is the ALDS Hybrid (HYB) Set Field that defines the role of the ALDS record's payload in formation of a combined payload to display as a single hybrid payload as configured at 2043 through 2046.

At 338 is the ALDS Successor (SUC) map that defines a group of ALDS records to display payload(s) of successor ALDS records in an ALDS Display Map group according to values in this field of (1) "T" for the ILDS payload that upon input triggers display of successor payloads, and (2) "S" for successor ALDS payload(s) to display, as at 1182 through 1184.

At 339 is the ALDS Order (ORD) Field that defines the order in which ALDS record payloads display in a List Box Control, or, if part of a successor checklist as at 388, the order in which Base Controls display ALDS record payloads in their respective Base Control Command components, as at 1182 through 1184.

At 340 is the List Identification (LST ID) Field that contains an identifier code generated by the InputMgr object to define where in a list an ILDS record payload is displayed.

Note, if this field is in an ALDS record, the fields for the shape/wrap display format at 345 through 348 are not in the ALDS record.

At 341 is the ILDS Group (ILDS GRP) Field that relates a subsidiary input data item to a main item as at 1021, 1022, 1031 and 1032.

At 342 is the ILDS Location (LOC) Field that is a unique code to define the display location of an ILDS payload that is generated upon input. The first two characters of an ILDS Location identifier is one of these values (1) "UB" for an upper bar field location, (2) "LB" for a lower bar field location, (3) "LI" for a list data item location, (4) "SH" for a shape data item location, and (5) "WR" for a wrap data item location. Upon input of an ALDS into a view, the InputMgr object automatically generates a sequential number unique to the icon bar or view and inserts it into the ILDS Location Identifier Field, and transforms the ALDS into an ILDS by changing the values in the record's Start Name Field and End Char Field from "A" to "I". Assignment of a location identifier number for a view data item is done dynamically upon input. The empty ALDS record on a bar field at 914 is pre-populated with the location identifier assigned to it at its configuration at 2059.

At 343 is the Enumerator (ENU) Field that assigns and displays an ordinal number adjacent to ALDS payloads in upon display configured at 2075, and as illustrated at 11105. The order of Enumerator numbers are sequential from top-to-bottom and then left-to-right. Enumerator numbers are automatically input into an ALDS record upon its display, and are temporal; the contents of this field are automatically deleted from the Enumerator Field upon the moment the ALDS record payload is no longer displayed.

At 344, fields may be added to, removed from or reordered within the Display Control Fields Sector, and data values within them changed, as required to implement an alternative embodiment of the invention.

At 351 is the Entity (NTY) Field that defines the category of the ALDS payload. For example, in a medical application the payload is one of many things: a symptom, an appointment, a cause, a sign, a diagnosis, a surgical procedure, a medication, a therapy, etc. The purpose of this field is to serve as a utility for organizing the lexicon by giving each ALDS record a functional category.

At 352 is the Synonym (SYN) Map Field that is used to make the ALDS record payload a member of a group of ALDS record payloads that are synonyms as assigned at 2029; a user is assigned to a particular synonym group at 2084.

At 353 is the Abbreviation (ABR) Map Field that is used to make the ALDS record payload a member of a group of abbreviated payloads used for a data item by the DisplayMgr object based on the presently available display space as depicted at 1046 and configured at 2030.

At 354 is the Code (COD) Map Field that contains a mapping code used to relate a data item ALDS record with another data item ALDS record. Code relationships are used in medical lexicons to validate the use of a lexicon code by linking one code to another. For example, SNOMED has about 1.4 million relationships defined between its 311,000 lexicon codes.

Note, this field is empty in screen control, stub, and User ALDS records.

At 355 is the Code (COD) Field that contains the lexicon code that places the ALDS record in its position in the lexicon hierarchy at 2031. A lexicon code is always paired with a lexicon term. This field is configured for display or non-display at 2032.

Note, this field empty in screen control, stub and User ALDS records.

At 356 is the String (STR) Field that is the payload carried by the ALDS record. The contents of this field are always displayed.

At 357 is the Numeric (NUM) Field that contains a numeric value to modify the payload with a quantity, a percentage, an angle, a degree, etc. There can be multiple recursions of this field as at 200. When there are contents in this field they are always displayed with the String Field payload.

At 358 is the Amendment (AMD) Field that contains a textual value to modify the in some way. For example, this field can contain such values as "about", "estimated", "definitely", "exactly", "observed", "approximately", "confirmed by test", "unconfirmed", etc. There can be multiple recursions of this field as at 200. When there are contents in this field they are always displayed with the String Field payload.

At 359 is the Tracking (TRK) Field that defines the status of the LDS record during a particular staged sequential process occurring within a lexical application. In a hybrid payload process as at 1160, 1172, 1176, 1180 and 1194, this field contains any of the values "HT" for trigger payload, "HS" for string payload, and "HH" for hybrid payload. In a checklist process as at 1180 and 1430, this field contains any of the values "N" for not yet displayed and "D" for displayed. When there are ALDS records that display hybrid payloads while in a checklist process, the Tracking Field has a recursion instance for each process to track both as at 200. In a scoring process as at 1700, this field contains any of the values (1) "SD" for a scored Scoring Icon and "SR" for displaying scored but retired and frozen Scoring Icons, (2) "SN" for create a new Scoring Icon and for selecting and weighting data items to score, (3) "SU" for a completed Scoring Icon for which data items to be scored and weighted have not yet been selected, and (4) "SE" for an unscored Scoring Icon that is populated with data from selected person- or entity-specific production icons and ready to score. In a messaging process at 1800, this field contains any of the values "UNS" for draft Message Icon, "SNT" for sent Message Icon, "UNR" for unread received message, "RED" for read received message, "RDF" for draft response Message Icon, "RST" for sent response Message Icon, and "DSP" for disposed message. In a verify process at 1900, this field contains any of the values "VT" for template Verify Icon, "VD" for draft Verify Icon, "VP" for populated Verify Icon, "VS" for sent Verify Icon, VRD" for draft response Verify Icon, and "VRS" for sent response Verify Icon.

At 360, fields may be added to, removed from or reordered within the Payload Fields Sector, and data values within them changed, as required to implement an alternative embodiment of the invention.

Figure 3B:
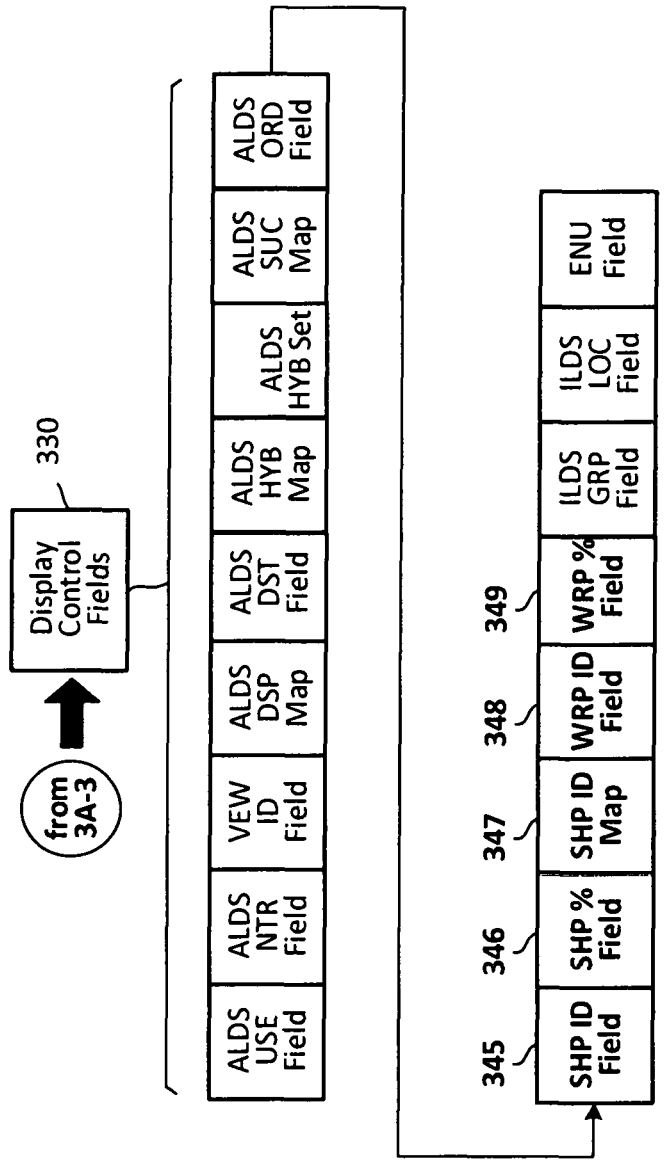
FIG. 3B is a block diagram depicting the field format of a BLDS record in memory to make an ALDS variant that upon input displays ILDS records in shape/wrap format.

FIG. 3B depicts the field format of a BLDS that is copied to create ALDS records to display upon input an ILDS payload in shape/wrap format, as defined by fields 345 through 349. ALDS records created from a copy of the BLDS inherit its field format depicted here.

Note, an ALDS record based on the BLDS variant to display ILDS payloads in shape/wrap format does not include the List Identification Field at 340.

At 345 is the Shape Identification (SHP ID) Field that is a number assigned to a shape that is unique within the view in which the shape displays; the contents of this field are not displayed.

At 346 is the Shape Percentage (SHP %) Field that displays the automatically calculated percentage a shape covers of its total display area, as at 1035. A shape's display area is the view area as at 1030, or, if the shape displays within a wrap, the percentage the shape covers of the wrap's total display area, as at 1044.

At 347 is the Shape Identification (ID) Map Field that defines a group of shape data item ILDS records entered into a single shape, as at 1031 and 1032.

At 348 is the Wrap Identification (WRP ID) Field that is a number assigned to a wrap that is unique within the view in which the wrap displays; the contents of this field are not displayed. The payload of the ILDS is displayed on a wrap as at 1041 and 1042.

At 349 is the Wrap Percentage (WRP %) Field that displays the automatically calculated percentage a wrap covers of its total display area at 1040 of the view in which the wrap displays as at 1043.

Figure 3C:
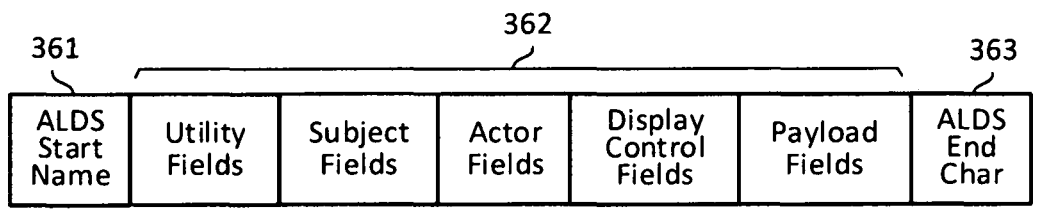
FIG. 3C is a block diagram depicting that an ALDS record inherits the format of the BLDS from which it was created.

FIG. 3C depicts the ALDS record format. At 361 is the ALDS Start Name Field containing the value "A" to define an ALDS record's start character position in memory. At 362 are the five field sectors inherited from the BLDS record copied to create it, including the fields configured within each sector, which can be any display variant. At 363 is the ALDS End (Char) Character Field containing the value "A" to define an ALDS record's end character position in memory.

Figure 3D:
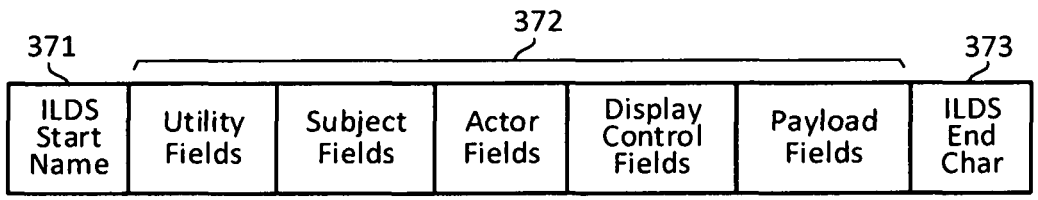
FIG. 3D is a block diagram depicting that an ILDS record inherits the format of the ALDS that was input to make it.

FIG. 3D depicts the ILDS record format, which is directly inherited from the ALDS record that was input to create it.

At 371 is the ILDS Start Name Field containing the value "I" to define an ILDS record's start character position in memory. At 372 are the five field sectors inherited from the ALDS record that was input to create it, including the fields configured in each sector, which can be any display variant. At 373 is the ILDS End (Char) Character Field containing the value "I" to define an ILDS record's end character position in memory.

Figure 4:
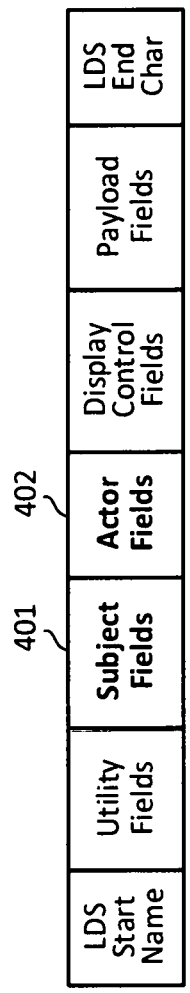
FIG. 4 is a block diagram depicting that the subject and actor field sectors of non-control non-stub ALDS records contain duplicative data.

FIG. 4 depicts that data in fields in the Subject Fields Sector and Actor Fields Sector are repeated in all production ALDS records except control, stub and User ALDS records, and in all ILDS records. Data in the fields of the two sectors makes LDS records whole records containing information needed to relate a record to other records for display and input and, upon input, display payloads related to one another in an icon. For example, an ALDS for potential input contains data on both the patient being treated in a hospital (subject data) and on the doctor providing care (actor data), with data in both sectors repeated in all LDS records in memory related to the healthcare encounter between the patient and the doctor.

FIG. 5A shows alternative embodiments of the invention operating without a database, or with a database used for reporting. At 501 is the single screen on which all controls and data are displayed. At 502 is the single uniform object interface through which all LDS records are input. At 503 the user inputs an ALDS record and the system transforms it into an ILDS in memory at 819. At 504 is the option to not use a database as configured at 20112, or to use a database for reporting only as configured at 20114. At 505 is the unidirectional connection of each ALDS record to a column in a table in a database for the purpose of reporting only. Even though there is the uniform object interface at 502, every payload record must be manually mapped to a column in a database table.

Note, although the preferred embodiment of the invention has one screen, an alternative embodiment has a plurality of screens for reasons of convenience, confidentiality or security. Such an embodiment would operate according to the present invention except for the multiple screens.

Figure 5B:
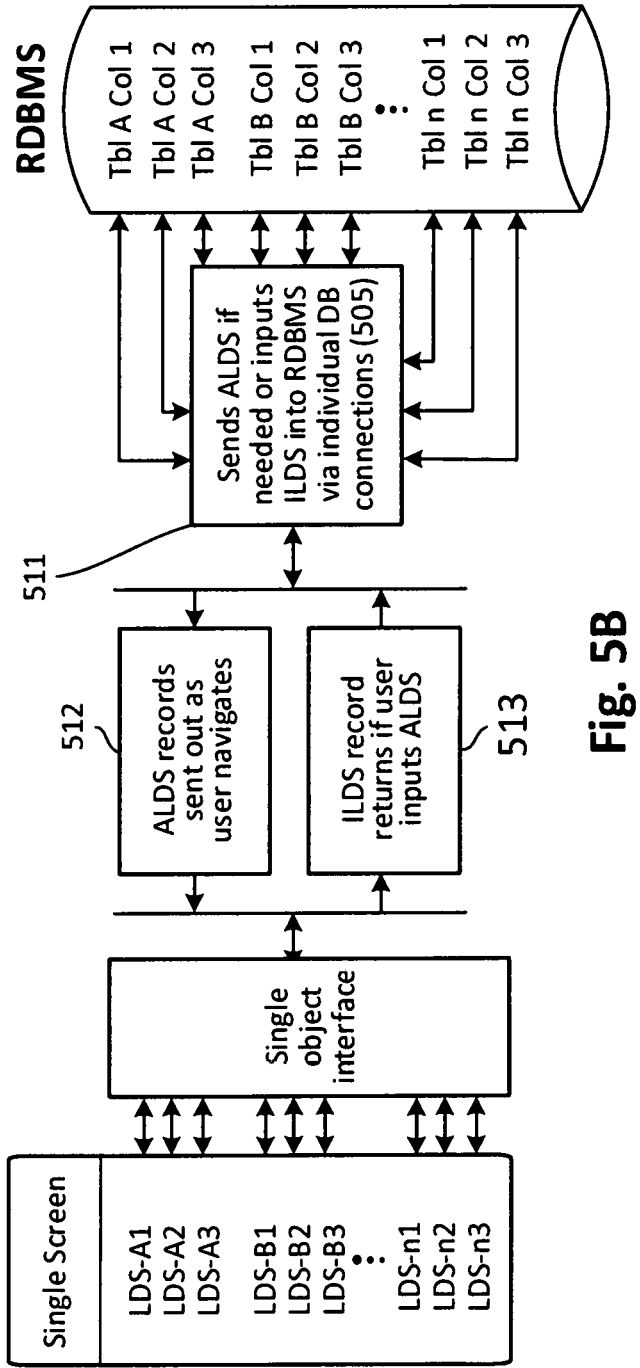
FIG. 5B is a process flow diagram depicting how a data item on a screen is connected to a column in a table in a database if one is used to operate a lexical application in addition to reporting.

FIG. 5B shows an alternative embodiment of the invention using a database for application operation and for reporting. At 511, upon input an ILDS record is copied from memory into a designated database table, as at 503. At 512, the connection of each ALDS record to a column in a table in a database is still present, as at 505, but differs in that the system-database traffic is bidirectional: ILDS records are copied from memory into the designated database table to enable reporting as at 505, but at 513 the system copies ALDS records for display from the database into memory based upon user navigation through the application lexicons on a move-by-move basis.

Figure 6A:
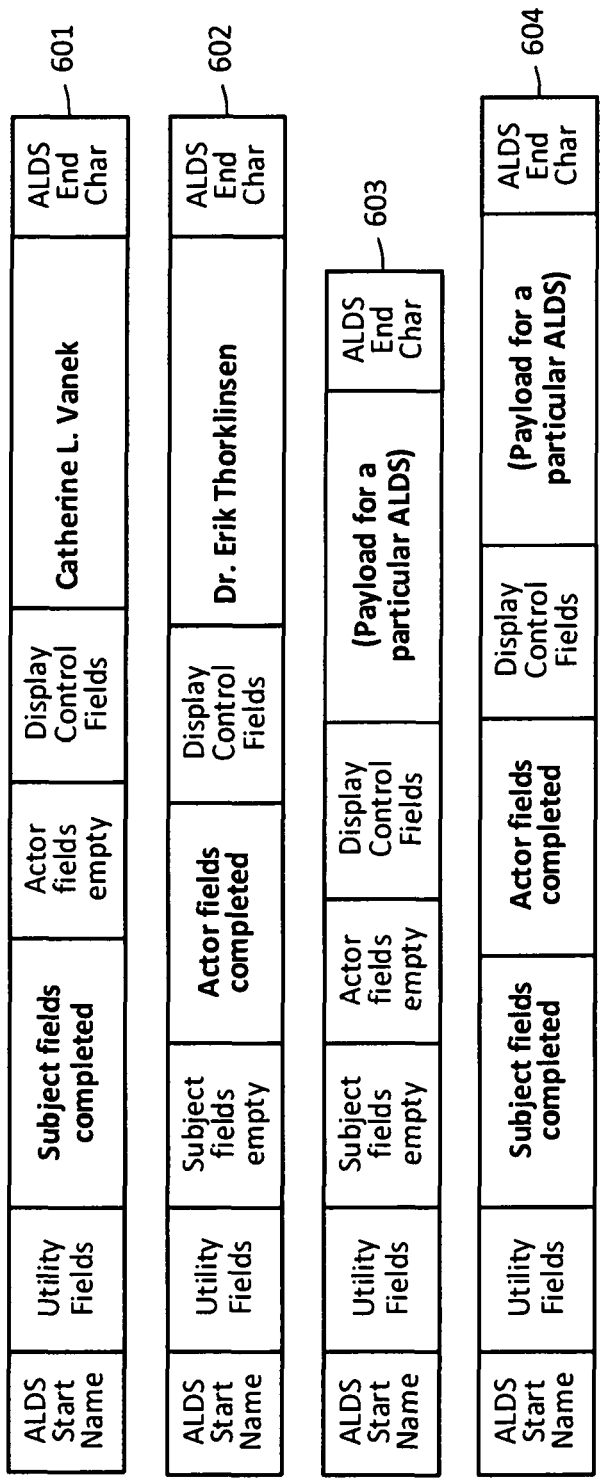
FIG. 6A is a block diagram depicting a stub record for a subject, one for an actor, one for a lexicon term payload, and the three combined to make a whole record ready for display and potential input.

FIG. 6A depicts stub records created to enable display and input of whole ALDS records. A stub record is an intentionally incomplete ALDS record stored in memory with only subject, actor or lexicon term payload data for the purpose of combining them to populate a whole ALDS record that displays for potential input. There is one stub ALDS record for each subject, each actor, and each lexicon term payload in the system. At 601 is an example subject stub record, with the subject's name in its payload. At 602 is an example actor stub record with the actor's name in its payload. At 603 is depicted a stub record with a particular lexicon term payload. At 604 is an ALDS record with a subject and an actor combined with a lexicon term payload to comprise a whole record ready for display and potential input.

Note, all fields in the Utilities Fields Sector and all pre-input fields in the Display Control Fields Sector are populated in all ALDS records, including control ALDS records, stub ALDS records, and User ALDS records.

Note, subject and actor stub records are used by the DataMgr object to form the User ALDS records at 2080, along with security permissions and synonym preferences configured there.

Figure 6B:
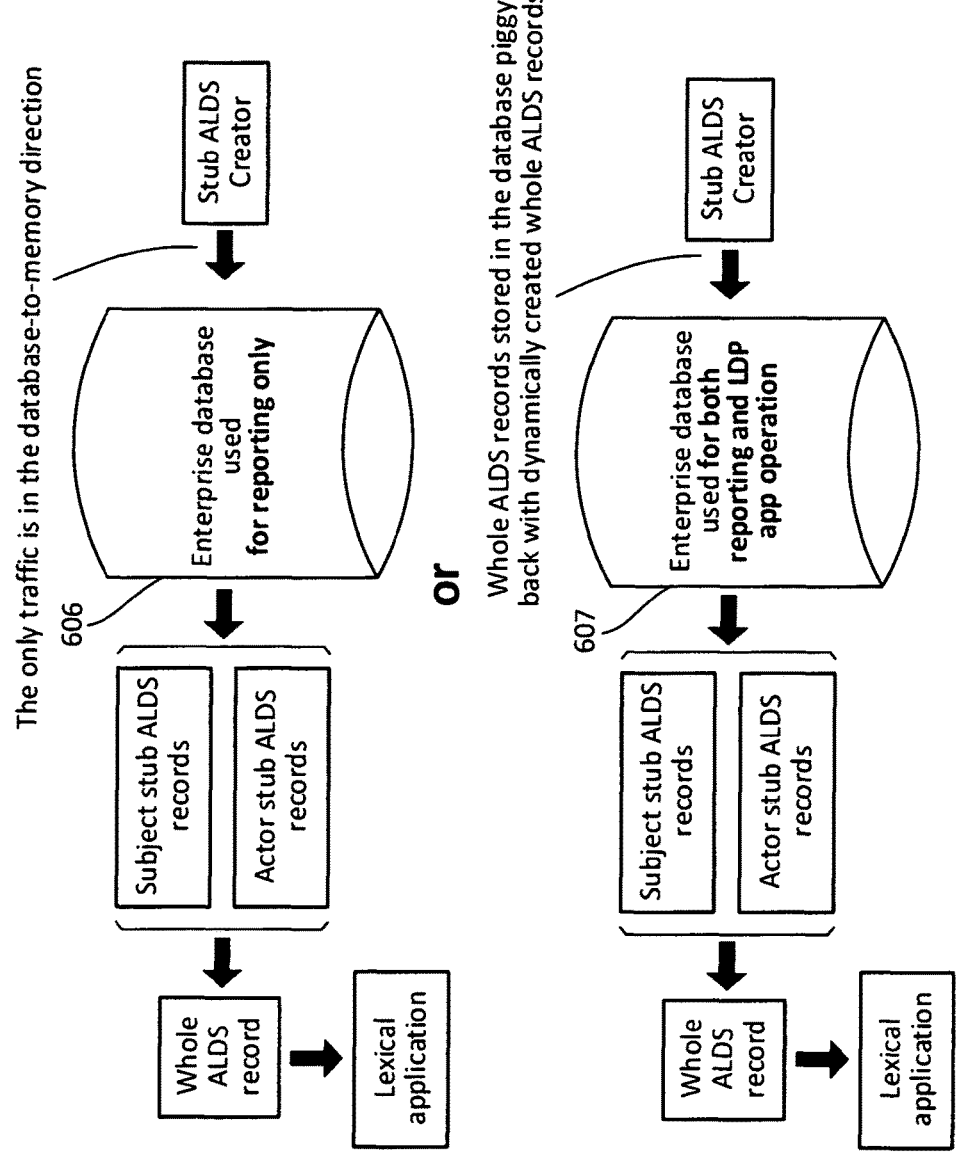
FIG. 6B is a process flow diagram depicting stub records automatically created by connection of an enterprise database to a lexical application in either of two configurations.

FIG. 6B depicts the process of creating a stub ALDS record by copying it from a database into memory, either when the system is configured reporting only at 606 by which automatically created ALDS stub records are the only database-to-memory traffic, or when the system is configured for application operation at 607 by which automatically created ALDS stub records piggy back with whole ALDS records in database-to-memory traffic. The developer sets the system to create stub records from a database using the lexical configurator at 20116.

Figure 6C:
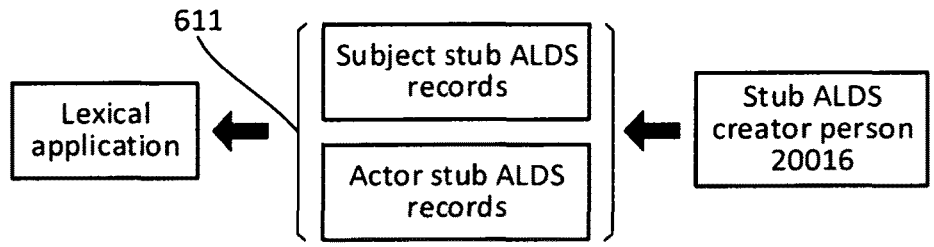
FIG. 6C is a process flow diagram depicting stub records created manually.

FIG. 6C depicts the process of creating a stub ALDS record manually without a database. If so desired for the sake of convenience, a stub ALDS record can be manually created directly in memory at 611 by the process at 20113, even when a database is configured to interoperate with the application at 20114 or 20118.

Figure 7A:
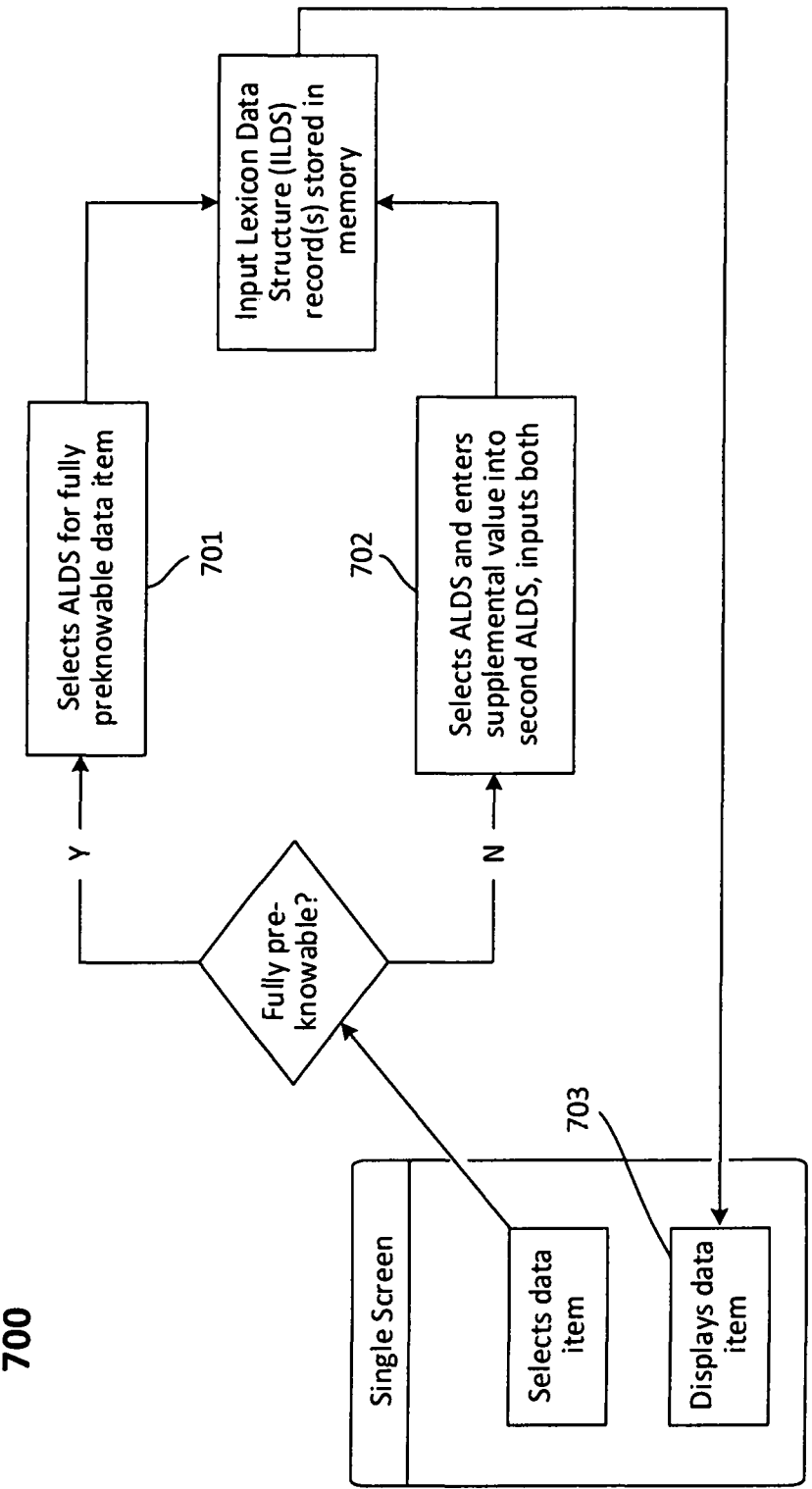
FIG. 7A is a process flow diagram depicting that the lexical application lets a user input a predefined data item as is, or add not pre-knowable data to an ALDS and then input it along with the ALDS with a predefined payload.

FIG. 7A depicts that the application lets the user input a data item that is pre-known and predefined at 701 as the ALDS payload displayed in a List Box Term row as at 1105, or input a data item that is not pre-knowable at 702 with the ALDS payload displayed as a Base Control Command component at 1112 and the supplemental data entered by the user into the Base Control Data component at 1114, with each stored in memory as a separate ILDS record. Upon input, the ILDS payload is displayed at 703 without interoperation with a database, even if one is configured to interoperate with the application at 20114 or 20118.

Figure 7B:
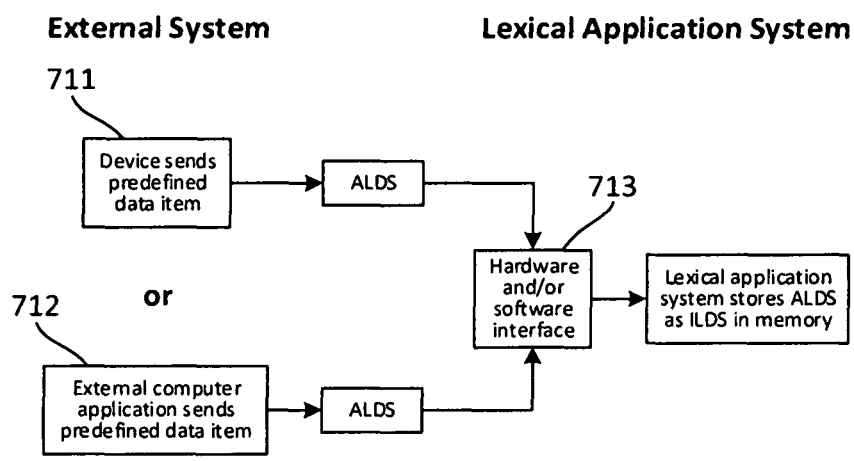
FIG. 7B is a process flow diagram depicting that external devices or computer systems can send data items in ALDS format to a lexical application for input.

FIG. 7B depicts that data can be input into the lexical application system from an external device or another computer application. At 711 a device external to the application is configured at 2023 to send a particular ALDS record upon the device entering a predetermined data state. For example, a heart monitor device sends to the lexical application system at a prescheduled time an ALDS record with the lexical term "Heart rate" in its String Field and a patient's heart reading in its Numeric Field. At 712 is a computer application external to the lexical application is configured at 2023 to do the same. For example, a scheduling application sends an ALDS record with a patient's name in its payload when a new patient is scheduled for a medical exam, whereupon the system automatically creates a subject stub record for the person as configured at 20116, whereupon the DataMgr object creates a new ILDS record for the person at 854 with the time and day of the appointment in the String Field at 356, the scheduled physician's identity in the Name Field at 321, and the site of the appointment in the Place of Service Field at 315. When a preset data state is met on an external device or another computer application and an ALDS is sent, it passes through an interface at 713 and is stored in memory as an ILDS in the lexical application system.

Figures 1, 8A:
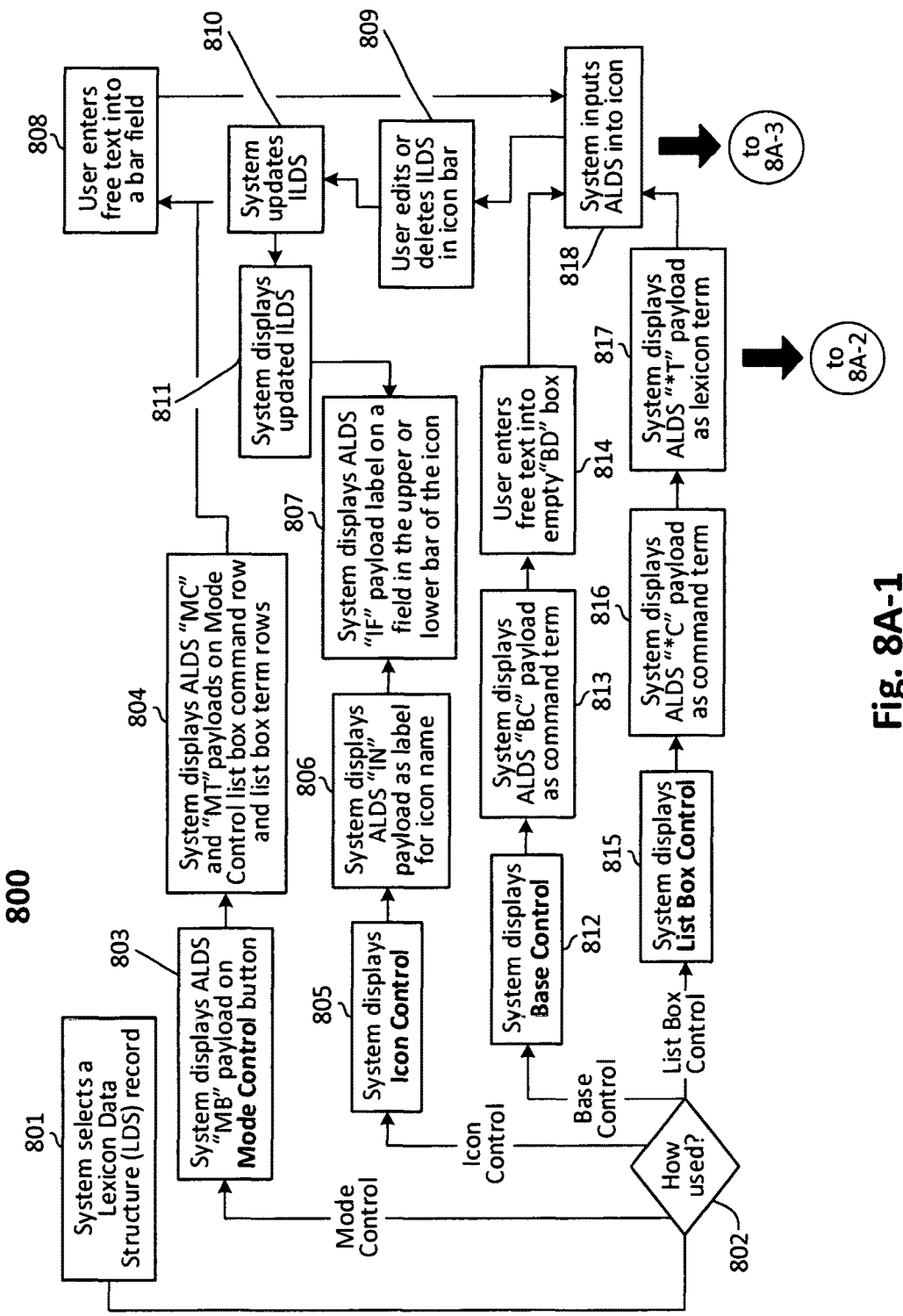
FIG. 8A is a process flow diagram depicting that ALDS record payloads populate all types of screen controls in the lexical application, and all ILDS records.
Figures 2, 8A:
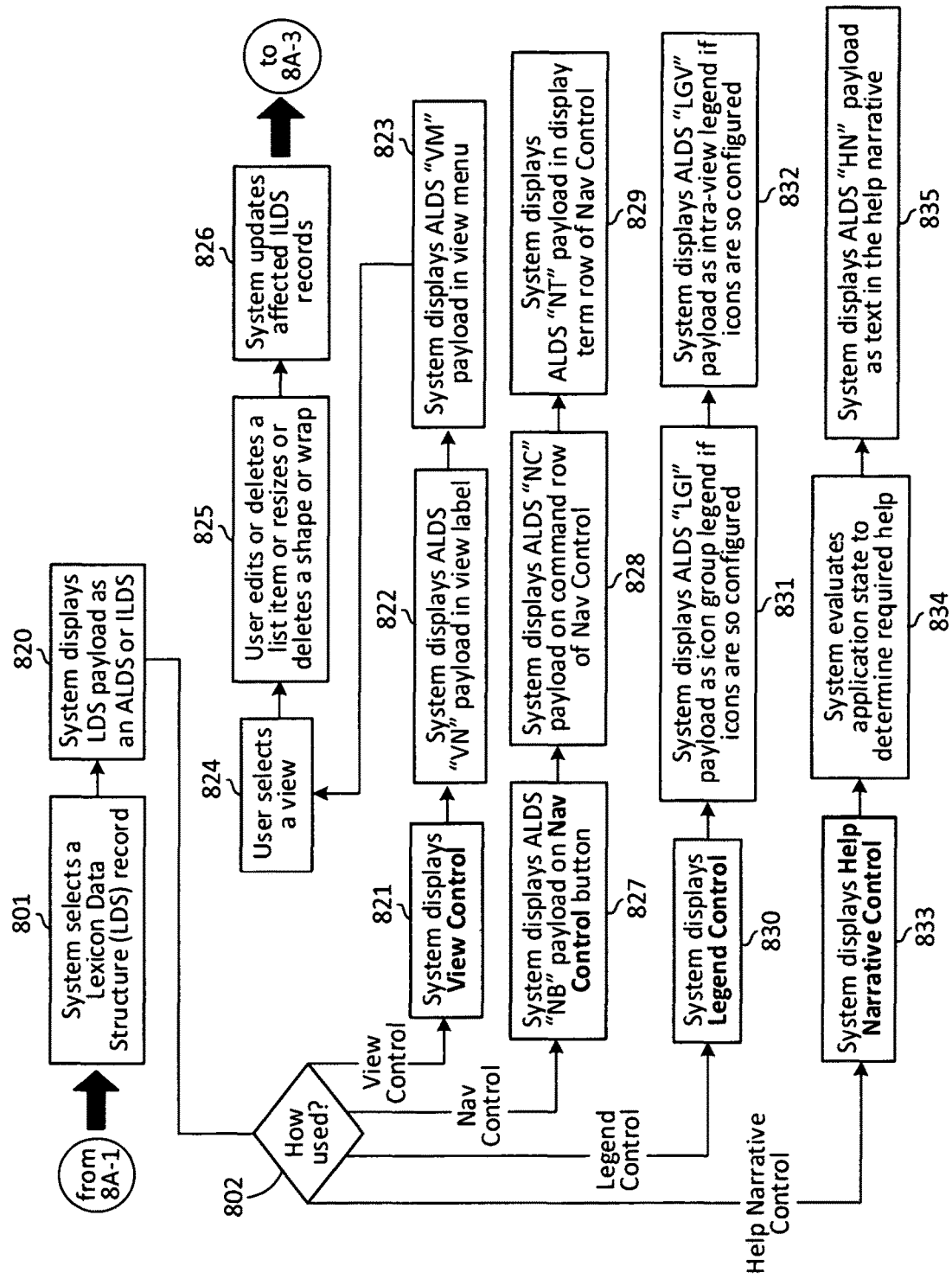
Figures 3, 8A:
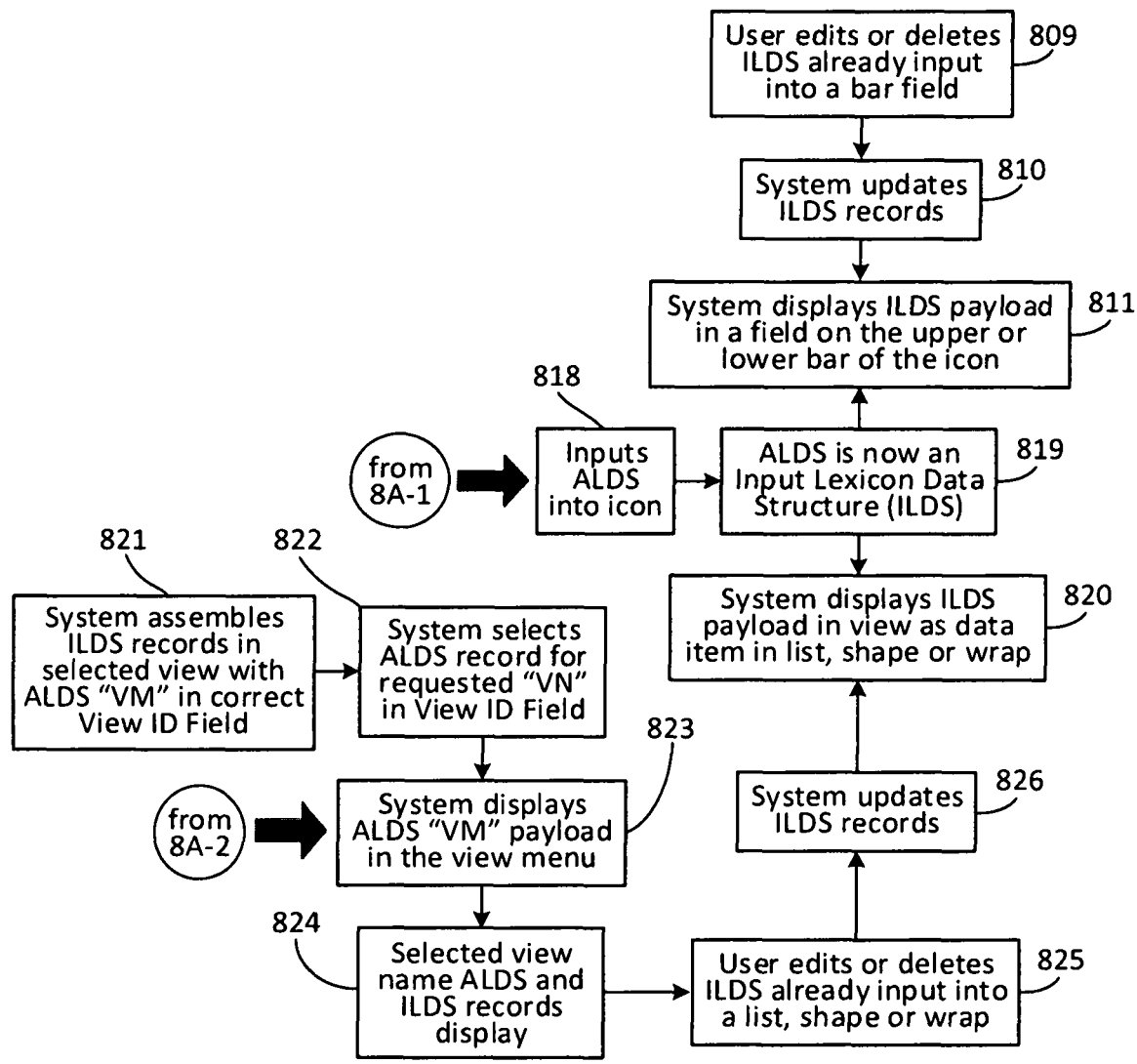

FIG. 8A depicts the process of how an ALDS record populates a screen control with its payload, or is input as an ILDS and displays its payload in an Icon Control, as designated by the contents of its ALDS Use Field at 331.

At 801, an object is called by the application to execute a function that evaluates the contents of the ALDS Use Field of ALDS records in memory, and then selects an ALDS record and displays its payload at 802.

At 803, upon the user pressing the Mode button at 1501, the DisplayMgr object assembles ALDS records containing the values "MB", "MC" or "MT". It displays the "MB" value on the Mode Button. At 804, the ModeMgr object displays the List Box Control at 1500 with the payload of the ALDS record with the value "MC" at 1502 in the Mode Command row at 1504, and the payloads of ALDS records containing the value "MT" at 1503 in the Mode Term rows at 1505.

At 805, upon the user displaying an icon or a group of icons, at 806 the IconMgr object displays the payload of the ALDS record with the value "IN" in the Icon Name Field of the icon at 902. At 807, the IconMgr object displays the payloads of the ALDS records with the value "IF" as labels on bar fields as at 914, if any, using the location identifier value configured at 2059 to determine the bar field on which to display the payload as the label. The IconMgr object also displays the empty payload of the ALDS record with the value "BR" in its ALDS Destination Field at 335 on the bar field data component at 913. At 808, the user inputs free text into the bar field data component of the bar field and displays its payload there. At 809, the user edits or deletes data contained in the payload of the ILDS record displayed in the data component of a bar field. At 810, upon editing or deleting data in a bar field at 809, the system updates the payload of its ILDS record stored in memory. At 811, the system displays the present ILDS payload in the data component of a bar field upon its initial input at 818, or upon its editing or deletion at 809.

At 812, upon the user displaying the Base Control, the DisplayMgr object assembles ALDS records containing the values "BC" and "BT". At 813, the payload of the ALDS record with the value "BC" and the desired value in the Display Map Field at 334 displays in the Base Control Command component at 1112. At 814, the user enters free text into the Base Control Data component at 1114 and it is input into the empty String Field at 356 of the ALDS record with the value "BD", which thereafter displays as the resultant ILDS record's payload. Inputs made using the Base Control results into two ILDS records, as illustrated at 1110.

At 815, upon the user requesting a List Box Control, the DisplayMgr object assembles ALDS records with the value "*C" and "*T". The asterisk ("*") is a placeholder for the value used for the desired list box variant at 1100, 1400, 1500, 1600, 1700, 1800 or 1900. At 816, upon displaying a List Box Control, the payload of the ALDS record with the value "*C" at 1102 displays in the List Box Command Term row as at 1104.

At 817, upon the user displaying a List Box Control, the payloads of ALDS records containing the value "*T" at 1103 display as a List Box Term row at 1105 in the order of the value in the ALDS Order Field of each at 339.

At 818, an ALDS record is input by typing or dictating into an Icon Control bar field at 808, or by typing or dictating into a Base Control Data component and selecting "Enter" at 814, or by selecting or dictating an ALDS payload value in a List Box Term row at 817.

At 819, upon input of an ALDS record, the system enters its location into its ILDS Location Field at 342 and thereby transforms it into an ILDS record by changing the values in its Start Name and End Char from "A" at 361 and 363 to "I" at 371 and 373.

Note, the ILDS Location Field is empty in an ALDS record until it has been input.

At 820, the system displays the ILDS payload upon its input at 818, or its editing or deletion at 809 or 825.

Note, a deleted ILDS payload is in effect displayed by its absence from the view that had previously displayed it.

At 821, upon the user selecting a view at 1011, the DisplayMgr object assembles ILDS records containing the requested view's identification in the View Identification Field at 333.

At 822, upon the user displaying a view at 1011, the payload of the ALDS record with the selected View Identification value and with the value "VN" displays in the View Name tab at 905.

At 823, upon the user displaying a view, the IconMgr sets focus to (highlights) the payload in the selected ALDS record containing the value "VM" in the selected View Name row in the View Menu list box at 1003.

At 824, upon the user selecting a View Name in the View Menu, the selected view displays in the icon, as at 1011.

At 825, the user edits a list data item, shape data item or wrap data item either deleting it or by resizing it.

At 826, upon deleting or resizing a view data item at 825, the system updates affected ILDS records stored in memory.

At 827, the system displays the payload of the ALDS record containing the value "NB" on the Nav button at 1401.

At 828, upon the user pressing the Nav Button, the DisplayMgr object displays the payload of the ALDS record with "NC" at 1402 in the Nav Command row at 1404.

At 829, upon display of the Nav Control list box, the DisplayMgr object displays the payloads of ALDS records with the value "NT" at 1403 in the Nav Term rows at 1405 in the order of the values contained in the ALDS Order Field at 339.

At 830, upon display of an icon or a group of icons as at 1410, the DisplayMgr object assembles ALDS records containing the value "LGI" and "LGV".

At 831, upon display of a group of icons as at 1417, the DisplayMgr object evaluates the icons and displays the payload of the ALDS record with the value "LGI" (for Legend Icon) as a legend beneath the group of icons, if the icons are so configured at 2064.

At 832, upon display of a view within an icon as at 1414, the DisplayMgr object evaluates view data item ILDS records in the icon and displays the payload(s) of the ALDS record(s) with the value "LGV" (for Legend View) as legend(s) above the designated view data item(s), if the icon is so configured at 2064.

At 833, upon any change of display on the screen, the DisplayMgr object assembles ALDS records with the value "HN".

At 834, the HelpMgr object evaluates the controls displayed on the screen and identifies particular HN ALDS records to display by the method at 1211 or 1221 as configured at 2065.

At 835, upon evaluation of a screen display, the payload of the ALDS record with "HN" displays as the first of the identified Help Narrative text blocks from the ALDS records designated for the group of displayed icons.

Figure 8B:
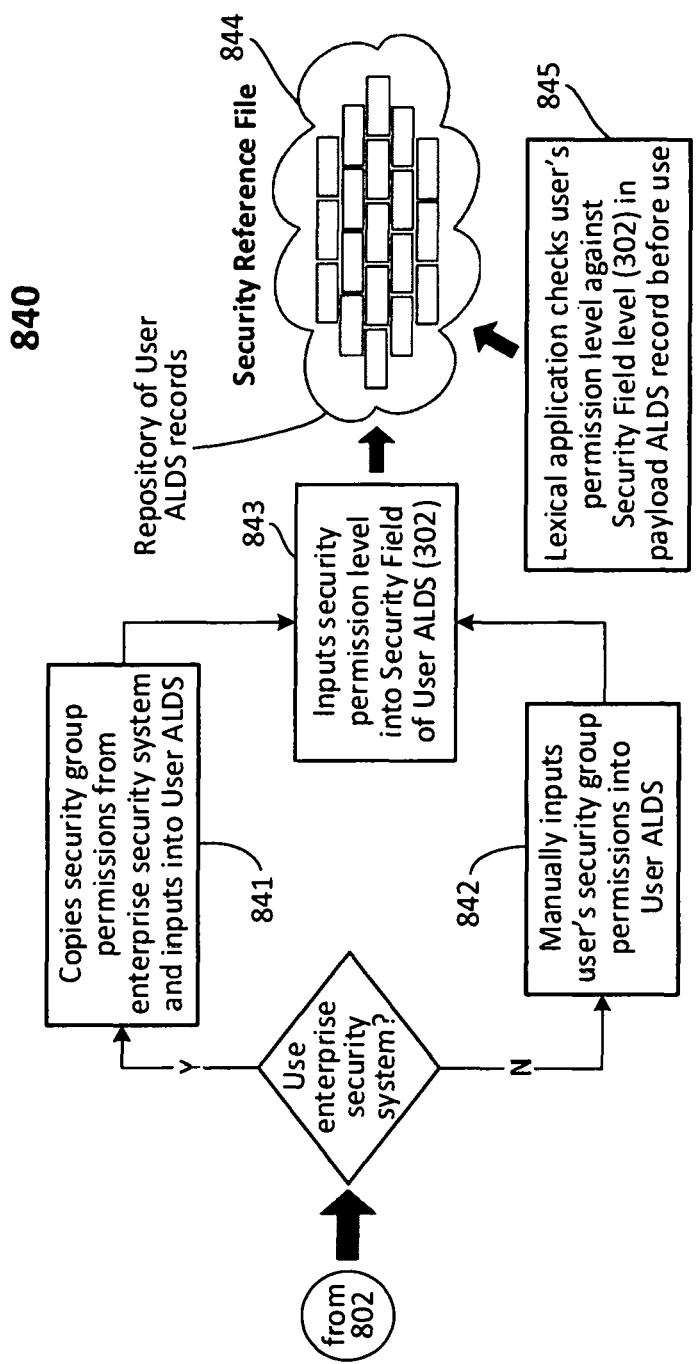
FIG. 8B is a process flow diagram depicting that the lexical application has an internal ALDS-based security subsystem that interoperates with an enterprise security system, if any.

FIG. 8B depicts that the application has an internal security subsystem operated using ALDS records.

At 841, if the application is configured to interoperate with an enterprise security system, security permissions for a user are copied from the enterprise security system and automatically input into the user's User ALDS record as configured at 2082.

At 842, if the application is not configured to interoperate with an enterprise security system, security permissions are input directly into a User ALDS record in memory at 2083.

At 843, the security permission is input into the user's User ALDS record.

At 844, the User ALDS records of all active application users are stored in memory.

At 845, upon the moment of display of an LDS, the system compares the contents of the Security Field in ALDS records to be displayed to that in the user's User ALDS record and proceeds accordingly as follows: (1) displays the LDS payload and lets the user input or delete it if the user's User ALDS record contains the value "W" for read-write access, or (2) displays the LDS payload record but does not let the user input or delete it if the user's Security ALDS record contains the value "R" for read-only access, or (3) does not display the LDS payload if the user's User ALDS record contains the value "N" for no access.

Figure 8C:
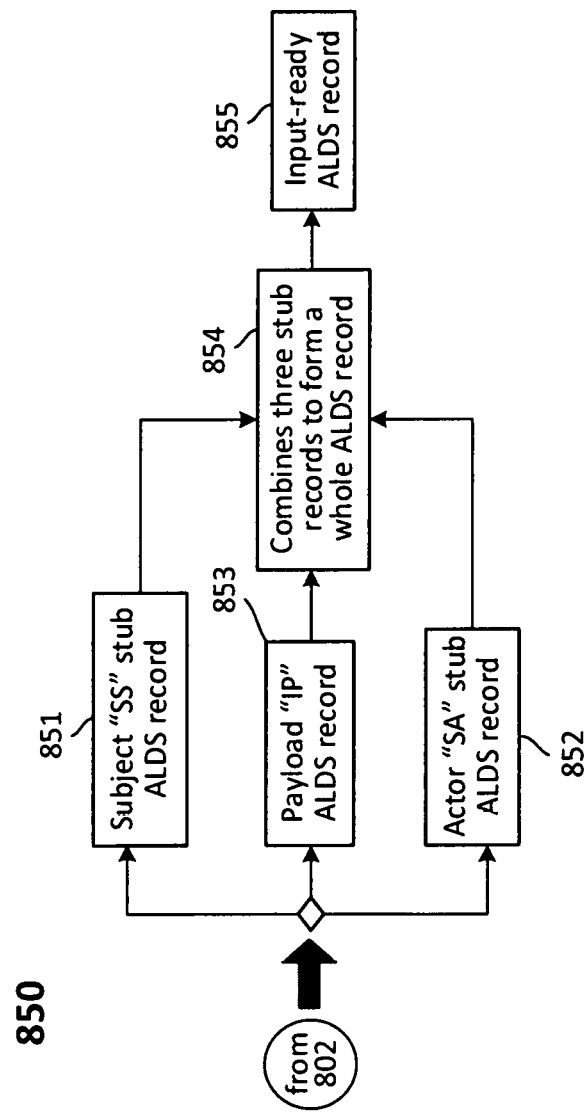
FIG. 8C is a process flow diagram depicting that an input-ready whole ALDS record is made by combining subject and actor stub ALDS records with a payload ALDS record.

FIG. 8C depicts the process of creating a whole record for potential input into the application.

At 851 there is a subject stub record that contains the value "SS" in its ALDS Use Field.

At 852 there is an actor stub record that contains the value "SA" in its ALDS Use Field.

At 853 there is a payload ALDS record with one of these values in its ALDS Use Field: "BD" for bar field data, "LT" for generic list box term, "OT" for On Behalf Of Mode list box term, "ST" for Scoring Mode list box term, "CT" for Messaging Mode list box term, "VT" for Verify Mode list box term, and "BD" for Base Control Data component.

The subject ALDS data and actor ALDS data are combined with the payload data from an ALDS record with any of the Use Field values at 853, whereby a whole ALDS record is formed and ready for input and display as an ILDS at 855.

Figure 8D:
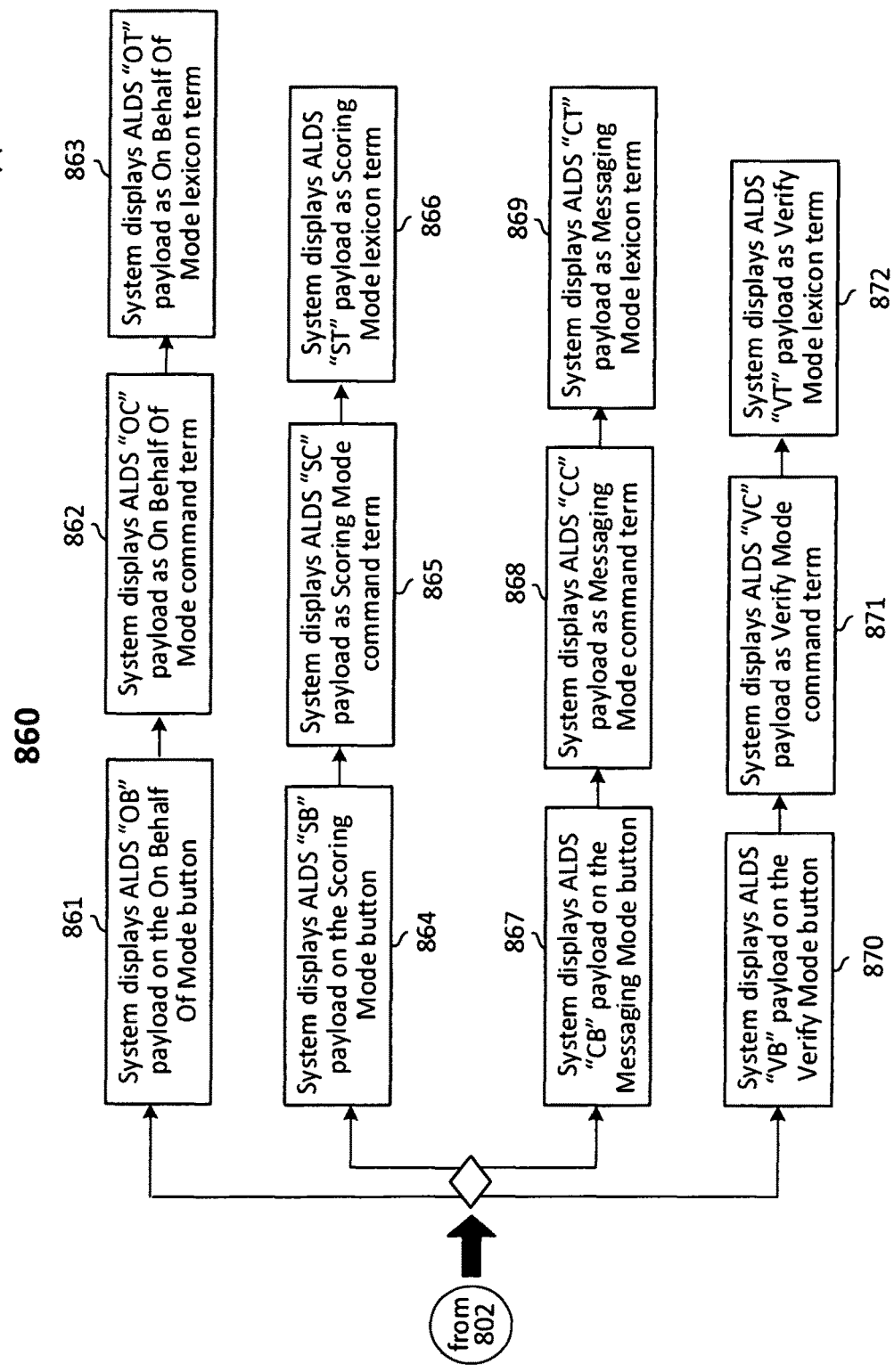
FIG. 8D is a process flow diagram depicting that ALDS record payloads populate screen controls used for four special modes of lexical application operation.

FIG. 8D depicts the process by which four special application operation modes in the preferred embodiment are operated by values in the Use Field of ALDS records used in special application operation modes. At 861 the ALDS record with the value "OB" in its ALDS Use Field displays in the On Behalf Of button. At 862 the ALDS record with the value "OC" in its ALDS Use Field displays in the OBO Command row. At 863 the ALDS record with the value "OT" in its ALDS Use Field displays in the OBO User row. At 864 the ALDS record with the value "SB" in its ALDS Use Field displays in the Scoring Mode button. At 865 the ALDS record with the value "SC" in its ALDS Use Field displays in the Scoring Command row. At 866 the ALDS record with the value "ST" in its ALDS Use Field displays in the Scoring Term row. At 867 the ALDS record with the value "CB" in its ALDS Use Field displays in the Msg Mode button. At 868 the ALDS record with the value "CC" in its ALDS Use Field displays in the Msg Command row. At 869 the ALDS record with the value "CT" in its ALDS Use Field displays in the Msg Term row. At 870 the ALDS record with the value "VB" in its ALDS Use Field displays in the Verify Mode button. At 871 the ALDS record with the value "VC" in its ALDS Use Field displays in the Verify Command row. At 872 the ALDS record with the value "VT" in its ALDS Use Field displays in the Verify Term row.

Figure 9A:
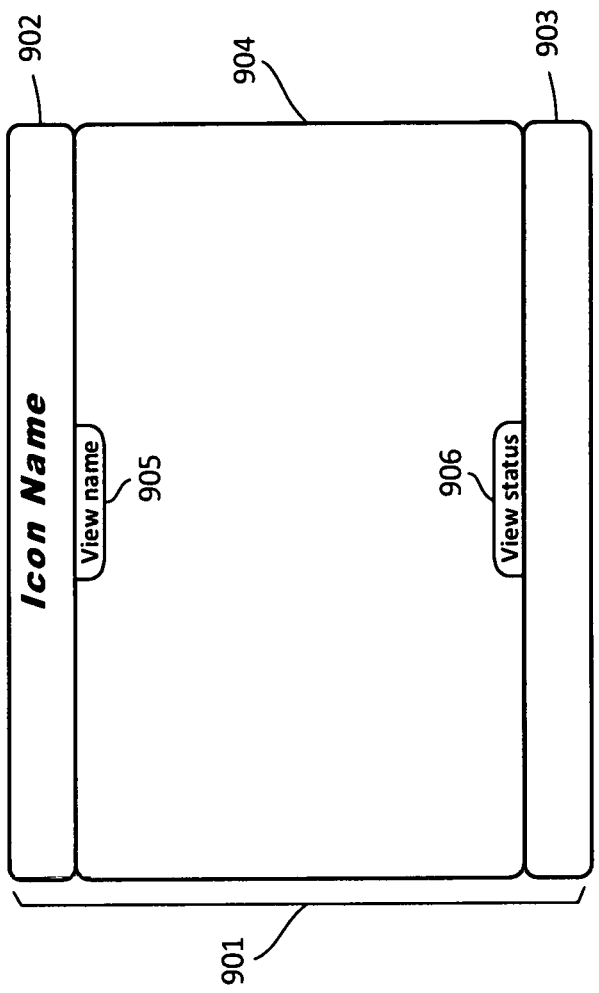
FIG. 9A is a mockup illustration of the lexical application graphical Icon Control and its components.

FIG. 9A illustrates the Icon Control and its components in the preferred embodiment of the invention. At 901 is the whole Icon Control, with the upper bar at 902 that displays the icon name to identify the icon type configured at 2053. At 903 is the icon's lower bar. The two icon bars contain fields configured at 2058 through 2061. At 904 is the view panel configured at 2054 through 2056 to display data items input into it. At 905 is the view panel name tab. At 906 is the view panel status tab configured to display or not display at 2057.

Note, alternative embodiments of the invention have no bars, one bar or any number of bars on the Icon Control.

Figure 9B:
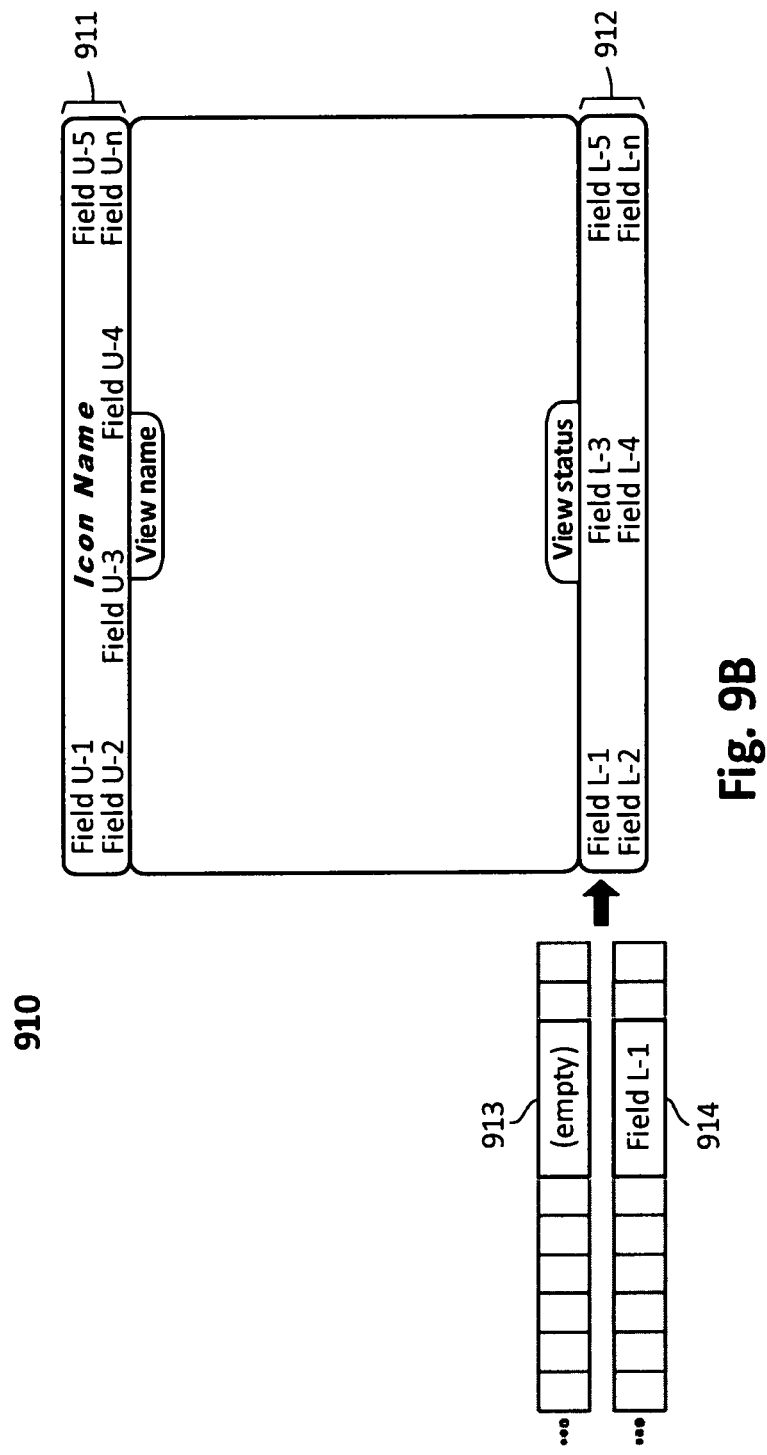
FIG. 9B is a mockup illustrating that the upper and lower bars of the Icon Control can contain statically located fields, and that each bar field has two ALDS records.

FIG. 9B illustrates the Icon Control configured with a plurality of fields in static locations on its upper and lower bars at 911 and 912. The data component of the bar field is connected to an ALDS record with an empty payload at 913 as configured at 2060. If the bar field is configured at 2061 to display a label, it is connected to an ALDS record containing a payload displayed as the label at 914.

Figure 9C:
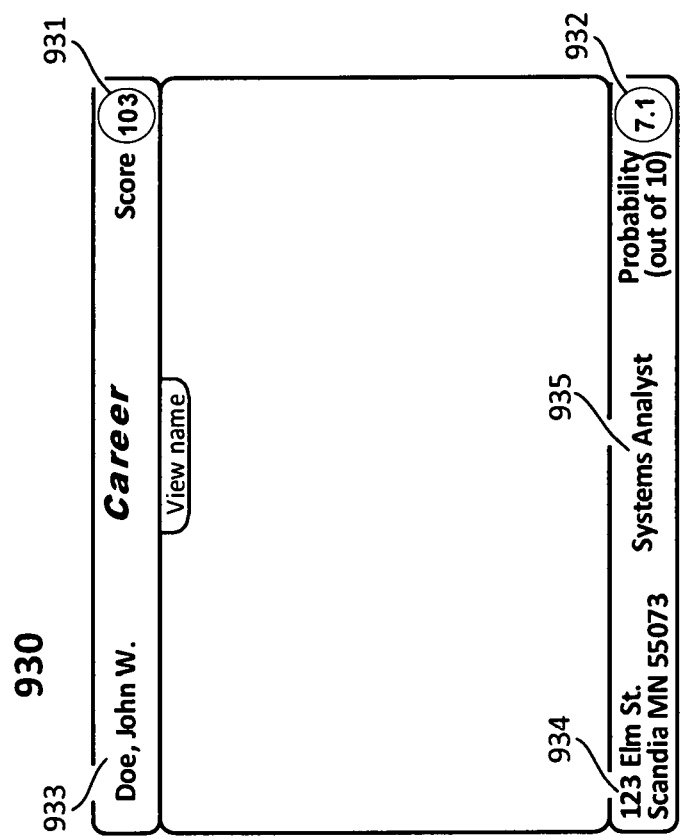
FIG. 9C is a mockup illustrating that Icon Control bar fields can either display data input by a user or display output derived from data contained within the icon.

FIG. 9C shows in a staffing example a Career Icon configured with its bars displaying two types of fields. The fields at 931 and 932 display data derived from ILDS records within the icon. Derived data fields display data contained in fields in the present icon and in icons beneath the present icon in the icon type's hierarchy, as at 1050. For example, the score at 931 of the example Career Icon is based on data in scored fields in Job Icons below it in the icon hierarchy. The fields at 933 through 935 display data entered by the user directly, for example start and end dates of a job, the name of a patient, the workplace location of an employee, etc.

Figure 9D:
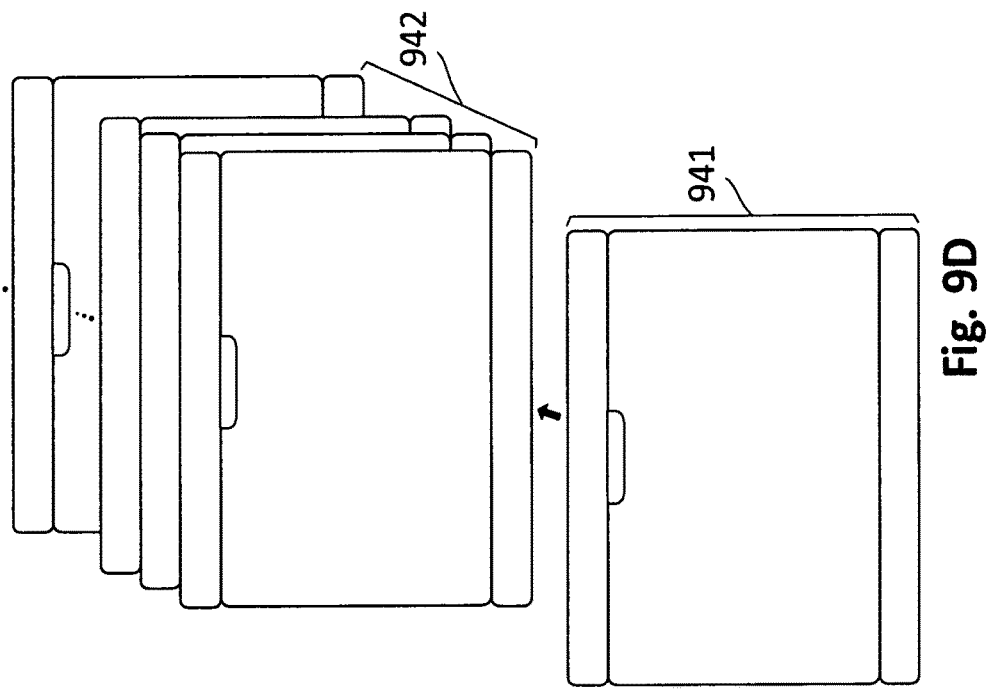
FIG. 9D is a mockup illustrating that an Icon Control displays icon(s) beneath it in the icon type hierarchy.

FIG. 9D illustrates that the Icon Control at 941 contains a plurality of icons at 942 in the level beneath it in the icon type's hierarchy. An icon type's position in the application's icon hierarchy is set by a developer at 2063. One or a plurality of icon types can be set in the IconMgr object to display at a specified level in an icon hierarchy. To take a staffing example, a Career Icon type and an Education & Training Icon type are configured to display at the same level of the icon hierarchy, with the Job Icon type configured to display in the hierarchy level beneath them, and the Assignment icon type is configured to display in the level beneath a Job Icon. The user double-clicks the Career Icon to display one icon for each job in a person's career, and double-clicks a Job Icon to display one icon per assignment the person had in a job, if any. At least one icon must be input into a hierarchy level in order for that level to display.

Figure 10A:
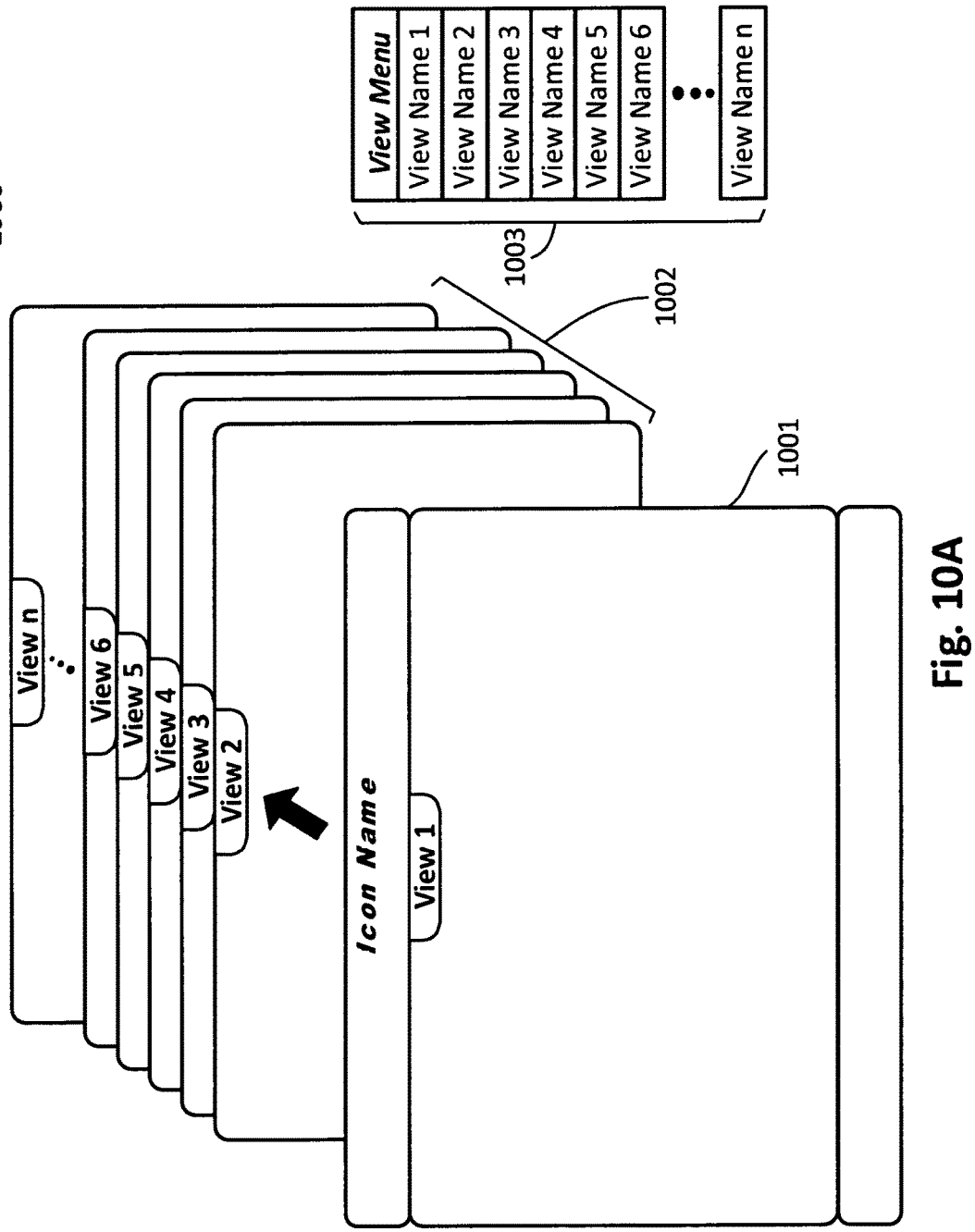
FIG. 10A is a mockup illustrating that the Icon Control has a plurality of view panels to display ILDS payloads, and a menu of views available for an icon type.

FIG. 10A illustrates that an icon type contains a plurality of views, one for each logical category of content made available within an icon type as configured at 2054. At 1001 an icon type has a default view displayed in the panel between its upper and lower bars. At 1002 there is a set of other views available for display. Views are uniform throughout an icon type's hierarchy. In the preferred embodiment of the invention, a particular view within an icon type displays ILDS payloads in either the list display format or the shape/wrap display format. At 1003 a list box of views next to the icon called the View Menu displays a list of View Names.

Figure 10B:
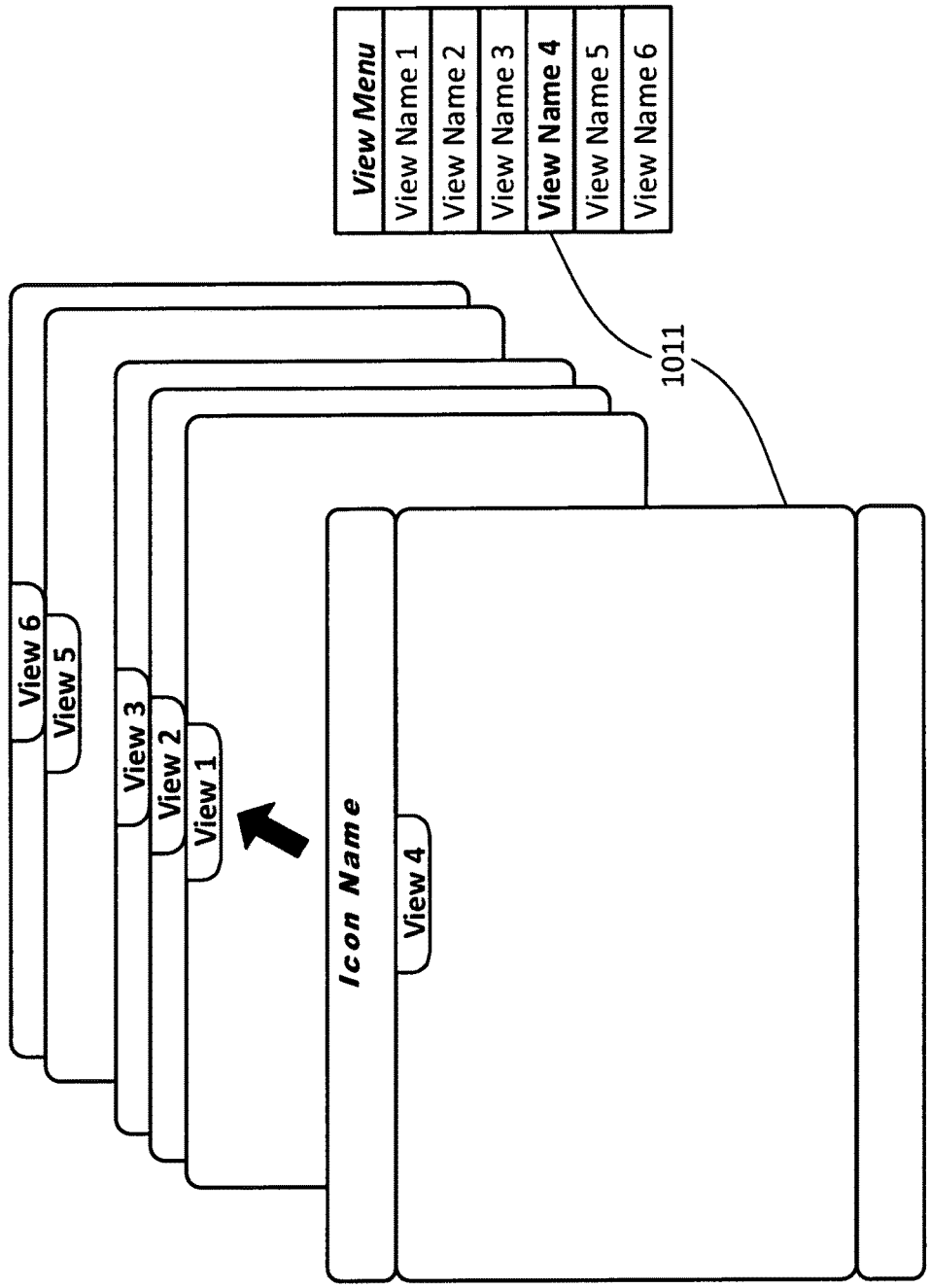
FIG. 10B is a mockup illustrating that the user can use the View Menu to navigate between views available in an icon.

FIG. 10B shows at 1011 that to display a view other than the one presently displayed the user selects a different View Name in the View Menu. The View Name of the presently displayed view is highlighted in the View Menu, as with View 4 at 1011.

Note, the present view displayed marking used in this mockup is for comprehension purposes only; a software product based on this invention may use a color or another display property to mark the presently displayed view in the View Menu.

Figure 10C:
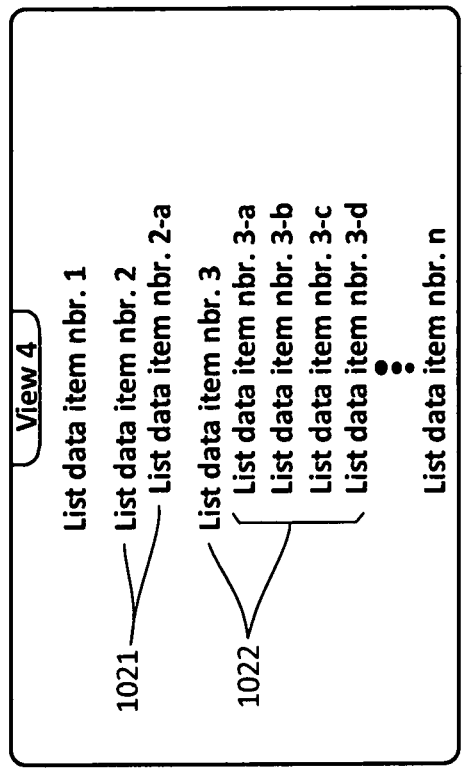
FIG. 10C is a mockup illustrating a view displaying ILDS payloads list format, and that a list data item ILDS payload can display subsidiary list data item ILDS payloads can be related to a main list data item ILDS payload.

FIG. 10C shows that the user can input one or a plurality of list data items into a view, and can input one or a plurality of list data items as subsidiary to a main list data item. The system identifies a list data item by automatically assigning it a List Identification number at 340. The user sets focus to (highlights) the an input list data item, then either selects the Relate command or dictates "Relate", and inputs the related (subsidiary) list data item, which is displayed indented beneath the first list data item as at 1021 and 1022, thereby rendering the first list data item as the main item. The system automatically generates a group number unique to the view and inputs it into the ILDS Group Field at 341 of each ILDS related record. The letter "M" is appended to the main item number, and "S" to a subsidiary item number. If there is a plurality of subsidiary items as at 1022, the system appends an ordinal number to the right of the "S" to specify the subsidiary item's place in the indented list. For example, in the group at 1022, the main item is number 03M and its subsidiary items are numbers 03S1, 03S2, 03S3 and 03S4.

Figure 10D:
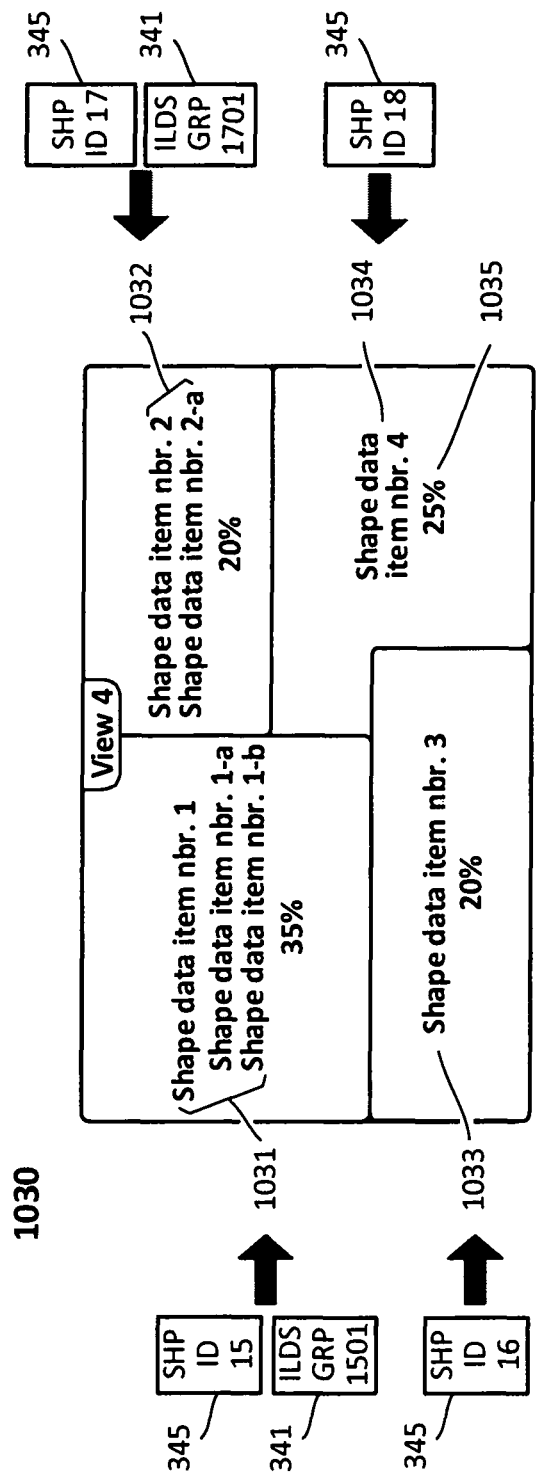
FIG. 10D is a mockup illustrating a view displaying ILDS payloads in shape format, and that shape data item ILDS payloads can be displayed subsidiary to a main shape data item ILDS payload.

FIG. 10D shows that the user can input one or a plurality of shapes in a view, and one or a plurality of shape data items within a shape, as at 1031 through 1034. The system identifies a shape data item by an automatically assigned Shape Identification number at 345 that is unique to the view. Also shown at 1031 and 1032 is that one or a plurality of shape data items can be input as subsidiary to a main shape data item related by the ILDS Group Field at 341. The user sets focus to (highlights) an already input shape data item, then either selects the Relate command or dictates "Relate", and inputs the related (subsidiary) shape data item(s), thereby making the first shape data item a main item, and its subsidiary shape data item(s) display indented beneath the main data item as at 1031 and 1032, using the same group numbering system as at 1020. The plurality of shape data items within a single shape are defined by sharing a common value in the Shape Identification Map Field at 347. The percentage a shape covers of the total display area it is in is automatically calculated and displayed, as at 1035.

Figure 10E:
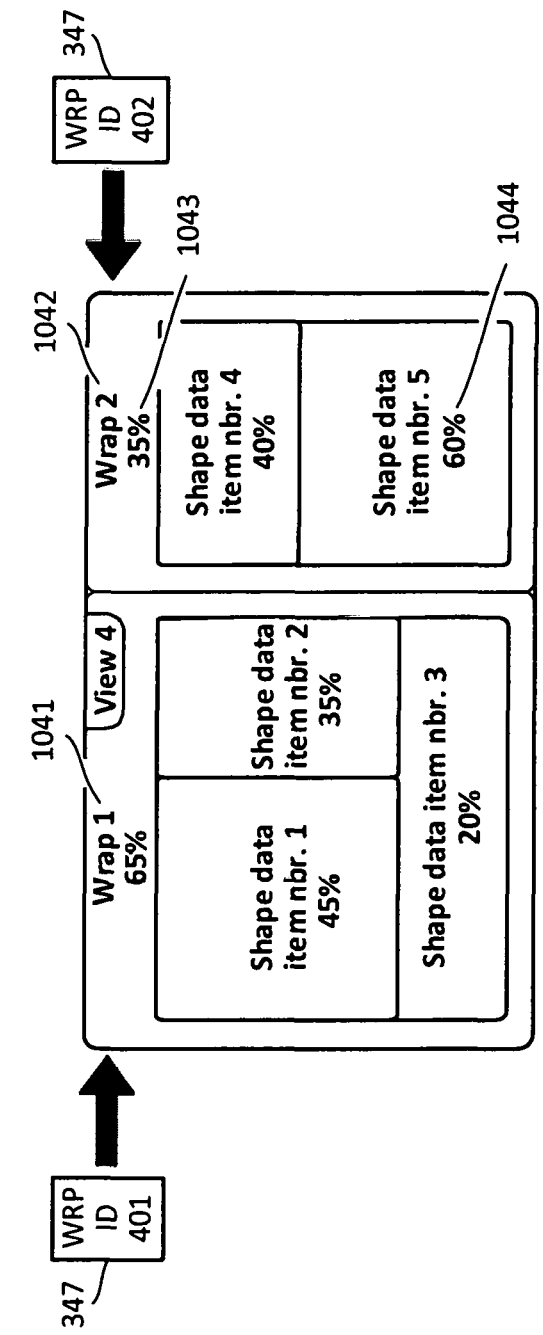
FIG. 10E is a mockup illustrating a view displaying ILDS payloads in shape/wrap format, and that shape data item ILDS payloads can be grouped within a wrap ILDS payload.

FIG. 10E shows that the user can input one or a plurality of wrap data items at 1041 and 1042 to envelop a plurality of shape data items in a view. The system identifies a wrap by automatically assigning it a Wrap Identification number at 348 that is unique to the view. The user sets focus to (highlights) one or more shape data items, then either selects the Wrap command or dictates "Wrap", and inputs the wrap data item to envelope the shape data items. The percentage a wrap covers of the total display area it is in is automatically calculated for each wrap and displayed, as at 1043.

Any LDS record with "SH" in its ALDS Use Field can be input as a wrap ILDS, whereupon the value "WR" is automatically input into that particular ILDS record's ALDS Use Field at 331, and the Shape Identification Field and Shape Percentage Field are made empty and the Wrap Identification Field and Wrap Percentage Field are populated with data. By this process any shape data item can be made into a wrap data item.

Figure 10F:
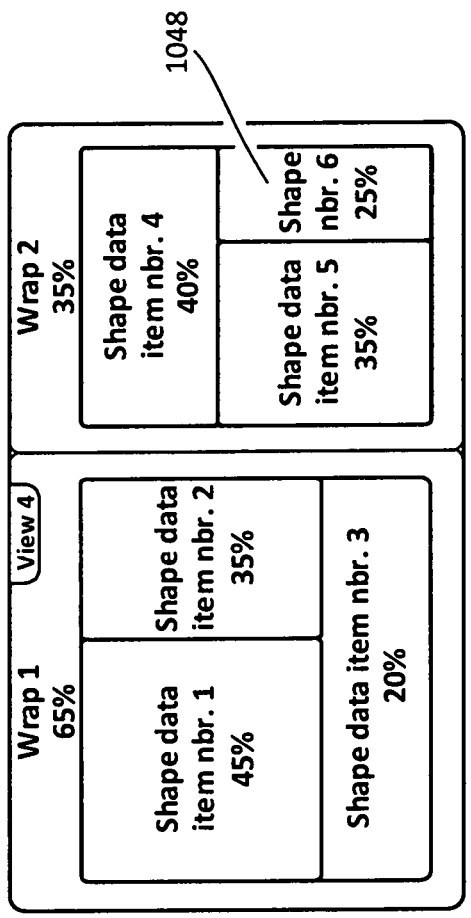
FIG. 10F is a mockup illustrating that the user can resize a shape data item ILDS payload in a view, and thereby the other shape data item ILDS payloads in the view.

FIG. 10F illustrates that upon input of a plurality of shape data items, the user can resize them by setting focus to a shape's edge and dragging it, or by setting focus to a shape by dictating its payload and then dictating its percentage, whereupon the Shape Percentage Field at 346 in the ILDS records of the resized shapes are updated at 1046.

When a plurality of shapes are input in succession without resizing, each is assigned an equal percentage of the display area by default, as at the left view in this illustration that displays "50%" for the Blue shape and "50%" for the Red shape. For example, if four shapes are input in sequence without resizing, each by default covers a quarter of the display area and is assigned "25%" in their Shape Percentage Fields and displays each shape as that.

Figure 10G:
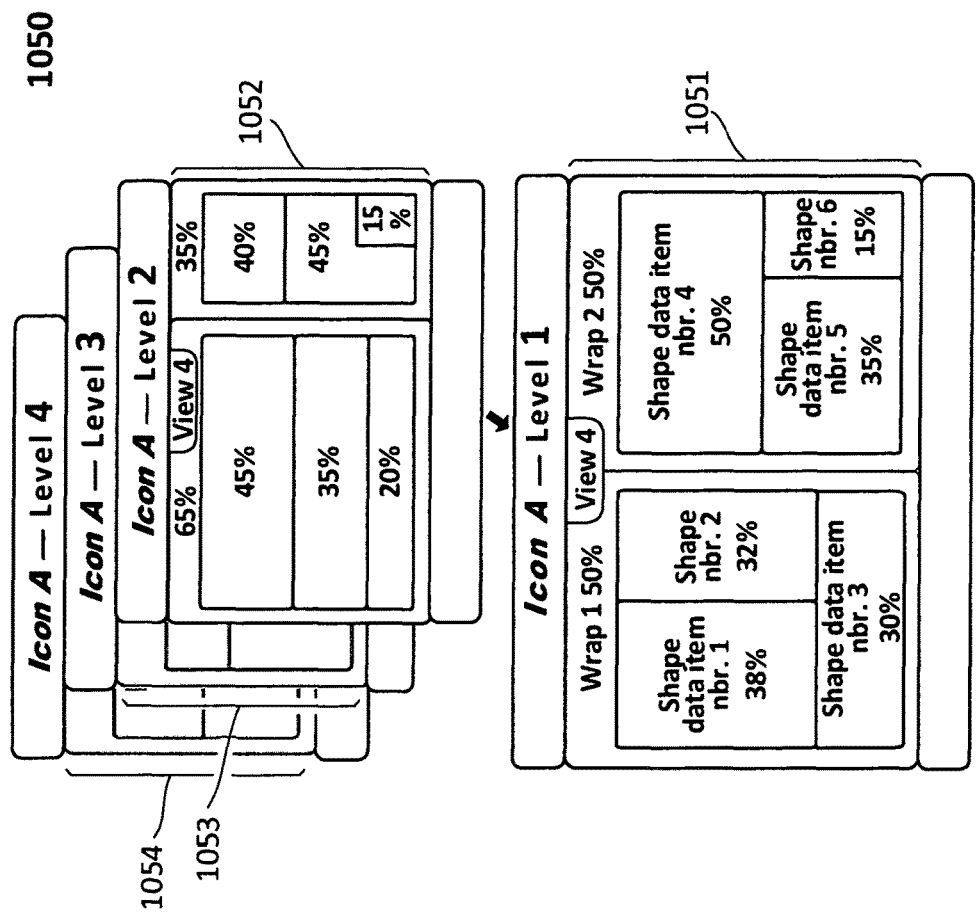
FIG. 10G is a mockup illustrating that the user can resize a wrap data item ILDS payload in a view, and thereby the shapes data item ILDS payloads within the resized wraps.

FIG. 10G illustrates that upon input of a plurality of wrap data items, the user can resize them by setting focus to a wrap's edge and dragging it (or by setting focus to a wrap by dictating its payload and then dictating its percentage), whereupon the Wrap Percentage Field at 349 in the ILDS records of the resized wraps are updated at 1047. When a wrap is resized, the percentages of the shapes within it remain the same because the Shape Percentage Fields display the percentage each shape covers within the wrap display area, not the percentage each shape covers of the Icon Control view.

When a plurality of wraps is input in succession without resizing, each is assigned an equal percentage of the view display area by default, as at the left view in this illustration that displays "50%" for Wrap 1 and "50%" for Wrap 2. For example, if four wraps are input in sequence without resizing, each by default covers a quarter of the view display area and is assigned the value 25% in their Wrap Percentage Fields and displays each wrap as that.

Note, when a wrap is resized its percentage is updated, but the shapes within it are not updated because the percentage defines the percentage of the wrap, not the total area each shape covers of the total display area of the view panel.

FIG. 10H shows at 1048 that when the DisplayMgr object determines that the display space required by the full length payload of an ILDS payload exceeds available display space (i.e., it is too long), it instead displays the payload of an alternative ALDS record with an abbreviated payload that will fit. ALDS records containing abbreviated payloads are members of a particular group of ALDS records defined by the Abbreviation Map Field at 353; there is one ALDS record for each abbreviation payload configured at 2030.

FIG. 10I shows at 1051 that the contents of a particular view panel in a higher level view are aggregated from the same view in one or a plurality of icons below it in the icon type's hierarchy level, as at 1052 through 1054.

Figure 11A:
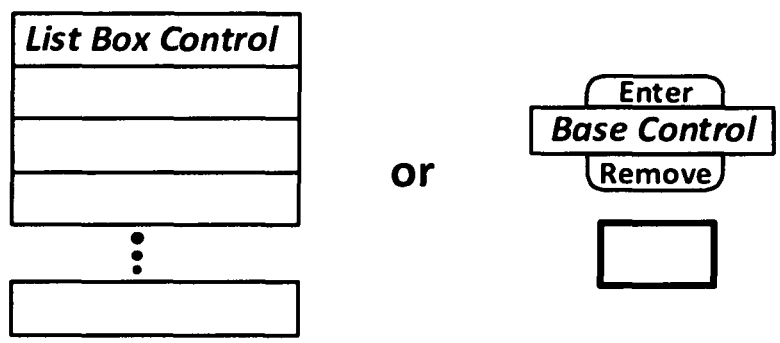
FIG. 11A is a mockup illustration of the List Box Control and the Base Control.

FIG. 11A shows that there are two controls through which a data item is entered into the application, either the List Box Control or the Base Control.

Note, data is input into a bar field by typing or dictating a payload into it without use of the List Box Control or the Base Control.

Figure 11B:
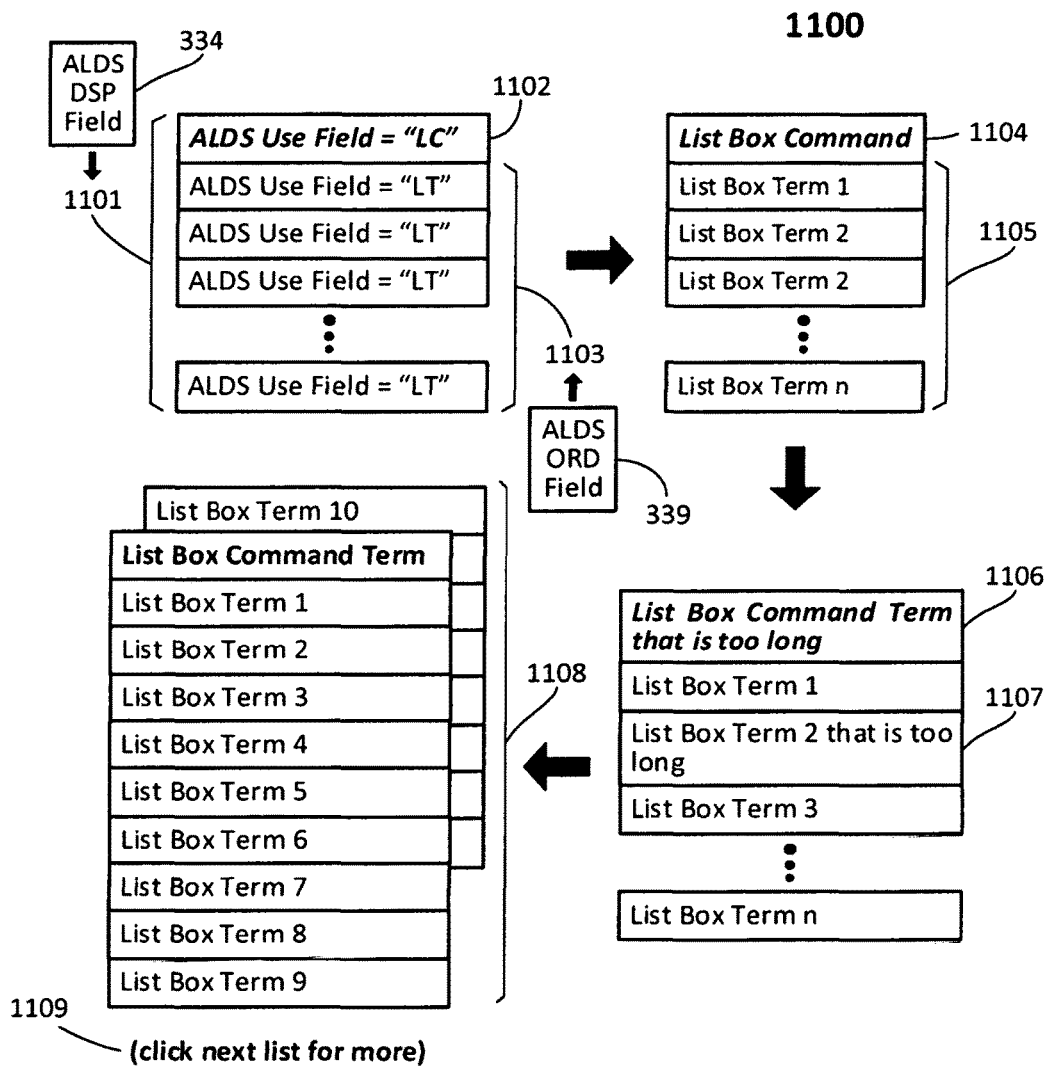
FIG. 11B is a mockup illustration of the components of the List Box Control, and that list box row text is rolled and/or lists are stacked when display space is otherwise insufficient.

FIG. 11B depicts the components of the List Box Control. At 1101, to display a list box the ListBoxMgr object collects a set of ALDS records defined to comprise rows in a list box by a common value in the ALDS Display Map Field at 334. The payload of the ALDS record with "LC" in its ALDS Use Field at 1102 displays in the List Box Command row at 1104; this row is for user advice only, it is not for potential input. The payloads of ALDS records with "LT" in the ALDS Use Field at 1103 display in List Box Term rows at 1105; these rows are for potential input. List Box Term rows display in the order specified for each in the ALDS Order Field at 339. There is a variable number of List Box Term rows depending on the number of records returned from the search at 1101.

Note, this illustration is for a generic list box at 1100. The ALDS Use Code value pairs for the Nav Control list box are "NC" and "NT" at 1400, Mode Control list box are "MC" and "MT" at 1500, On Behalf Of Mode list box are "OC" and "OT" at 1600, Scoring Mode list box are "SC" and "ST" at 1700, Messaging Mode list box are "CC" and "CT" at 1800 and Verify Mode list box are "VC" and "VT" at 1900. As with the List Box Command row Use Value of "LC" for the generic list box at 1100, the list box command rows with the value "*C" in their ALDS Use Fields for the six specialized list box variants at 1400 through 1900 are for user advice only, and are not for potential input.

There are parameters in the ListBoxMgr object configured at 2085 that sets a maximum width and a maximum height for all list boxes in the system. At 1104 and 1105, none of the ALDS payloads exceeds the maximum width and all display on a single line within their rows. 1106 displays a payload in a List Box Command row that exceeds the maximum width and rolls into a second line within the row. 1107 displays a payload in a List Box Term row that exceeds the maximum width and rolls the text into a second line within the row. At 1108, the number of rows exceeds available maximum height and the ListBoxMgr object stacks successor list box page(s) behind the initial list page, and continues to stack successive list box pages until the payloads of all ALDS records returned by the SearchMgr object are displayed. At 1109 is a legend at the bottom of the first page of a list with stacked pages advising the user to click anywhere on a secondary stacked list page to view it; this legend is the payload of an ALDS record with the value "LG+" in its ALDS Use Field to present it as a legend, the plus sign ("+") defines that it displays beneath the front list page of a list box with stacked pages.

In the preferred embodiment of the invention, there is no set focus to (highlights) a predetermined List Box Term row upon display of a list box. An alternative embodiment of the invention sets focus to (highlights) a predetermined List Box Term row upon display of a list box.

Figure 11C:
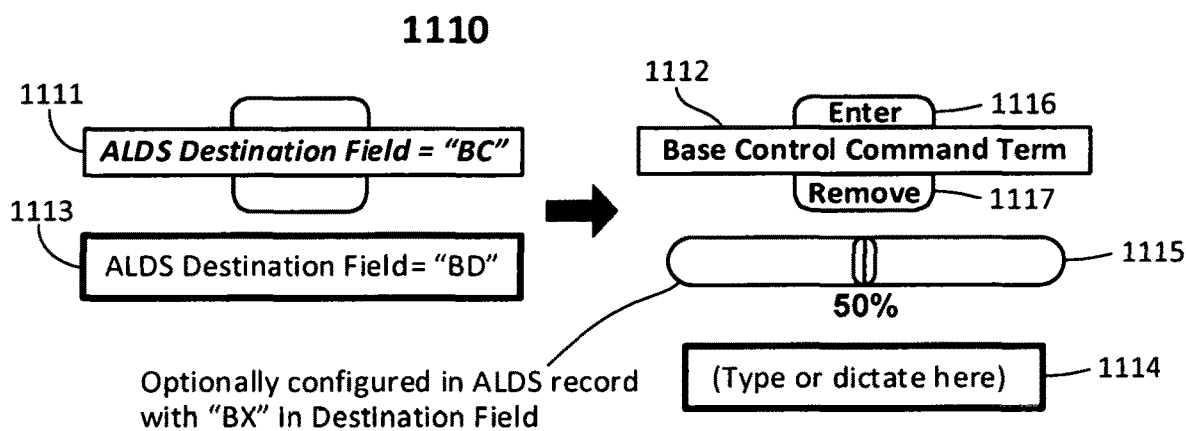
FIG. 11C is a mockup illustration of the components of the Base Control.

FIG. 11C illustrates the components of the Base Control. At 1111 is the ALDS record with "BC" in its ALDS Destination Field, which displays its payload in the Base Control Command component at 1112. At 1113 is a second ALDS record with "BD" in its ALDS Destination Field with an empty payload awaiting data to be input into it in the Base Control Data component at 1114. Focus is by default set with the cursor at the first character position in the Base Control Data component. At 1115 is the slider component that displays when the ALDS record at 1111 contains the value "BX" (instead of "BC") in the ALDS Destination Field. At 1116, the user presses the Enter tab or dictates "Enter" to input data using the control (i.e., input the ALDS record from the Base Control Command component at 1112 and the ALDS record from the Base Control Data component at 1114). At 1117, the user presses the Remove tab or dictates "Remove" to delete the data item to which focus is set (highlighted).

Figure 11D:
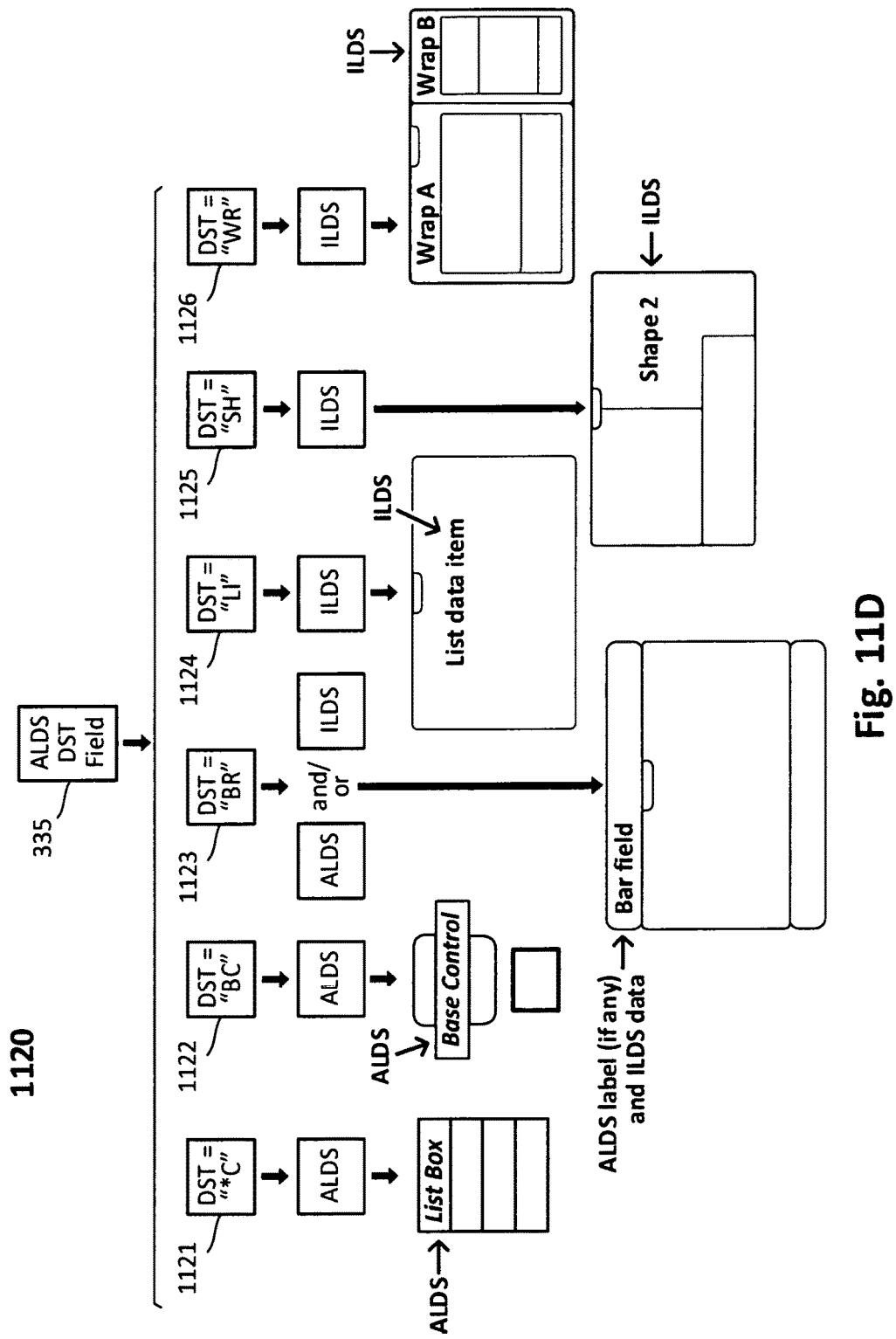
FIG. 11D is a mockup illustrating that the ALDS Destination Field determines whether to navigate to a successor control or to input a data item ILDS payload into an icon.

FIG. 11D illustrates that the value in the ALDS Destination Field at 335 whether to display the payload of an ALDS record in a subsequent list box with "*L" at 1121, display it in a base control with "BC" at 1122, input its payload into a bar field with "BR" at 1123, input its payload into a view as a list data item with "LI" at 1124, or input its payload into a view as a shape data item with "SH" at 1125.

Note, the asterisk ("*") at 1121 is a placeholder for values used for list box variants at 1100 with "L" for generic list box, 1400 with "N" for Nay Control list box, 1500 with "M" for Mode Control list box, 1600 with "O" for On Behalf Of Mode Control list box, 1700 with "S" for Scoring Mode Control list box, 1800 with "C" for Messaging Mode Control list box and 1900 with "V" for Verify Control Mode list box.

Figure 11E:
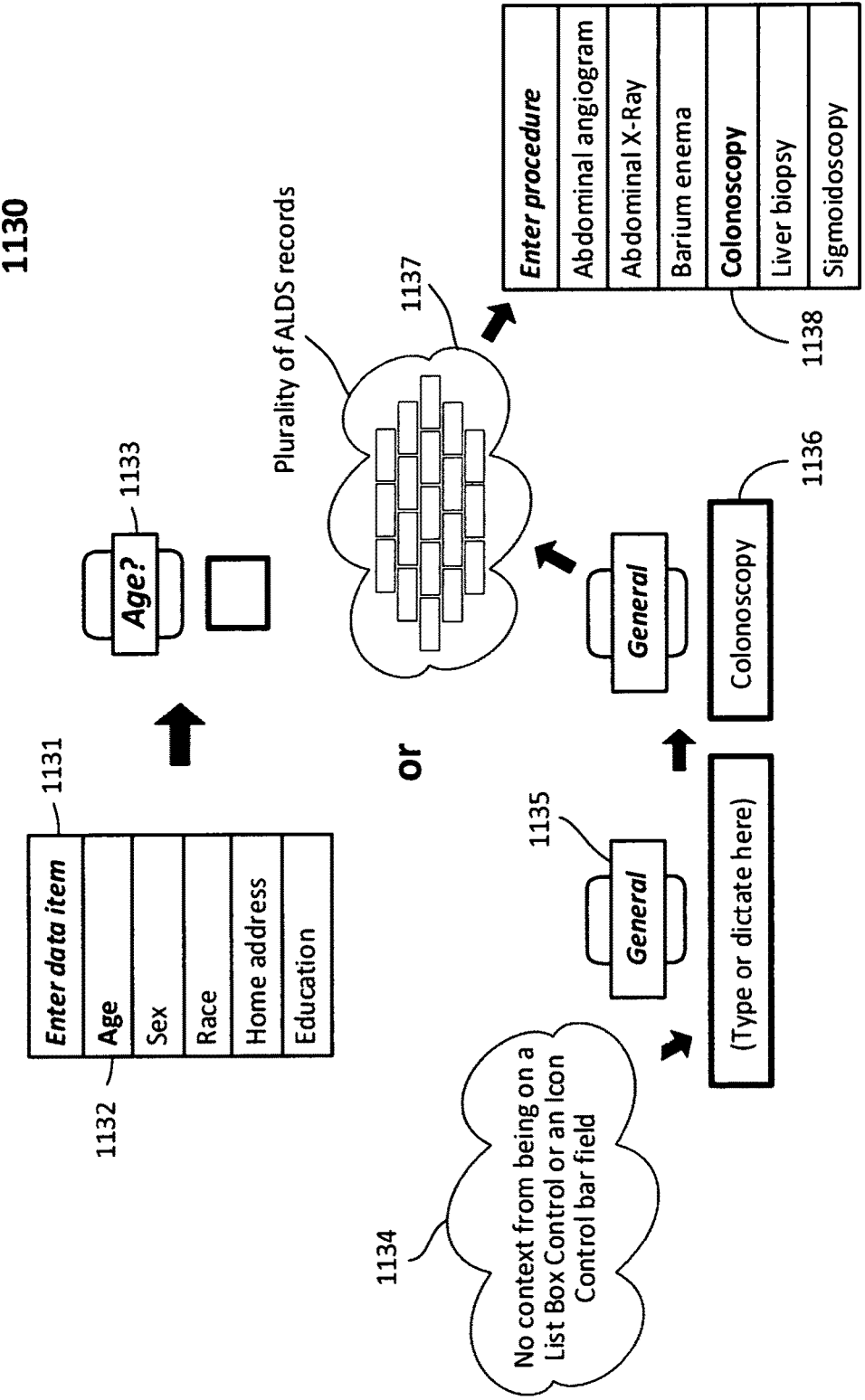
FIG. 11E is a mockup illustrating that the Base Control is used either to input not pre-knowable data along with a predefined data item, or to obtain a predefined data item for input without a use context.

FIG. 11E illustrates in a personal demographics example that the Base Control can be displayed either of two ways, depending on use context. At 1131 is the generic List Box Command payload "Enter data item" that displays when no hybrid payload is configured for the List Box Command at 2041. At 1132, upon selection of the List Box Term row that displays the payload of an ALDS record with the value "BC" in its ALDS Destination Field, the Base Control Command component displays the same payload at 1133 with a question mark ("?") appended by the DisplayMgr object.

Note, the List Box Term row at 1132 and others hereunder are depicted in dark gray to signify that it has been selected by clicking it or by dictating its ALDS payload.

Note, List Box Term selection markings used in this mockup and other mockups illustrated hereunder are for comprehension purposes only; a software product based on this invention may use color or another display property for List Box Term selection markings.

At 1134 there is no use context when a Base Control is not displayed from a List Box Control or an Icon Control (i.e., when it is used directly from the desktop). At 1135, the Base Control with no use context displays the generic ALDS record payload "General" in its Base Control Command component. The user types or dictates a value into the Base Control Data component at 1136, whereupon the SearchMgr object searches all ALDS records in memory at 1137. When the requested ALDS payload value is found by a match in its String Field at 356, it displays the List Box Control containing the requested payload at 1138 with focus automatically set to the List Box Term row that displays the requested data item ALDS record payload (i.e., it is automatically highlighted).

It is notable to the invention that use of the Pointer Field at 304 in a search without a use context bypasses 28 to 31 LDS fields between the Pointer Field and the String Field at 356, thereby speeding execution of searches launched from no use context. The number of bypassed fields varies depending on whether a searched ALDS record is in list format (at 340) or shape/wrap format (at 345 through 349).

Figure 11F:
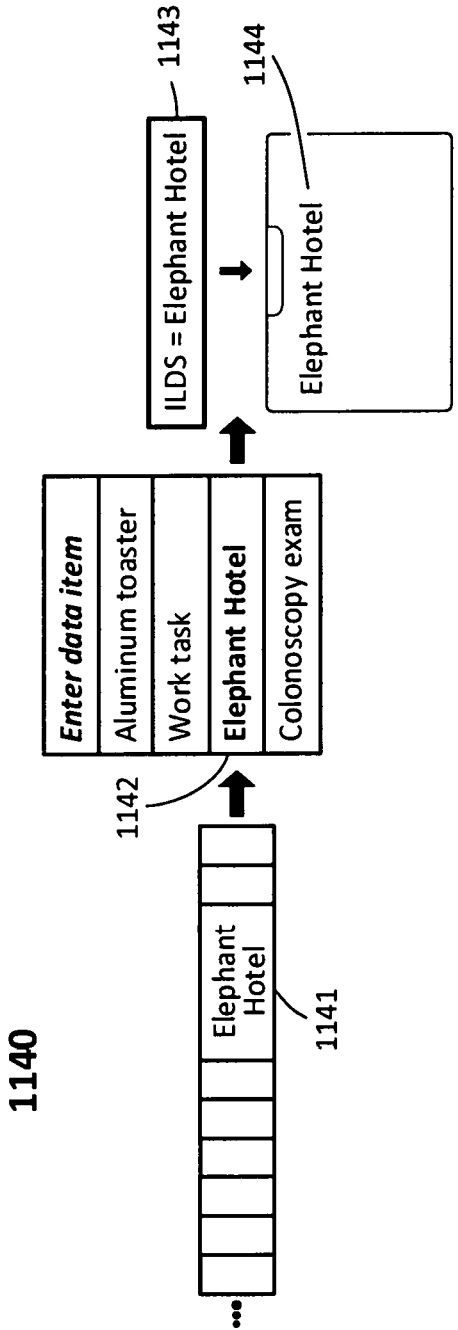
FIG. 11F is a mockup illustrating the process of a predefined data item being input as is from a List Box Control.

FIG. 11F illustrates a predefined data item payload in an ALDS record at 1141 selected in its List Box Term row at 1142. Upon input, the ALDS record is redefined as an ILDS record at 1143 by automatic input into the ILDS record's ILDS Location Field at 342, whereupon the value "A" is changed to "I" in the LDS record's Start Name Field and End Character (Char) Field, as at 360 and 370. At 1144, the payload displays upon the ALDS record input into memory as an ILDS record.

Figure 11G:
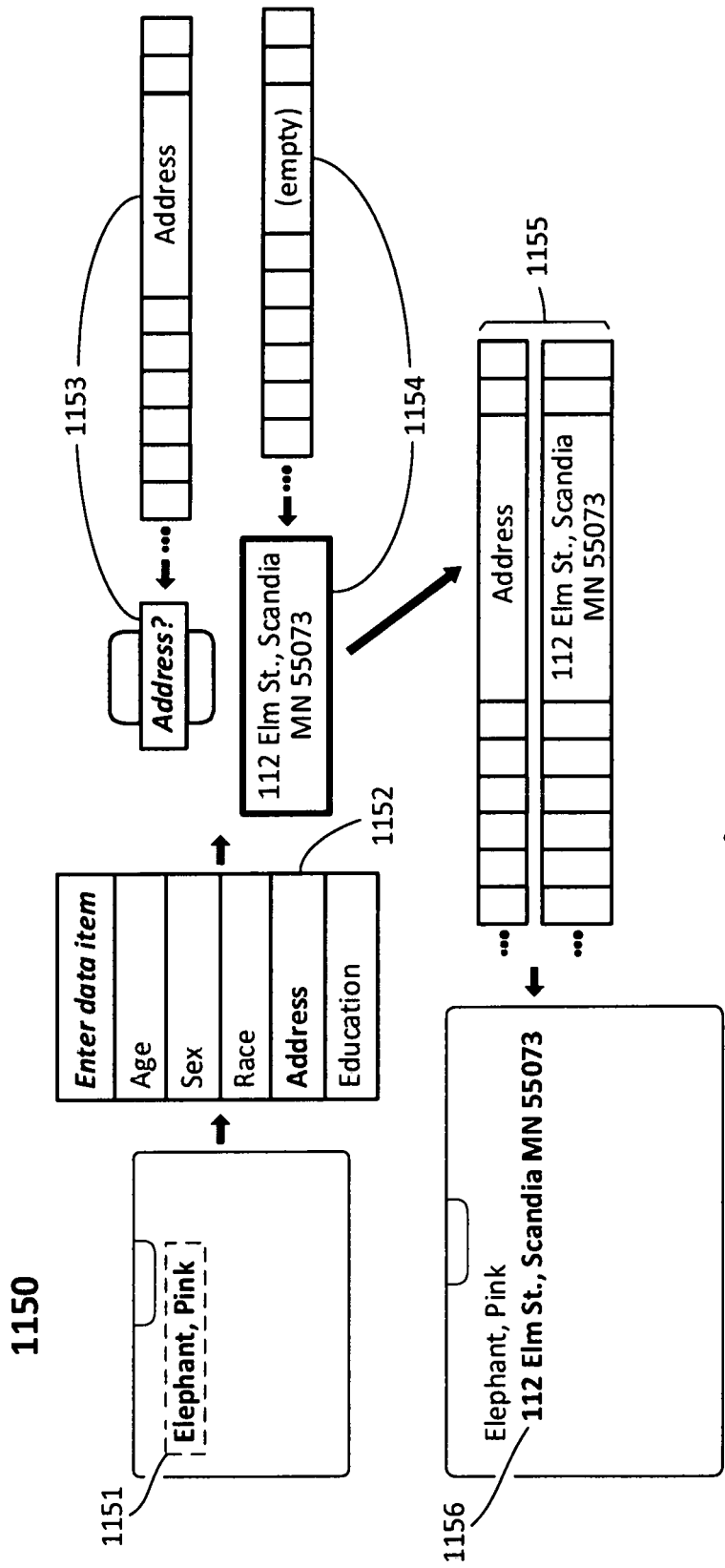
FIG. 11G is a mockup illustrating the process of inputting a not pre-knowable value as an ALDS along with an ALDS a containing a predetermined lexicon term in a Base Control.

FIG. 11G illustrates in this personal demographics example that when the user double-clicks an ILDS payload record in a view at 1151 a List Box Control Displays. The user selects the List Box Term row displaying the ALDS payload "Address" at 1152, whereupon by the ALDS record of the selected List Box Term containing the value "BC" in its ALDS Destination Field displays a Base Control that displays the payload "Address?" at 1153 in the Base Control Command component, with the question mark appended by the DisplayMgr object. The user types or dictates a value for the address into empty payload String Field of the second ALDS record at 1154. The InputMgr object stores the address data as an ILDS record at 1155, and the DisplayMgr object displays the address data in the view at 1156, but does not display the payload "Address" because the DisplayMgr object has been programmed not to display it.

Figures 1, 11H:
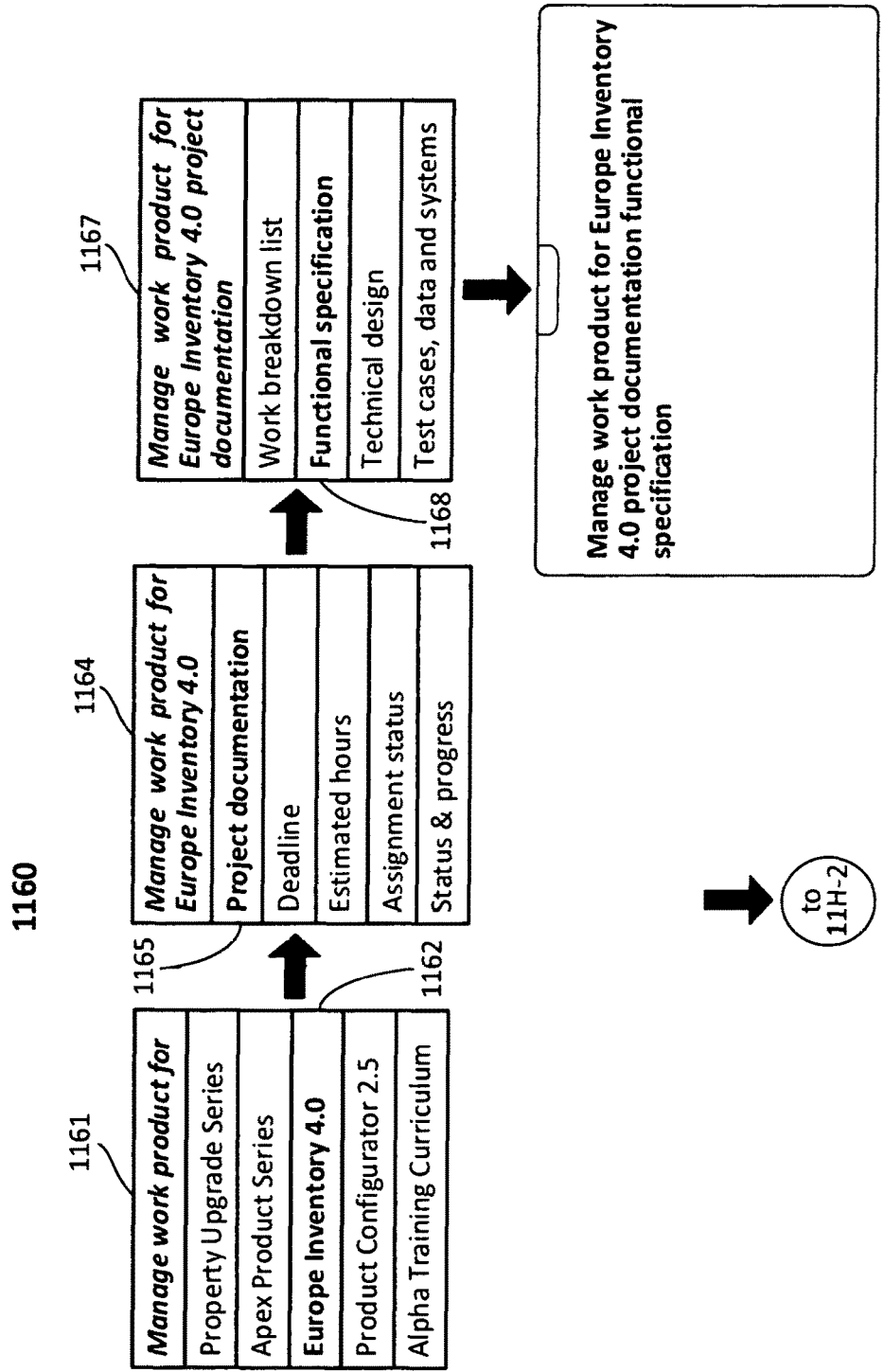
FIG. 11H is a mockup illustrating that an ALDS record can be configured to form and display natural language-like List Box Commands, and that the system marks list box rows for input status.

FIG. 11H illustrates in this workforce management example display of hybrid payloads in successive List Box Command components configured at 2041. When a trigger payload displays in a List Box Command row at 1161, upon the user selecting the non-hybrid List Box Term row at 1162 the hybrid payload "Manage work product for Europe Inventory 4.0" is formed by the configuration at 1163, which thereupon displays in the List Box Command row at 1164.

Note, symbols in parentheses at 1163 and hereunder indicate a variable whereby a particular ALDS record payload in a set of ALDS record payloads is used to form a hybrid payload.

Upon the user selecting the non-hybrid payload at 1165, the hybrid payload "Europe Inventory 4.0 project documentation for" formed by the configuration at 1666 displays in the List Box Command row at 1167.

Upon insertion of each List Box Term row payload into a hybrid payload for display at 1164 and 1167, the HybridMgr object changes the case of the first letter of the List Box Command row text string from upper to lower case so as to comply with the rules of grammar.

Depending on the List Box Term row payload value selected from the String column in the 1163 configuration, the HybridMgr object can also display "Manage work product for Project Upgrade Series", "Manage work product for Apex Product Series", "Manage work product for Product Configurator 2.5" and "Manage work product for Alpha Training Curriculum". The HybridMgr object changes the case of the first letter of each text string from upper to lower case so as to comply with the rules of grammar.

Depending on the List Box Term row payload value selected from the String column in the 1166 configuration, the HybridMgr object can also display "Europe Inventory 4.0 deadline for", "Europe Inventory 4.0 estimated hours for" "Europe Inventory 4.0 assignment status for" and "Europe Inventory 4.0 status & progress for". The HybridMgr object changes the case of the first letter of each text string from upper to lower case so as to comply with the rules of grammar.

The purpose of this and other hybrid payloads illustrated hereunder is to display natural language-like text to assist the user in understanding the meaning and context of a data item to input.

Upon input of the ALDS payloads at 1170 and 1171, its List Box Term row is marked by the InputMgr object as having been input signified by vertical lines on the row.

Note, the input status marking used in this mockup and other mockups illustrated hereunder are for comprehension purposes only; a software product based on this invention may use color or another display property for input status markings.

Figure 11I:
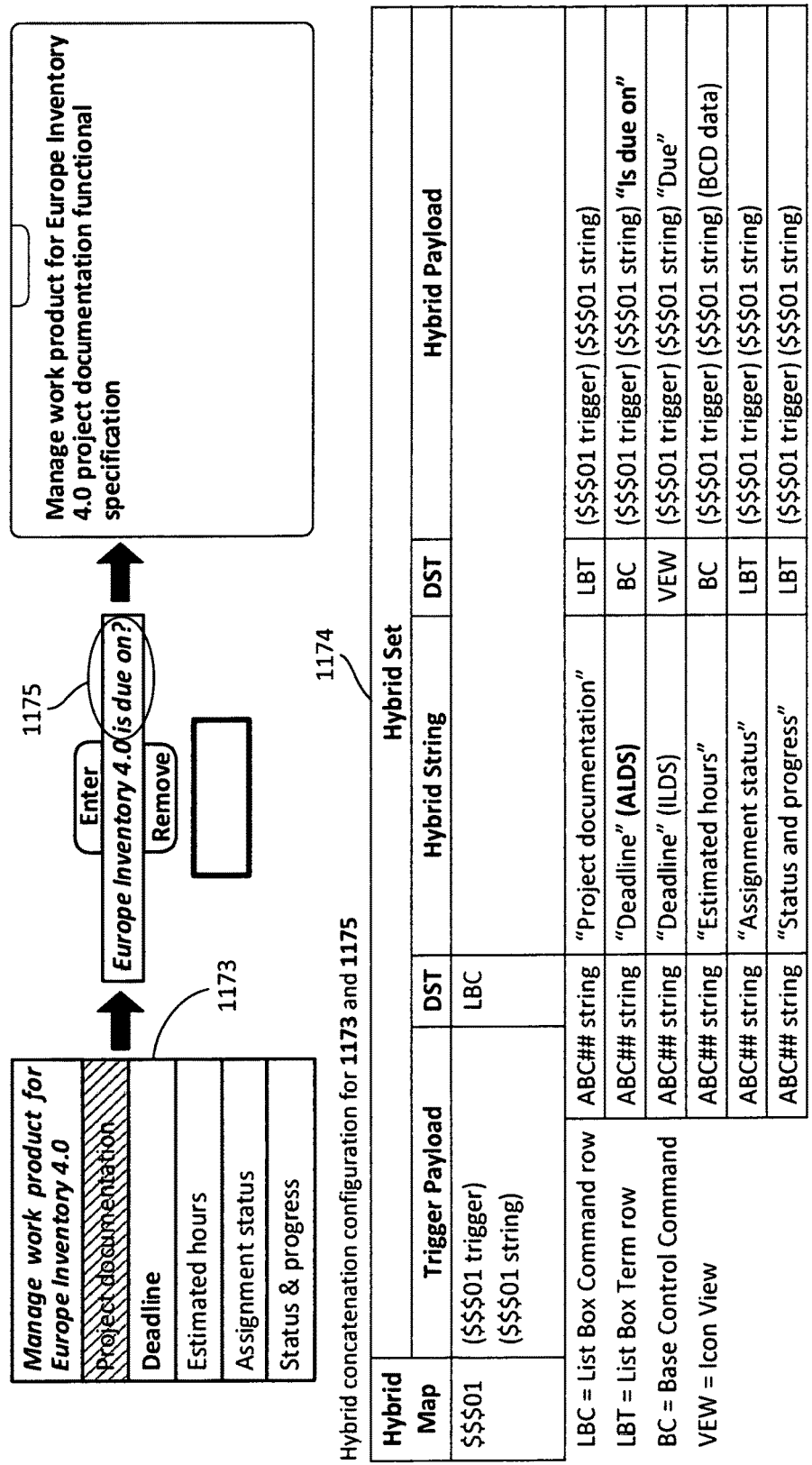
FIG. 11I is a mockup illustrating that an ALDS record can be configured to form and display natural language-like Base Control Commands.

FIG. 11I illustrates in the same workforce management example display of a hybrid payload in a Base Control Command configured at 2041. Upon selecting the List Box Term row payload "Deadline" at 1173, the hybrid payload formed by the configuration at 1174 displays in the Base Control Command component at 1175. The HybridMgr object refers to the string payload at 1163 to obtain the "$$$01" string "Europe Inventory 4.0" and combines it with the "54321" string "Deadline". The HybridMgr object inserts a question mark ("?") at the end of the hybrid payload for display in the Base Control Command component at 1175.

Depending on the List Box Term row payload value selected from the String column in the 1174 configuration, the HybridMgr object can also display "Europe Inventory 4.0 estimated hours", "Europe Inventory 4.0 "Europe Inventory 4.0 assignment status" and "Europe Inventory 4.0 status & progress". Upon insertion of each List Box Term row payload into a hybrid payload for display at 1175, the HybridMgr object changes the case of the first letter of each text string from upper to lower case so as to comply with the rules of grammar.

FIG. 11J illustrates in the same workforce management example display of a hybrid payload in an input data item configured at 2041. Upon display of the Base Control at 1175, the user enters a not pre-knowable value into the Base Control Data component at 1177, whereupon the hybrid payload configured at 1178 inserts "Due" as a connective text string before the date "09/15/2015" and displays it at 1179.

Figures 1, 11K:
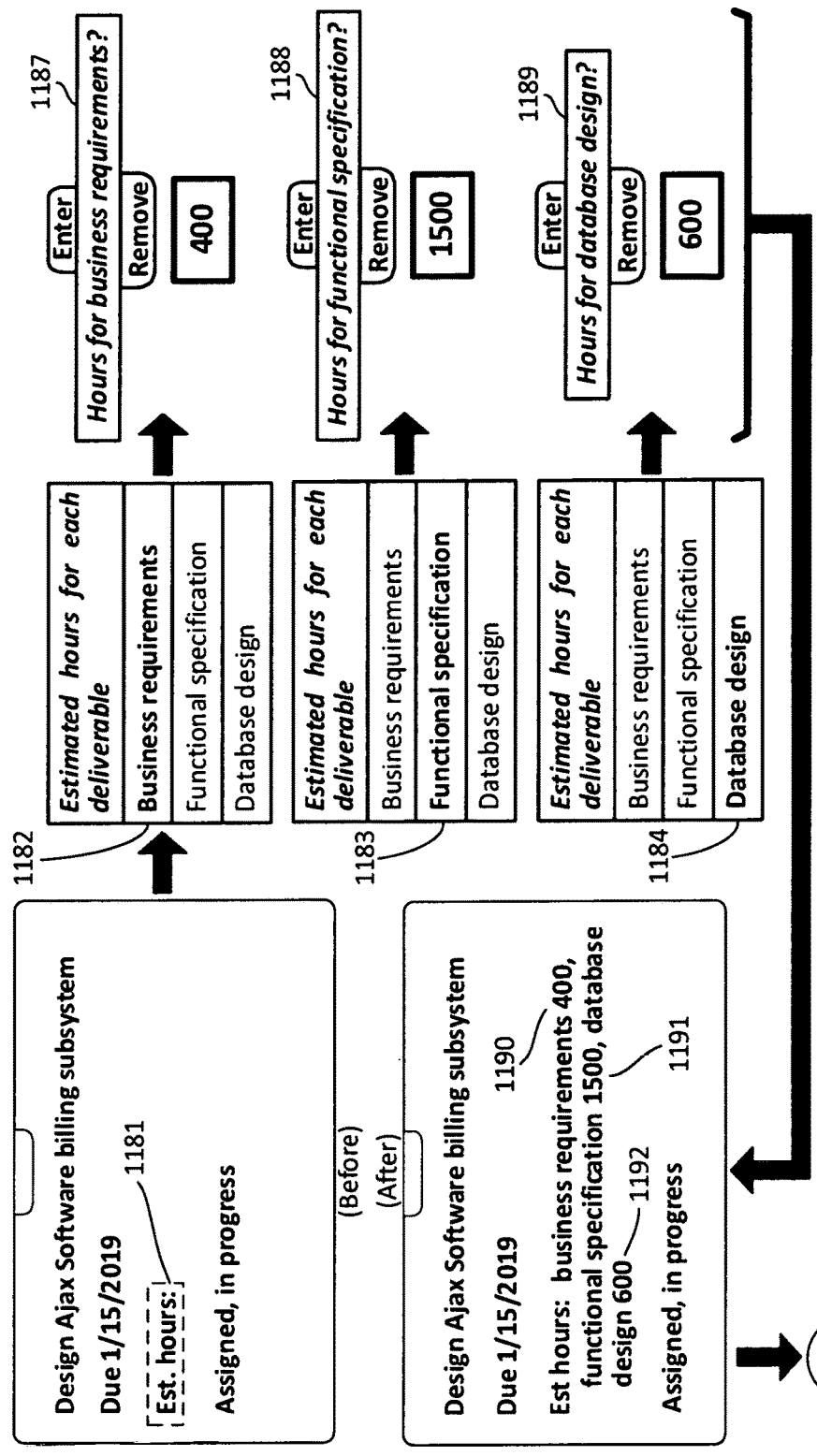
FIG. 11K is a mockup illustrating that an ALDS record can be configured to display a checklist of input prompts, that an ALDS record can be configured to form and display natural language-like text in the prompts, and that ILDS payloads in a checklist are concatenated in a single row.

FIG. 11K illustrates in the same workforce management example display of hybrid payload in the Base Control Command components in a succession of Base Controls configured at 2041. The succession is defined by the value in the ALDS Successor Map Field at 338 in the ILDS record with "Est hours:" payload, and displays them in the order defined in ALDS Order Field at 339. The user double-clicks the "Est Hours:" ILDS payload at 1181, whereupon a list box displays with a List Box Term row for each deliverable defined in the example workforce management application. The user selects any of three rows: "Business requirements" at 1182, "Functional specification" at 1183, or "Database design" at 1184. Upon selection of a List Box Term row payload, a hybrid payload is formed by use of the configurator at 1186 and displays it in the resultant Base Control Command component at 1187, 1188 and 1189. As at 1164 and 1167, the lexical configurator HybridMgr object at 1186 changes the first character of the text string in the hybrid payload from upper to lower case so as to comply with the rules of grammar. The user enters a not pre-knowable value into the Base Control Data component of each, and inputs the ILDS record at 1190 through 1192. The InputMgr object displays the ILDS record payloads of each in the "Est Hours:" row as related (subsidiary) by the ILDS Group Field at 341 as at as at 1031 and 1032. Row is defined as the same logical display line. If the ILDS payload exceeds the available horizontal space of the logical display line, one or a plurality of successor logical display lines display thereunder and are indented by the InputMgr object, as depicted at 1190 through 1192. The InputMgr object inserts punctuation marks in the form of commas between the ILDS payloads displayed.

Figure 11L:
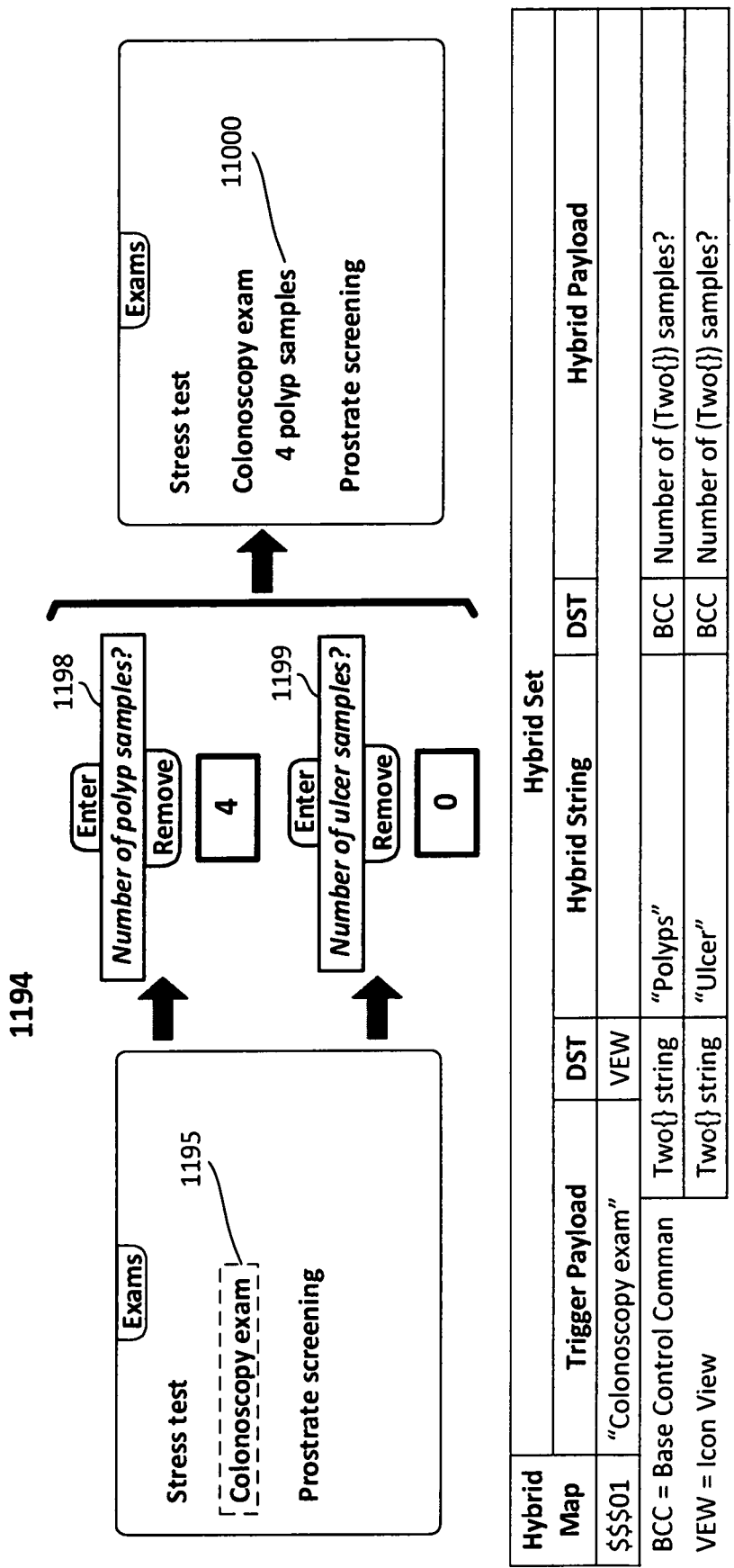
FIG. 11L is a mockup illustrating that an ALDS record can be configured to upon input prompt for quantitative data on an item, and that ALDS records can be configured to form natural language-like text in Base Control Command prompts.

FIG. 11L illustrates in this medical example display of hybrid payloads in two Base Control Command components configured at 2041. The user double-clicks a non-hybrid ILDS payload of an input data item at 1195, whereupon by the values in the ALDS Successor Field at 338 and the ALDS Order Field at 339, a succession of two Base Controls displays at 1198 and 1199, each displaying in its Base Control Command component a hybrid payload formed by the configurator at 1196. The Numeric Field is configured at 2033 for the ALDS record with the payload "Colonoscopy exam" to display prompts for the user to enter a quantitative value in the Base Control Data component and input it, whereupon the payload of the ILDS record containing the quantitative payload displays in the Icon Control at 11100. In this example, "4" is input into the hybrid ILDS payload "Polyp samples". Because "0" is input into the hybrid ILDS payload "Ulcer samples", the InputMgr object does not insert the number zero ("0") into the ILDS payload at 11100 by programming of the InputMgr object to not display zero findings (i.e., the InputMgr object could have been programmed to display "0 ulcer samples" in the ILDS at 11100).

Note, the application can be configured at 2034 to accept no input in the Base Control Data component (i.e., it is blank) and treat it as "0".

Note, this example illustrates a prompt for numerical data for input into the Numeric Field. The application can be configured to prompt for input of supplemental textual data in into the Amendment Field at 358 in the same way, which is not illustrated here.

Figure 11M:
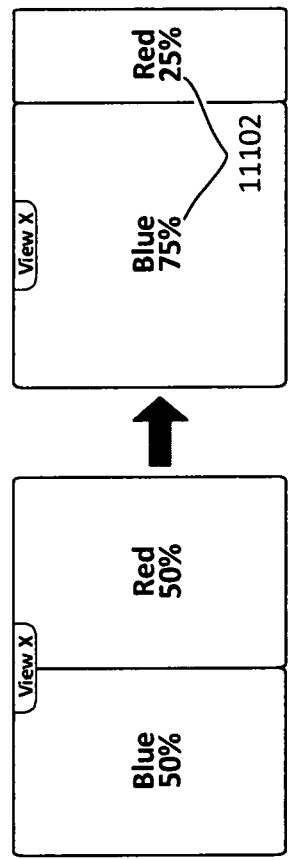
FIG. 11M is a mockup illustrating that the user can resize a shape data item ILDS payload in a view, and thereby the other shape data item ILDS payloads in the view.
Figure 11N:
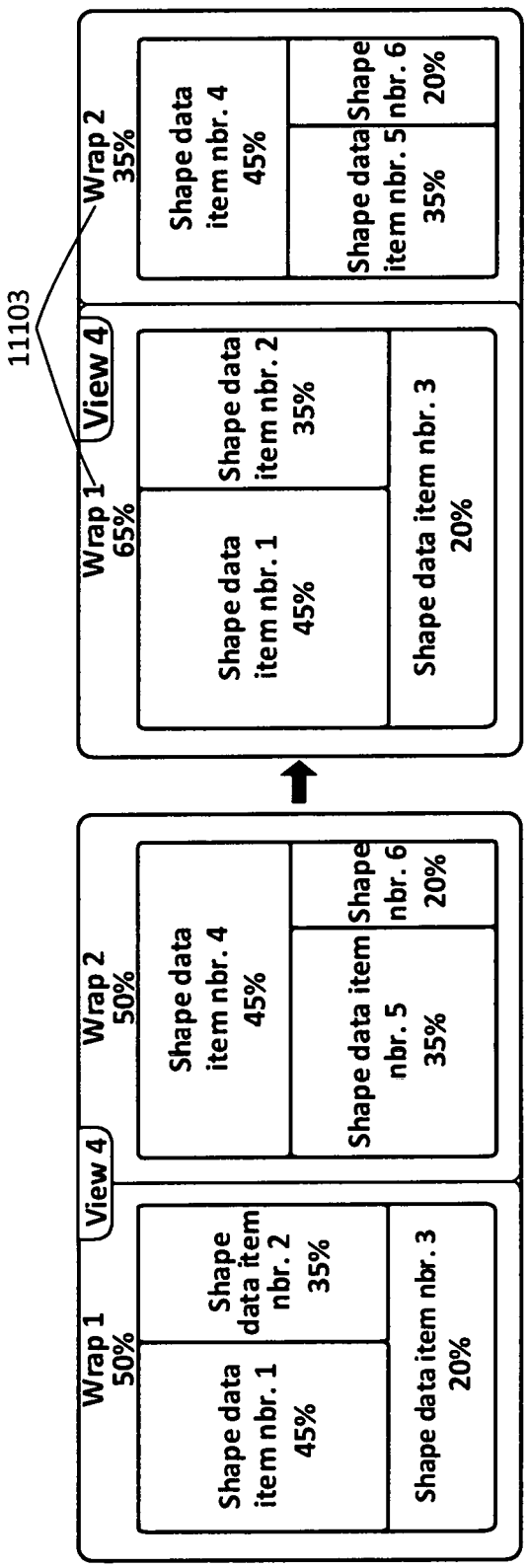
FIG. 11N is a mockup illustrating that the user can resize a wrap data item ILDS payload in a view, and thereby the shapes data item ILDS payloads within the resized wraps.
Figure 110:
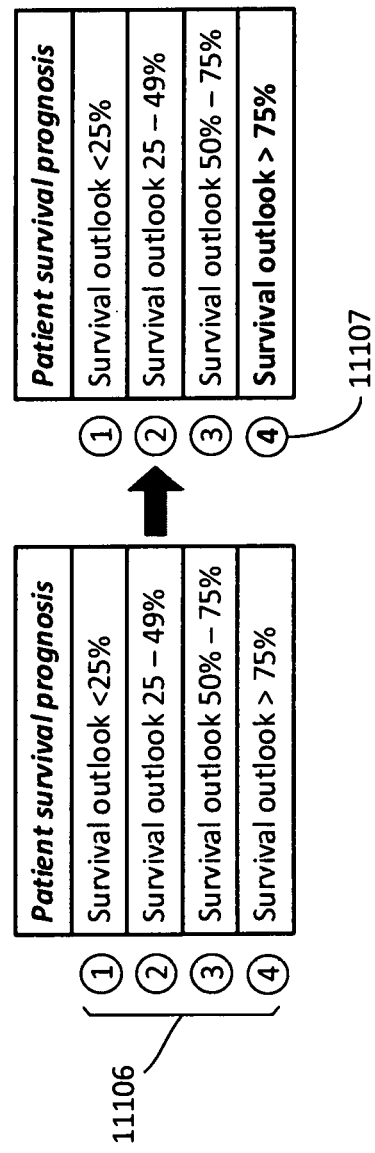

FIG. 11M shows data input using the Enumerator option as configured at 2075. Enumeration displays numbers adjacent to a List Box Command Term row and List Box Term rows in a list box, as at 11106, and adjacent to shape data items and wrap data items in a view displayed in shape/wrap format (not illustrated here). The user sets focus to (highlights) an enumerated data item by clicking it or dictating its number at 11107 to input it. Enumeration numbers are automatically assigned in top-to-bottom and then left-to-right order, and are temporal to an instance of a display; the enumerated number values are not input into memory as part of an ILDS record. Upon the enumerated data items leaving the display, the values temporarily input into the Enumeration Field at 343 of the ALDS records of the numbered data item payloads are deleted.

Figure 12A:
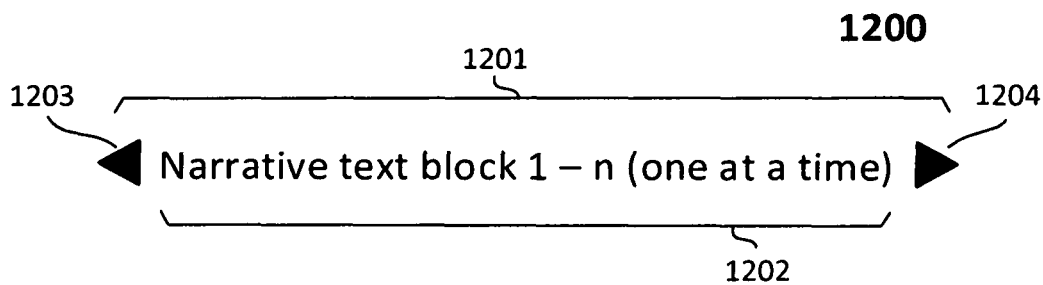
FIG. 12A is a mockup illustration of the components of the Help Narrative Control.

Note, as at 1100, clicking or dictating an enumerator number on a List Box Command row if for navigation; this row is for user advice only, it is not for potential input FIG. 12A shows the components of the Help Narrative Control at 1201. At 1202 is the text block component in which discrete text blocks display one at a time. Each text block is a payload in an ALDS record with the value "HN" in its ALDS Use Field, as configured at 2022. At 1203 and 2014 are the arrow components to scroll between text blocks in either direction. There is no limit on the number of Help Narrative text blocks for display to help the user with using screen controls. To operate this method, the HelpMgr object maintains categories of Help Narrative ALDS records configured at 2065.

Figure 12B:
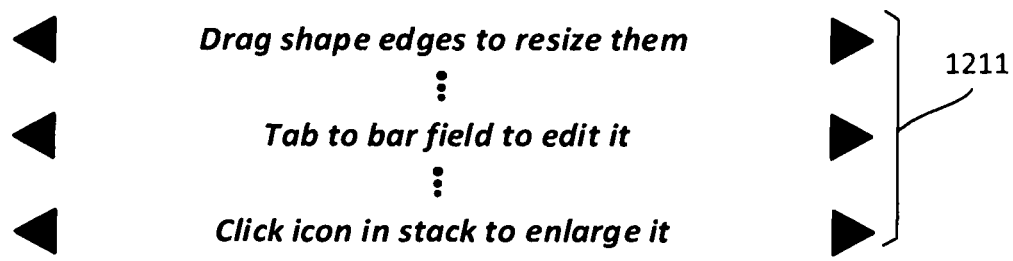
FIG. 12B is a mockup illustrating examples of Help Narrative suggestions for using application controls.

FIG. 12B shows at 1211 example Help Narrative text blocks advising the user on how to work with screen controls presently displayed, for example Verify Mode controls. Each text block is the payload of an ALDS record with the value "HN" in its ALDS Use Field at 331.

Figure 12C:
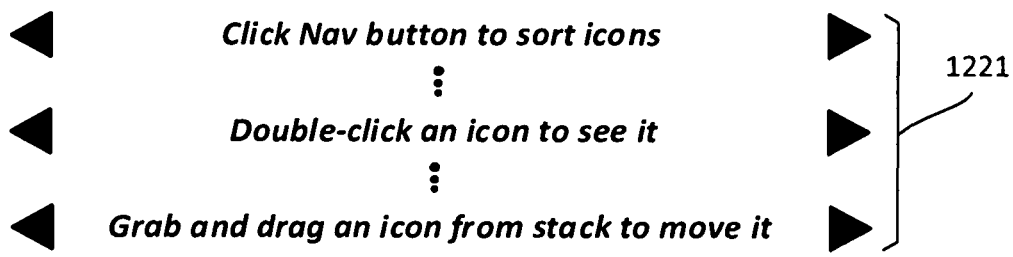
FIG. 12C is a mockup illustrating examples of Help Narrative suggestions for working with icons on the screen.

FIG. 12C depicts at 1221 example Help Narrative text blocks advising the user on how to work with icons and views presently displayed. Each text block is the payload of an ALDS record with the value "I-IN" in its ALDS Use Field at 331.

Figure 14A:
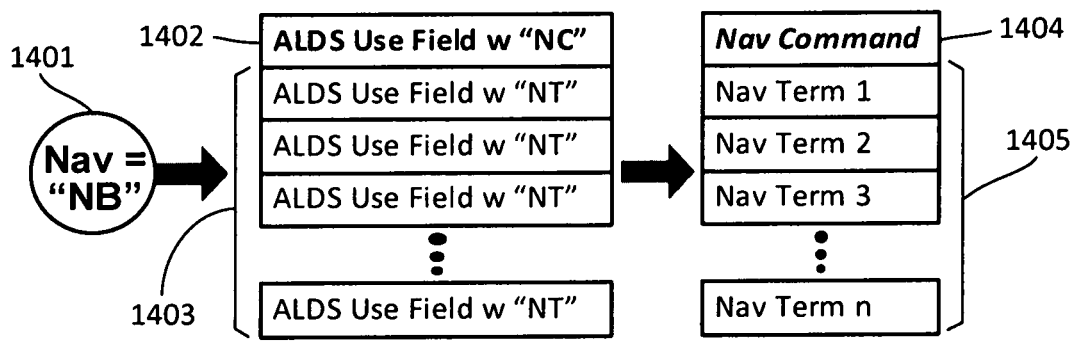
FIG. 14A is a mockup illustration of the components of the Nav Control.

FIG. 14A depicts the components of the Nav (Navigation) Control. The payload of the ALDS record with "NB" in its ALDS Use Field populates the Nav button at 1401. Upon the user pressing the Nav button, the payload of the ALDS record with "NC" in its ALDS Use Field at 1402 displays in the Nav Command row at 1404, and the payloads of ALDS records with "NT" in the ALDS Use Field at 1403 display in Nav Term rows at 1405 in the order specified for each in the ALDS Order Field at 339. There is a variable number of Nav Term rows.

Figure 14B:
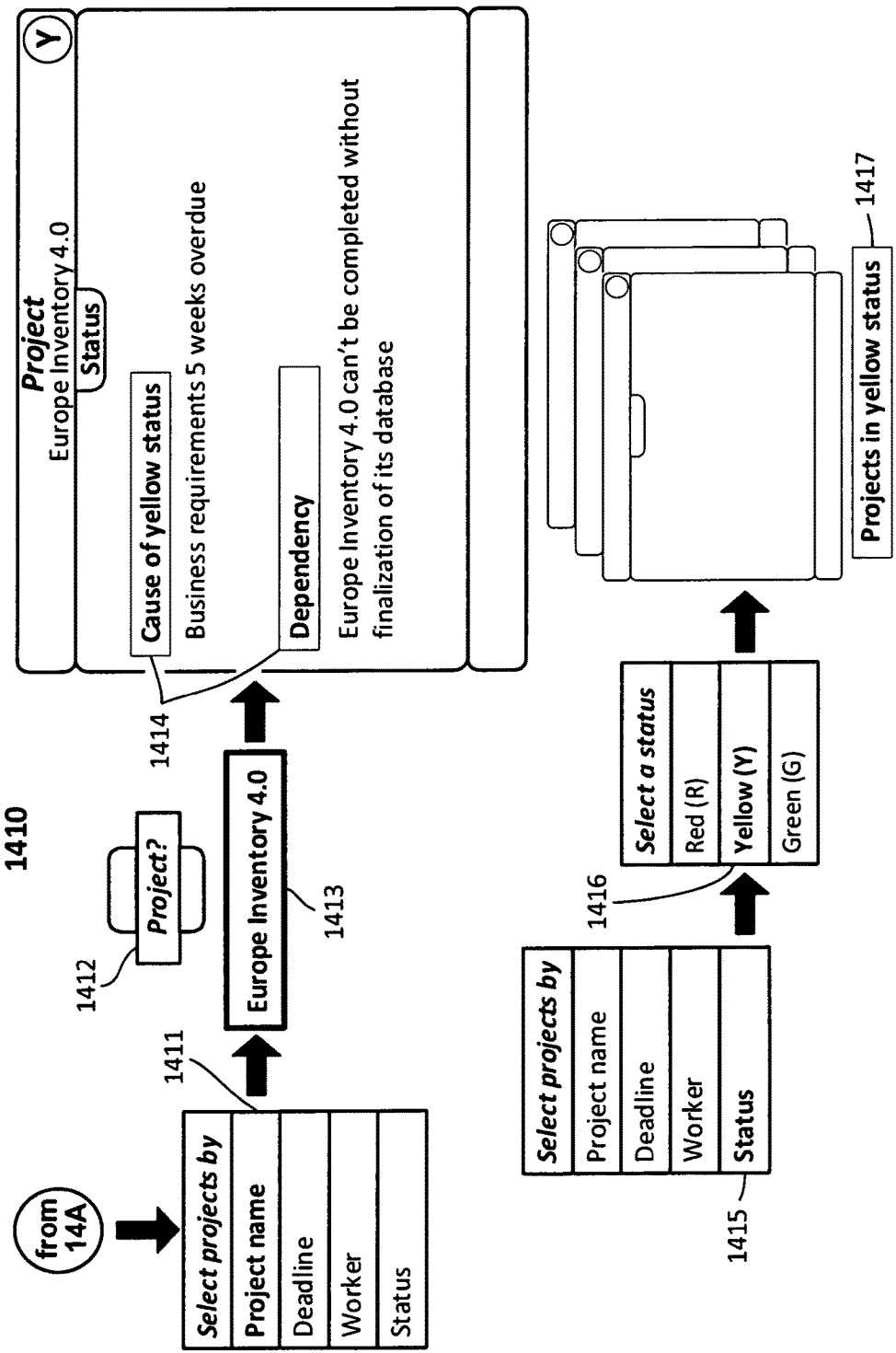
FIG. 14B is a mockup illustrating the process of the Nav Control retrieving a single icon and a related group of icons, and that if an icon is so configured, it displays legend controls.

FIG. 14B illustrates in a workforce management example the Nav Control in use. At 1411 the user selects a List Box Term row that displays the payload of an ALDS record with "BC" in its ALDS Destination Field at 335 to display a Base Control with the same payload in the Base Control Command component at 1412; whereupon the DisplayMgr object inserts a question mark ("?") at the end of the payload's text string. Upon typing or dictating data into the Base Control Data component at 1413, the requested icon displays. At 1415 the user selects a Nav Term row that displays the payload of an ALDS record with "NB" in its ALDS Destination Field, the user selects a Nav Term row at 1416 and the requested group of icons displays. At 1414 two legends display as configured at 2064, each above their designated ILDS record(s). At 1417 a legend displays beneath a designated group of icons stacked as configured 2064.

Figure 14C:
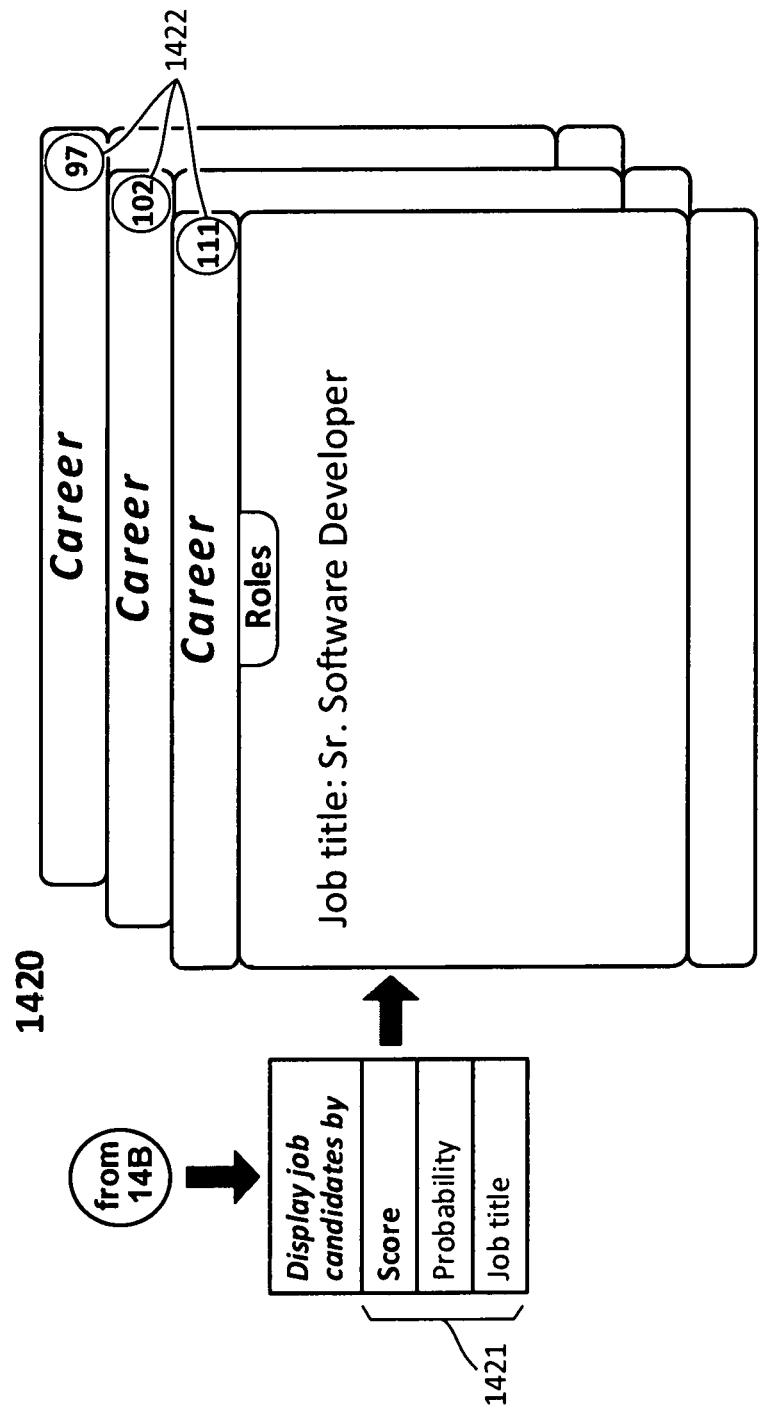
FIG. 14C is a mockup illustrating the Nay Control used to display icons displayed on the screen by available sorts.

FIG. 14C is a staffing example illustrating the Nav Control used to display sorted icons. The Nay Term list box at 1421 displays the payloads ALDS records configured to display at 2062. The Nav Term row "Score" is selected whereupon the icons with the requested ALDS Display Map value at 334 display, sorted in descending order of the score of each at 1422, the sort order having been programmed in the DisplayMgr object.

Figure 14D:
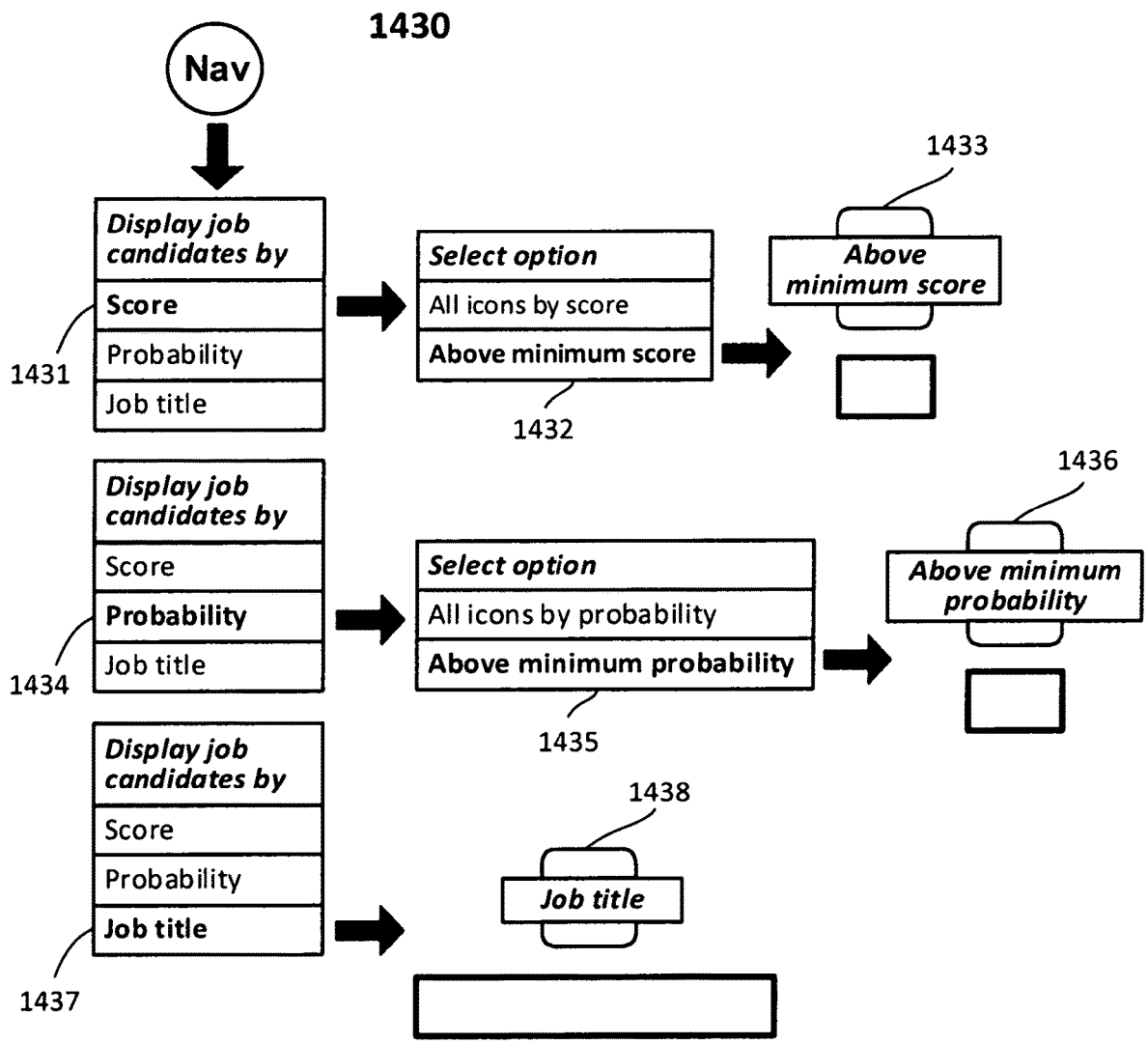
FIG. 14D is a mockup illustrating that a Nav Term ALDS can be configured to prompt the user with secondary controls to refine display sort criteria.

FIG. 14D in the same staffing example illustrates that if the ALDS Successor Map Field at 338 is so configured, upon selection of the Nav Term row at 1431 the payloads of two ALDS records with the value "SL" in the ALDS Destination Field at 335 display in a successor list box. Selection of the Nav Term row with the payload "Above minimum score" at 1432 with the value "BC" in its ALDS Destination Field displays a successor Base Control at 1433 to let the user enter a minimum score into the Base Control Data component to request a set of scored icons to display. 1434 through 1436 illustrate the same sequence but to display icons above a specified "Minimum probability" score. At 1437 the user selects a Nav Term row displaying the payload "Job title" with the value "BC" in its ALDS Destination Field to display a Base Control prompting the user to enter a job title into the Base Control Data component at 1438 to display icons containing ILDS records with the text string of the requested job title in the String Field at 356.

Figure 15A:
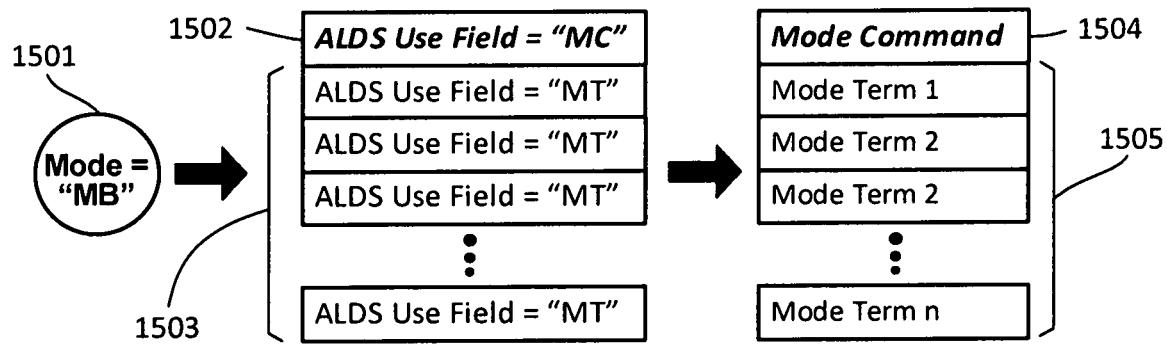
FIG. 15A is a mockup illustration of the components of the Mode Control.

FIG. 15A depicts the components of the Mode Control. The Mode button at 1501 displays the payload of the ALDS record with "MB" in its ALDS Use Field. Upon pressing the Mode button, the payload of the ALDS record with "MC" in its ALDS Use Field at 1502 displays as the Mode Command row at 1504, and the payloads of ALDS records with "MT" in the ALDS Use Field at 1503 display in Mode Term rows at 1505. Mode Term rows display in the order specified for each in the ALDS Order Field at 339. There is a variable number of Mode Term rows.

An alternative embodiment of the invention does not have the Mode Control to display the various controls for special operating modes beneath it, but instead displays special operating mode controls all the time.

Figure 15B:
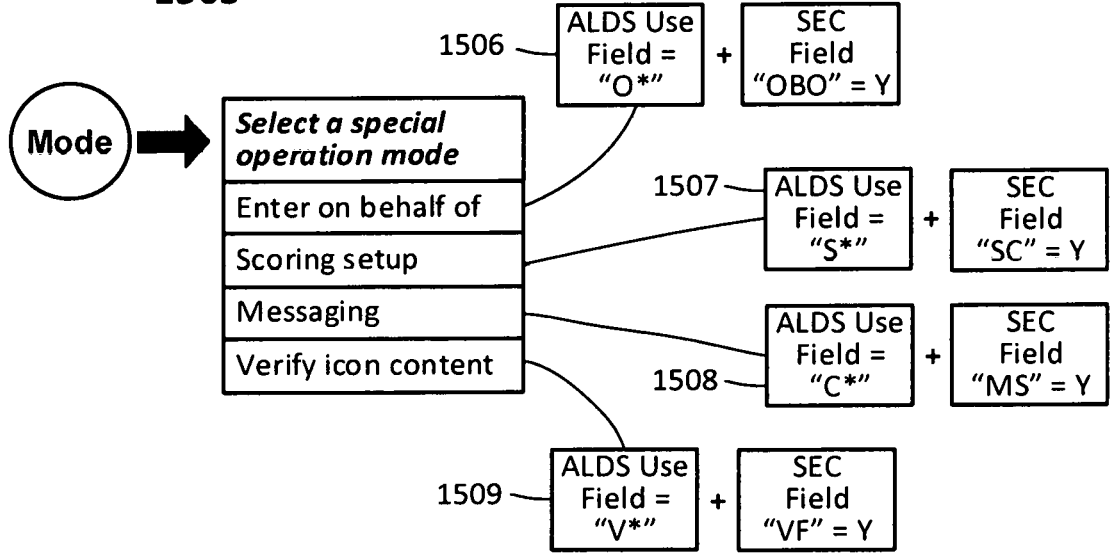
FIG. 15B is a mockup illustrating that permissions to use a Mode control special operating mode are first checked against an instance in the Security Field of the user's Security ALDS.

FIG. 15B illustrates the Mode List Box displaying the payloads of the Mode Term rows for the four special application operating modes in the preferred embodiment of the invention, listed by values in their ALDS Use Fields at 331: (1) "O*" for On Behalf Of Mode at 1511, (2) "S*" for Scoring Mode at 1512, (3) "C*" for Messaging Mode at 1513, and (4) "V*" for Verify Mode at 1514. The asterisks ("*") indicate placeholders for the values used for the particular special mode control (e.g., "SB", "SC" and "ST" for Scoring Mode Button, Scoring Command and Scoring Term, respectively). Upon selecting a particular special application operating mode, the system evaluates the permissions in the Security Field at 302 of the user's User ALDS record at 844. If the user does not have permission to operate the special application operating mode, the system displays an error message; if the user does have permission, the system enters the special application operating mode.

Figure 16A:
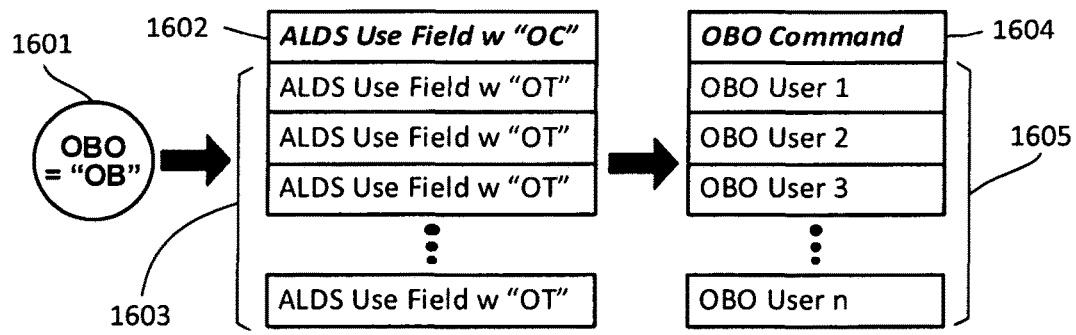
FIG. 16A is a mockup illustration of the components of the On Behalf Of Mode Control.

FIG. 16A depicts the components of the On Behalf Of (OBO) Mode Control. To display the On Behalf Of Mode Control, the DisplayMgr object collects ALDS records containing the values "OB", "OC" and "OT" in their ALDS Use Fields. The On Behalf Of button at 1601 displays the payload of the ALDS record with "OB" in its ALDS Use Field. Upon pressing the button, the payload of ALDS records with "OC" in its ALDS Use Field at 1602 displays as the OBO Command row at 1604, and the payloads of ALDS records with "OT" in the ALDS Use Field at 1603 display in OBO User rows at 1605 and display in the order specified for each in the ALDS Order Field at 339. There is a variable number of OBO Term rows.

Figure 16B:
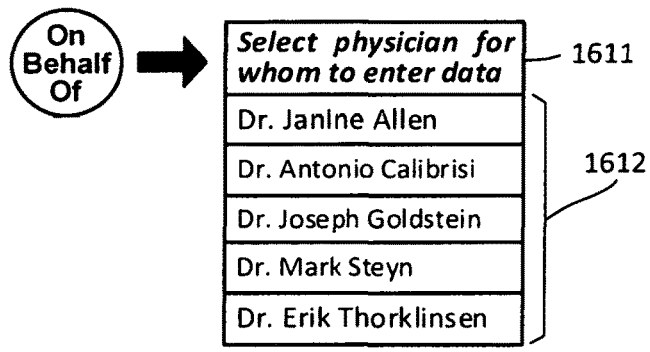
FIG. 16B is a mockup illustrating an example of the On Behalf Mode Control in use.

FIG. 16B illustrates in a medical example of an On Behalf Of List Box that displays the payload of the ALDS record with "OC" in its ALDS Use Field in the OBO Command row at 1611, and the payloads of ALDS records with "OT" in their ALDS Use Fields in the OBO User rows at 1612. In this example there is one OBO User ALDS records for each of six physicians on whose behalf data may be entered by the second party user presently in On Behalf Of Mode for the example doctors, with the Security Field in each physician's User ALDS record at 844 containing the value "OA" (for On Behalf Of Author). The second party user who is authorized to enter data on behalf of one of the six physicians in this example also has in his Security Field in his User ALDS record the value "OT" (for On Behalf Of Transcriber).

FIG. 16C illustrates in a medical example that displays an icon into which a second party user entered data items for a diagnosis and recommended treatment while in On Behalf Of Mode at 1616, and a symbol to indicate each field so input by the second party at 1617.

Note, the asterisks ("*") display to signify that the data item was input by a second party are used in this mockup is for comprehension purposes only; a software product based on this invention may use color or another display property to signify data items input by a second party.

Figure 17A:
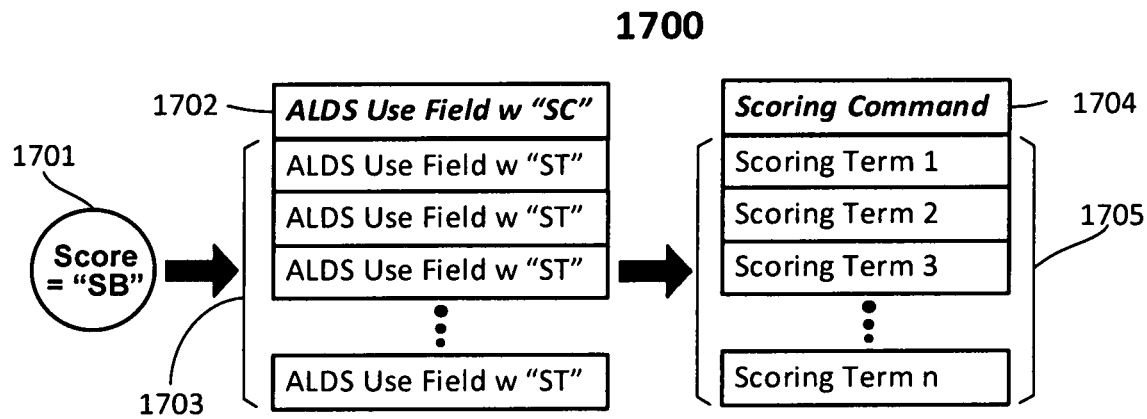
FIG. 17A is a mockup illustration of the components of the Scoring Mode Control.

FIG. 17A illustrates the components of the Scoring Control. To display the Scoring Control, the DisplayMgr object collects ALDS records with "SB", "SC" or "ST" in the ALDS Use Field at 331. The Score button at 1701 displays the payload of the ALDS record with "SB" in its ALDS Use Field. Upon pressing the Scoring button at 1701, the payload of the ALDS record with "SC" in its ALDS Use Field at 1702 displays as the Scoring Command row at 1704, and the payloads of ALDS records with "ST" in the ALDS Use Field at 1703 display as Scoring Term rows at 1705 in the order specified for each in the ALDS Order Field at 339. There is a variable number of Scoring Term rows.

Figure 17B:
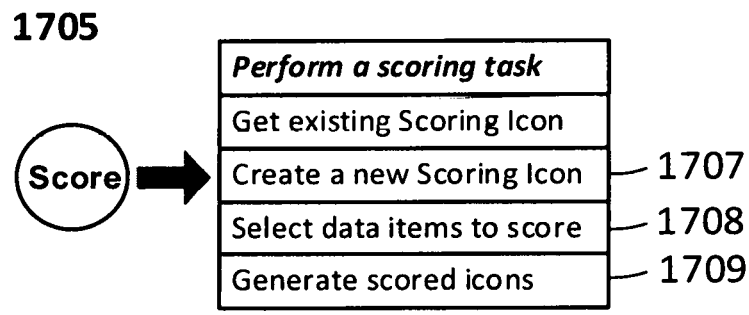
FIG. 17B is a mockup illustrating the preferred embodiment of the Scoring Mode Control.

FIG. 17B illustrates the Scoring Mode Control in the preferred embodiment of the invention. When the user selects the option "Get existing Scoring Icon" At 1706, the ScoringMgr object collects ILDS records for each of the four scoring options at 1706 through 1709 by the values in the Tracking Field at 359: (1) "SD" for a scored Scoring Icon and "SR" for displaying scored but retired and frozen Scoring Icons, (2) "SN" for create a new Scoring Icon and for selecting and weighting data items to score, (3) "SU" for a completed Scoring Icon for which data items to be scored and weighted have not yet been selected, and (4) "SE" for an unscored Scoring Icon that is populated with data from selected person- or entity-specific production icons and ready to score.

Figures 1, 17C:
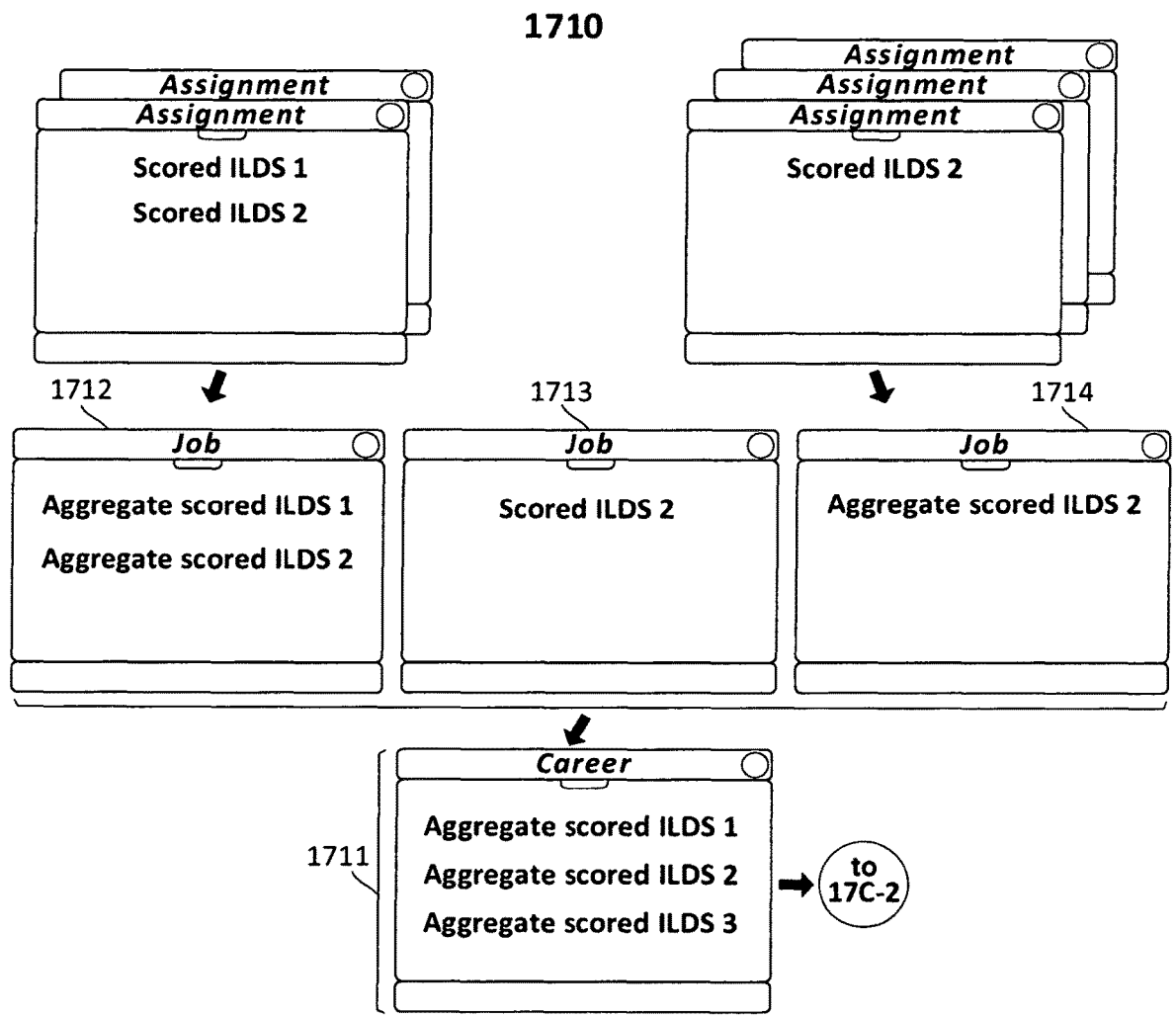
FIG. 17C is a mockup illustrating that data item ILDS records can be scored at any level of an icon type hierarchy.
Figure 17C:
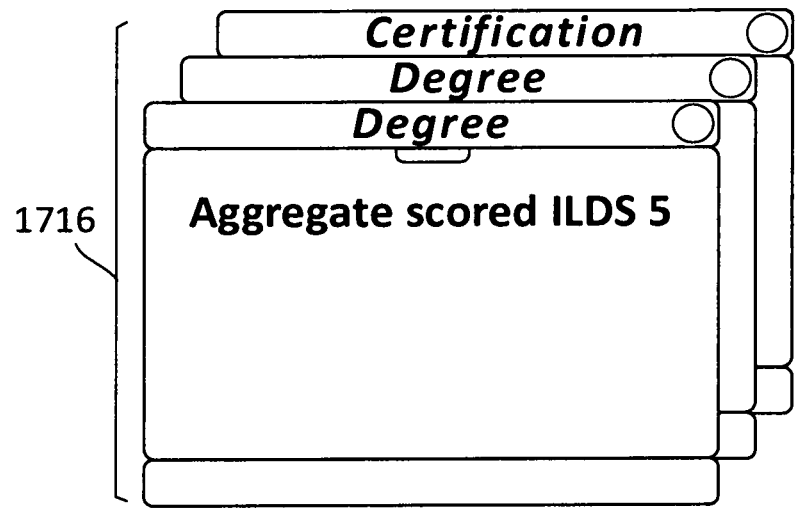
Figure 2:
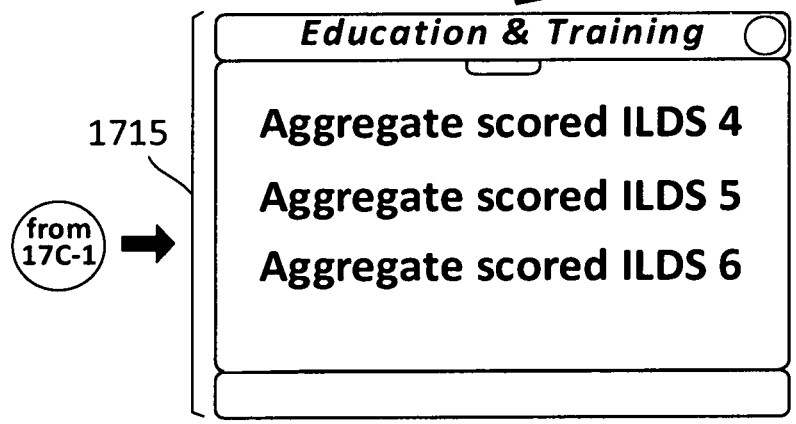

FIG. 17C shows in a staffing example that data item ILDS records can be input as scoring criteria and scored at any level in an icon hierarchy. A scored icon contains ILDS record data aggregated from icons beneath it in the icon hierarchy, if any. At 1711 is a Career Icon that when double-clicked displays Job Icons input and stored in the icon hierarchy level beneath it. At 1712 and 1714 are Job Icons that when double-clicked display Assignment Icon(s) input and stored in the icon hierarchy level beneath them. At 1713 is a Job Icon with no Assignment Icon input and stored beneath it. At 1715 is an Education & Training Icon at the same icon hierarchy level as the Career Icon that when double-clicked displays Degree or Certification Icons in the icon hierarchy level beneath it at 1716.

Note, certain types of bar field ILDS records are not aggregated within an icon type hierarchy. In a staffing example, a job applicant's name and address are not data entities that aggregate upwards between icons in its icon type's hierarchy levels (while time spent in a particular work role or working in a particular industry do aggregate).

Figures 1, 17D:
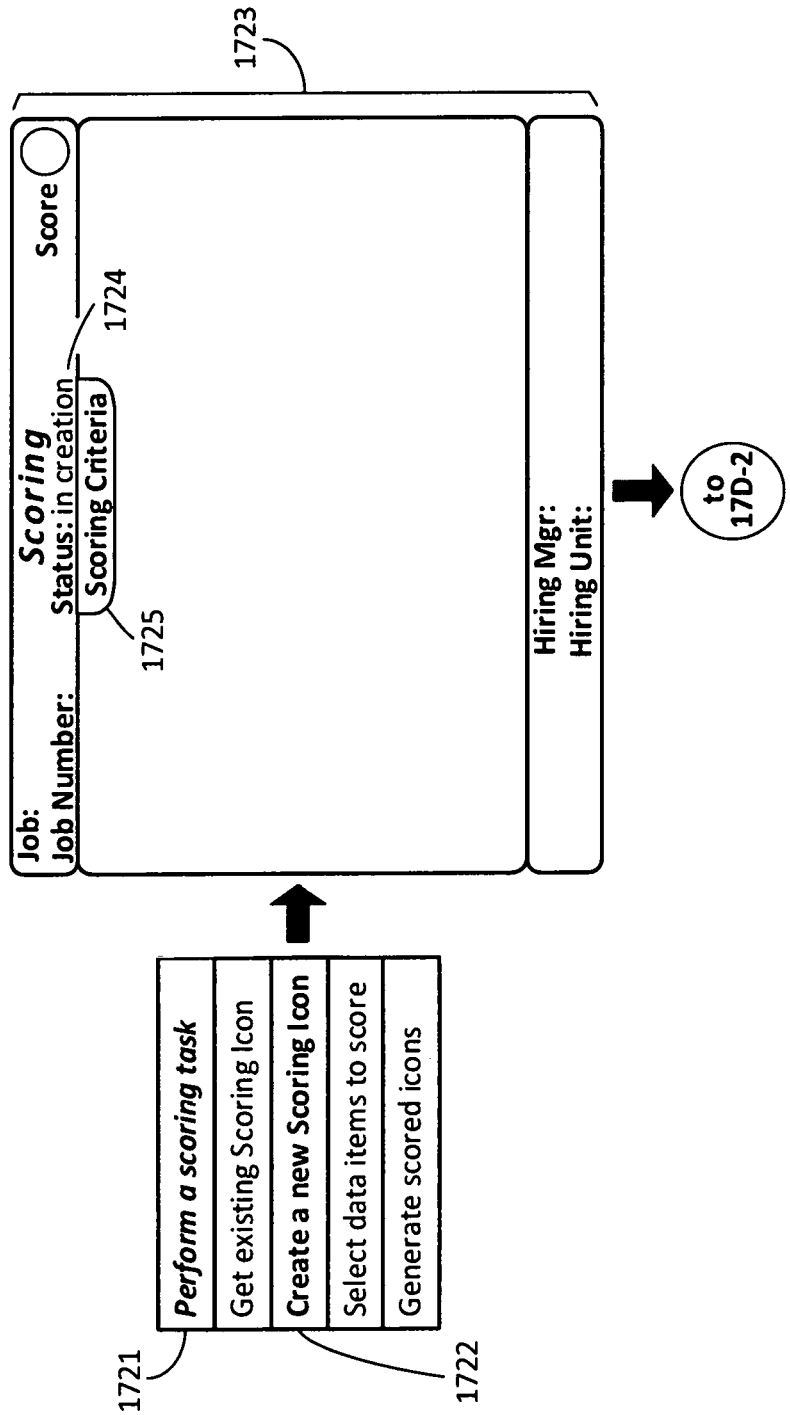
FIG. 17D is a mockup illustrating an example of a Scoring Icon being created.
Figures 2, 17D:
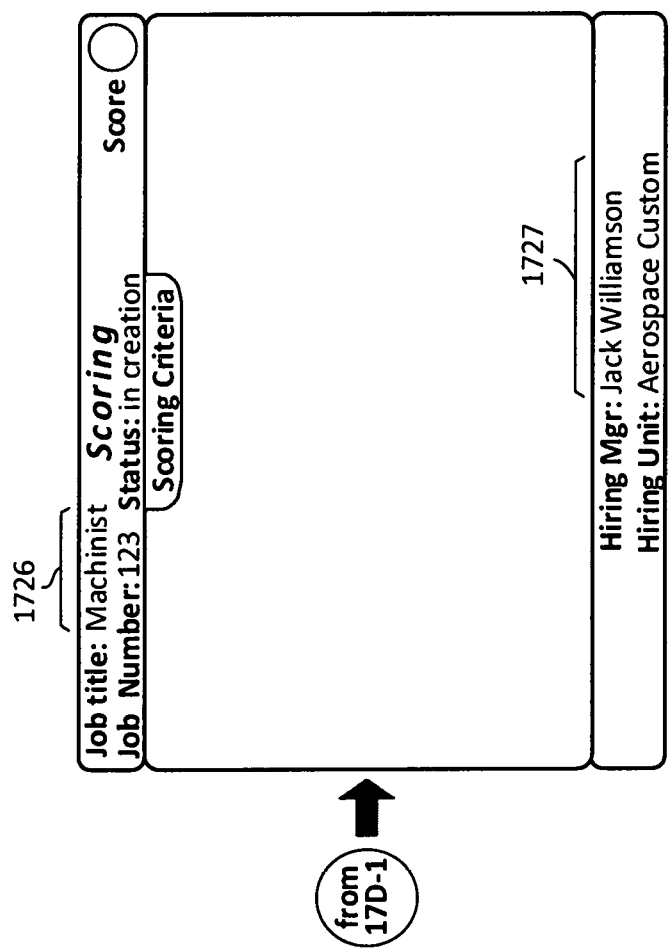

FIG. 17D shows in a staffing example an empty Scoring Icon type to evaluate job applicants. At 1721 the user selects a type of Scoring Icon to display and at 1722 selects the option to create a new Scoring Icon with which to score applicants for a particular job position, whereupon an empty Scoring Icon to score job applicant careers displays at 1723. At 1724 the initial status of the icon being created is "in creation" and at 1725 the Scoring Criteria view displays empty. At 1726, the user inputs data into the "Job title" and "Job number" bar fields configured for the Scoring Icon type at 2090. At 1727 the user inputs data into the ILDS records for the "Hiring manager" and "Hiring unit" bar fields. This data is particular to the new scoring system (i.e., the contents of the bar fields differ between Scoring Icons for use to compare job applicants for jobs).

Note, in this example illustration there is a single view for scoring criteria; a developer can configure at 2090 a plurality of views to hold scoring criteria by the create available views function at 2054.

Figures 1, 17E:
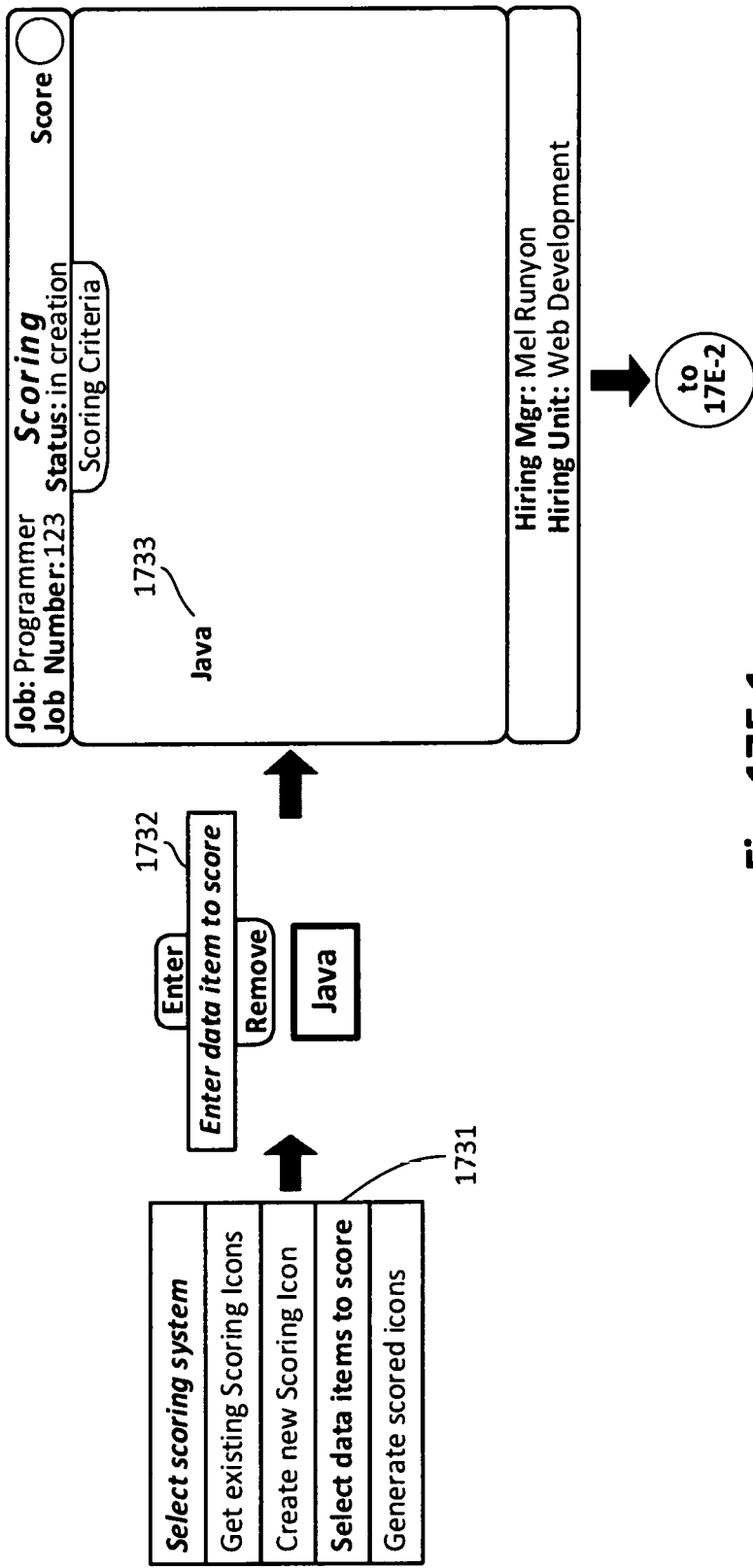
FIG. 17E is a mockup illustrating input of data items into a Scoring Icon as criteria to score, and the score weighting of each.
Figures 2, 17E:
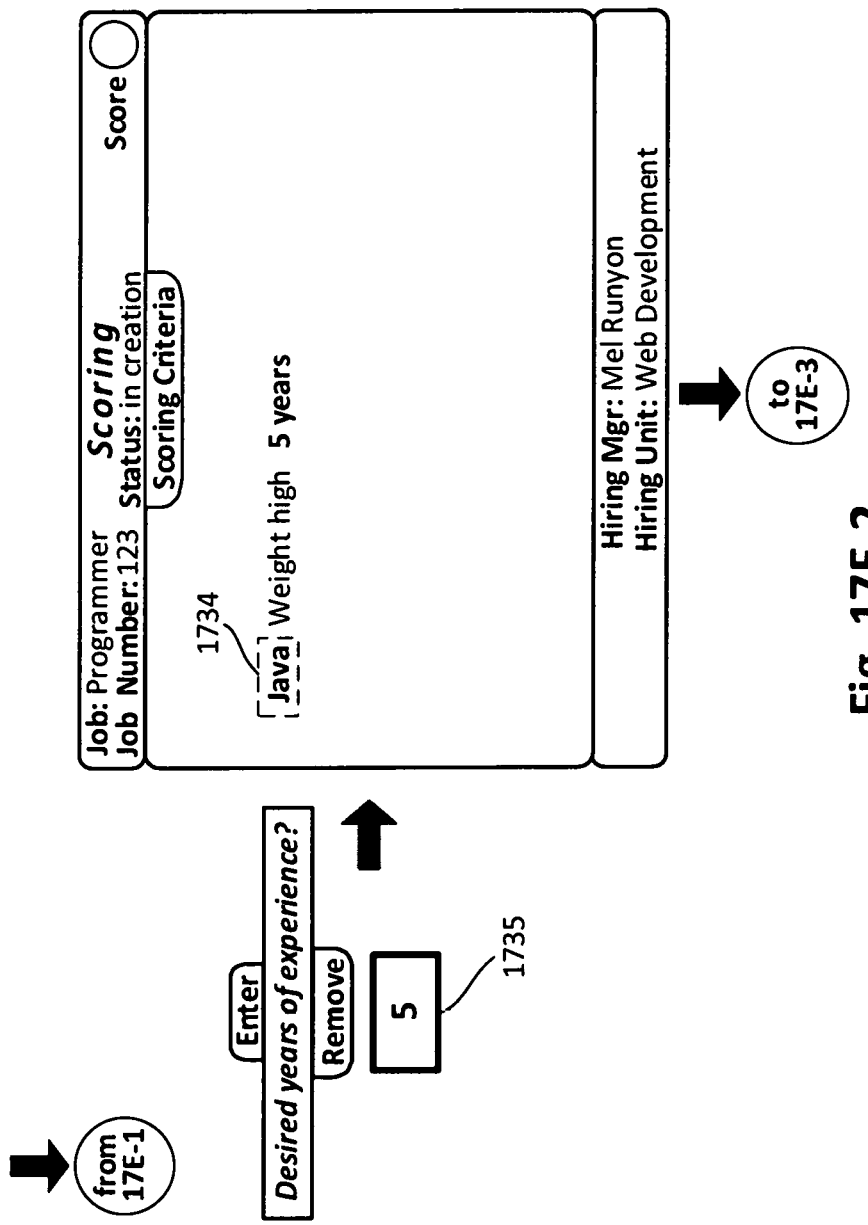
Figures 3, 17E:
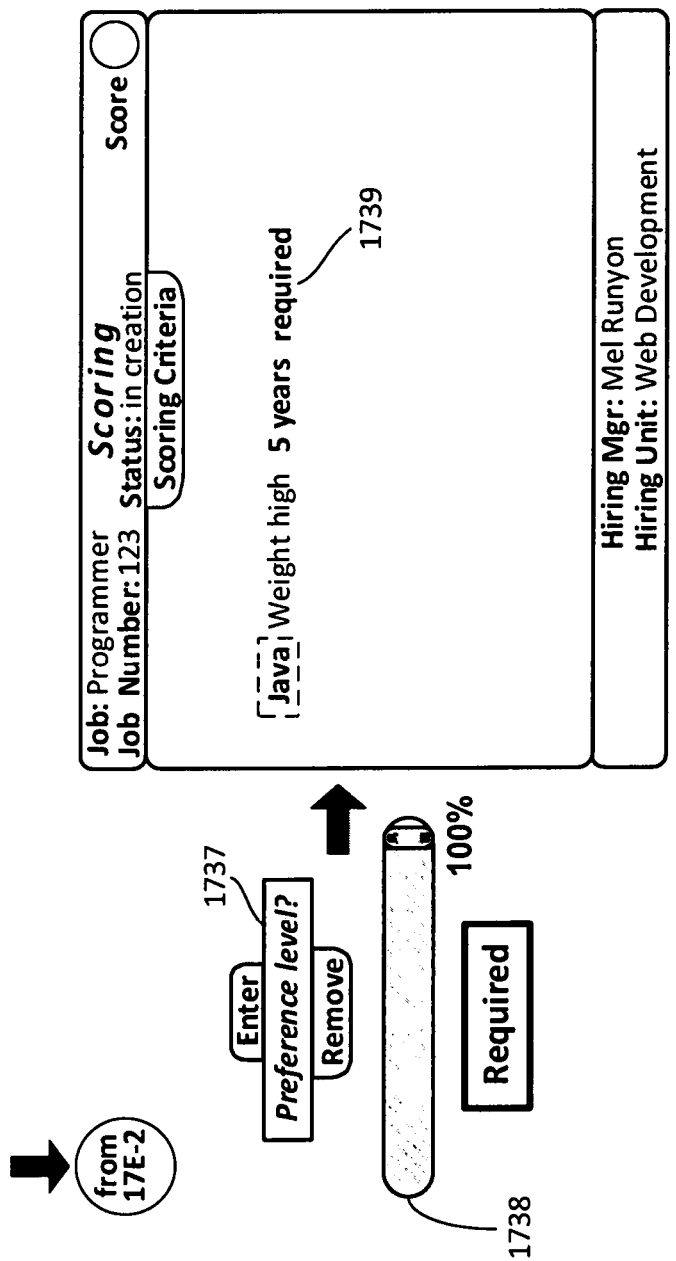

FIG. 17E shows that, upon clicking the "Select data items to score" Scoring Term row in the Scoring List Box at 1731, the Base Control displays with "Enter data item to score" in its Base Control Command component. The user types or dictates "Java" into its Base Control Data component at 1732 and inputs it into the Scoring Criteria view, whereupon it displays at 1733. At 1734, the user double-clicks or dictates "Java" for the input scoring data item in the view and a successor Base Control displays "Desired years of experience?" in a its Base Control Command component. The user types or dictates "5" into the Base Control Data component at 1735, input its, and it displays at 1736. At 1737, the user again double-clicks or dictates "Java" and the system displays a second successor Base Control with "Preference level?" in its Base Control Command component. The user then moves the Base Control Slider Component at 1738 all the way to the right or dictates "100%", and the Base Control Data component displays "Required", the user inputs it, and it displays at 1739.

The successor Base Controls at 1732, 1735 and 1738 display based upon configuration of the ALDS Successor Field at 338 and the ALDS Order Field at 339 in the ALDS record of each as configured at 2035.

An alternative embodiment of the invention replaces percentage numbers with natural-language terms, for example "Nice to have" for 1%-25%, "Mildly preferred" for 26%-50%, "Strongly preferred" for 51%-74%, and "Very strongly preferred" for 75%-99%, in addition to "Required" for 100%.

Figure 17F:
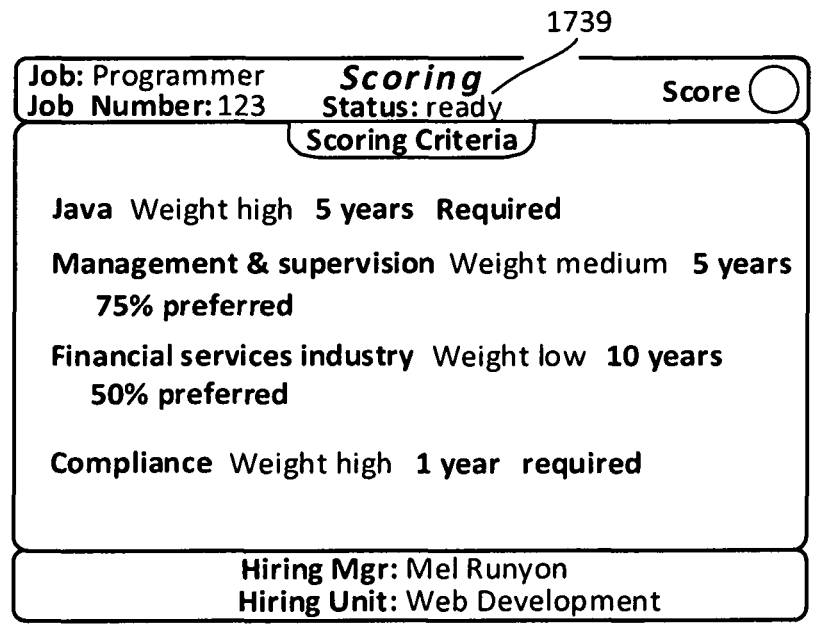
FIG. 17F is a mockup illustrating an example Scoring Icon ready for use to score production icons.

FIG. 17F shows in the same staffing example a completed Scoring Icon with scoring criteria data items input into the Scoring Criteria view. The new Scoring Icon has been stored in memory and the status displayed changes to "ready" at 1739 to indicate that the icon's scoring system is set for deployment to score production Career Icons selected at 2097.

Figure 17G:
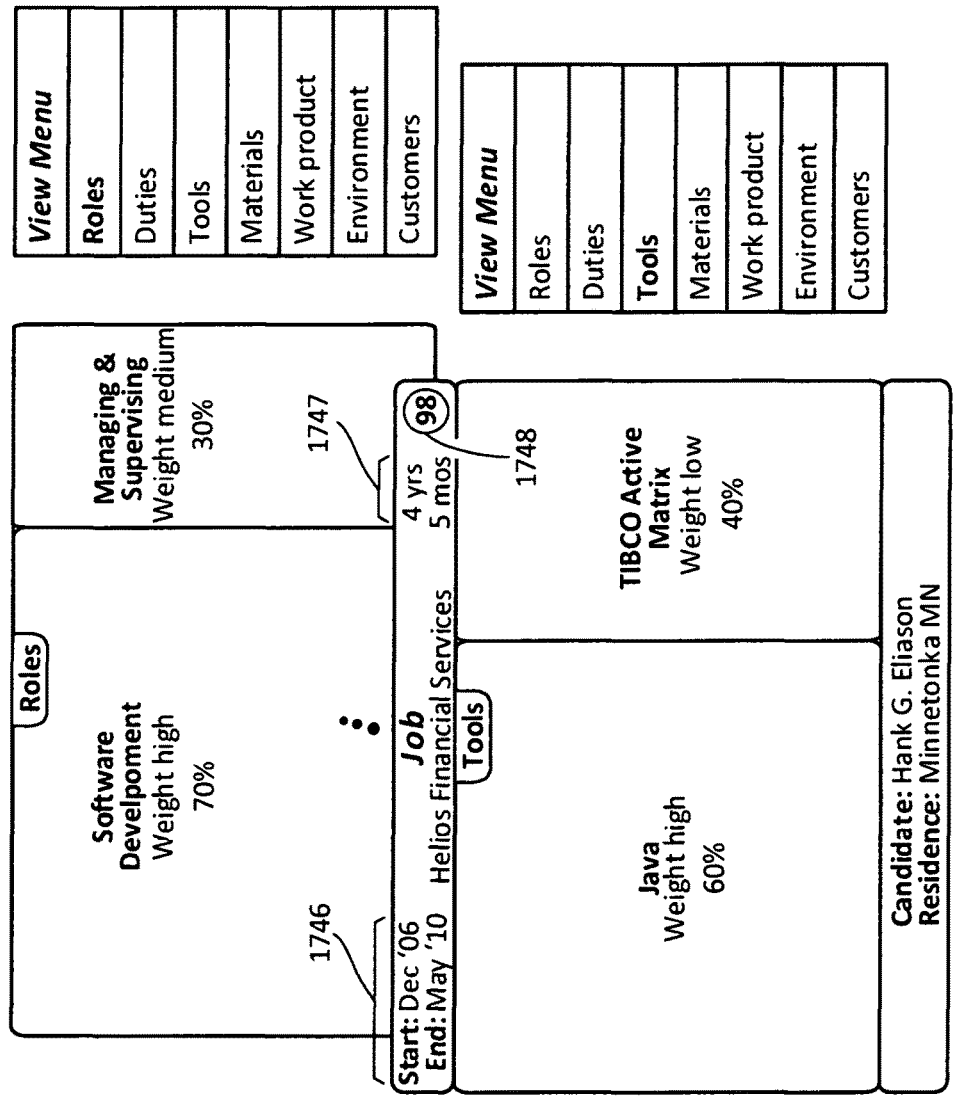
FIG. 17G is a mockup illustrating an example of how time is measured in a production icon and used in scoring it.

FIG. 17G shows in the same staffing example a Job Icon within a job applicant's Career Icon with data input into bar fields for the start date and end date of a job at 1746, and that data in the ILDS records of each are used by the ScoringMgr object to calculate total time in the job and automatically input the sum into an ILDS record at 1737. The total time in the job in this example, four years and five months, is applied to each ILDS shape within the two example views "Tools" and "Roles". The time spent doing each is used to score the job applicant's work experience against the criteria input into the Scoring Icon at 1739. In this example, by having start and end dates on the icon, the percentage of that time span spent using a particular tool or performing a particular role is used to automatically calculate the time of each in years and months, for example 60% of 4 years and 5 months spent using Java to program software amounts to about 2.7 years of experience during his job at Helios Financial Services. That time is a percentage of a bound time span in which if the time spent using one tool is increased the time spent using other tools is proportionately decreased; by this zero-summing it is made difficult for the job applicant to exaggerate time for one data item in a view without understating time in other data items in the view. The job applicant scores displayed in the example Career Icons at method 1756 in FIG. 1711 are calculated using the four scoring criteria input as ILDS records at 1739. The resultant score of "98" in the example Job Icon is displayed at 1748 for Hank G. Eliason is in the same way calculated for other Job Icons in his Career Icon, as at 1756, where Hank G. Eliason's Career Icon displays an aggregate score of "134" for all jobs in his career.

Figures 1, 17H:
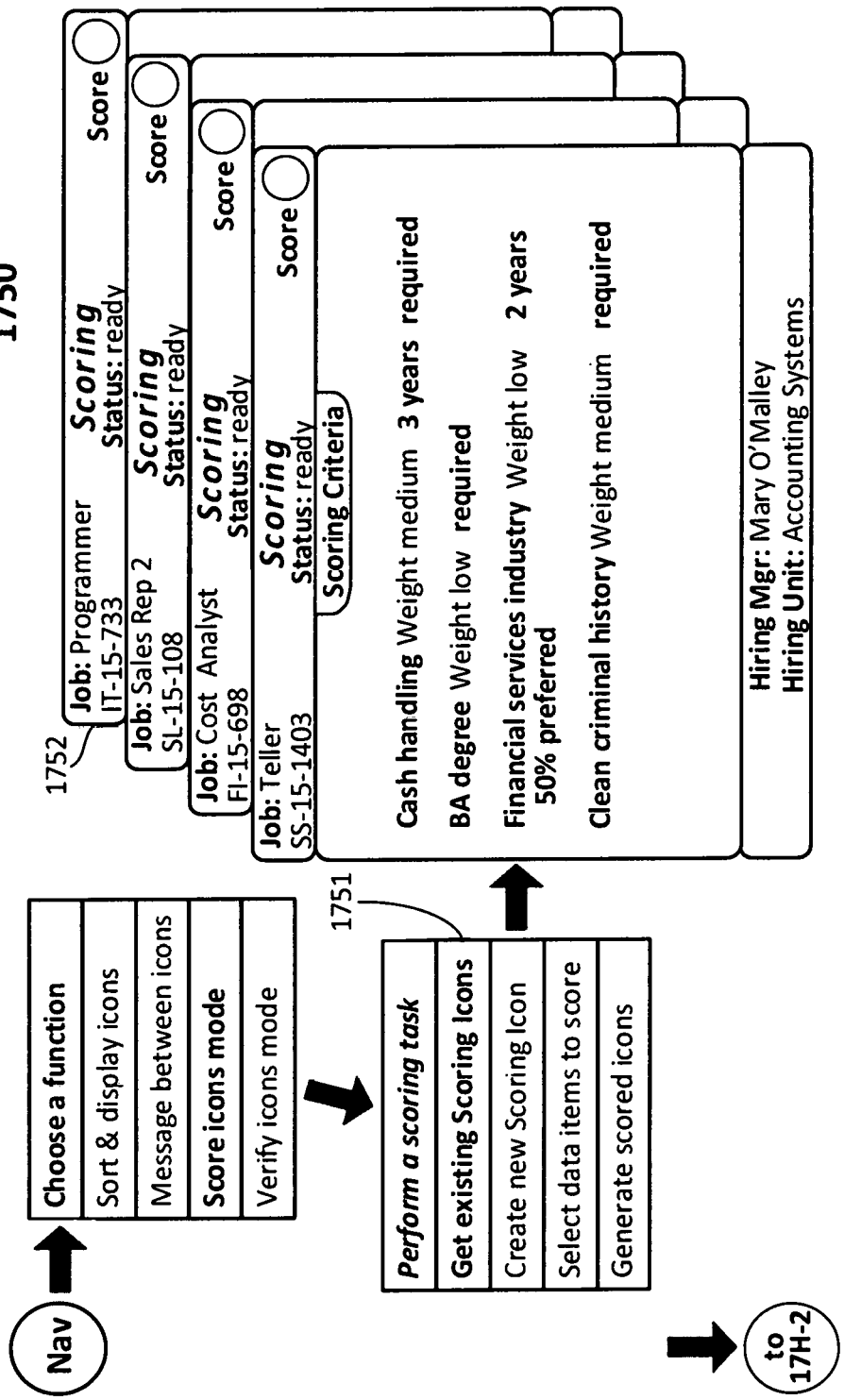
FIG. 17H is a mockup illustrating an example Scoring Icon being applied to a set of production icons and scoring them.
Figures 2, 17H:
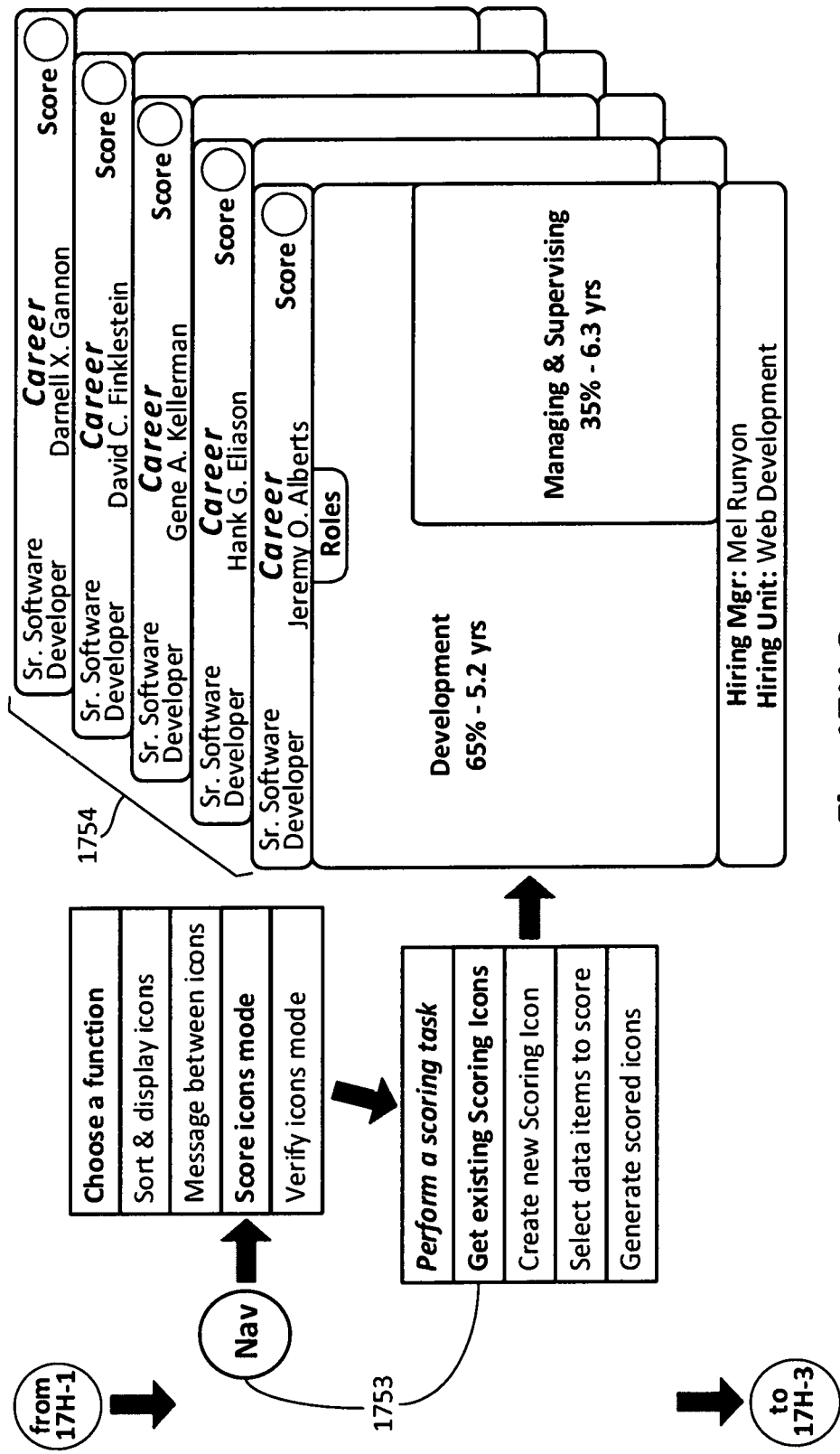
Figures 3, 17H:
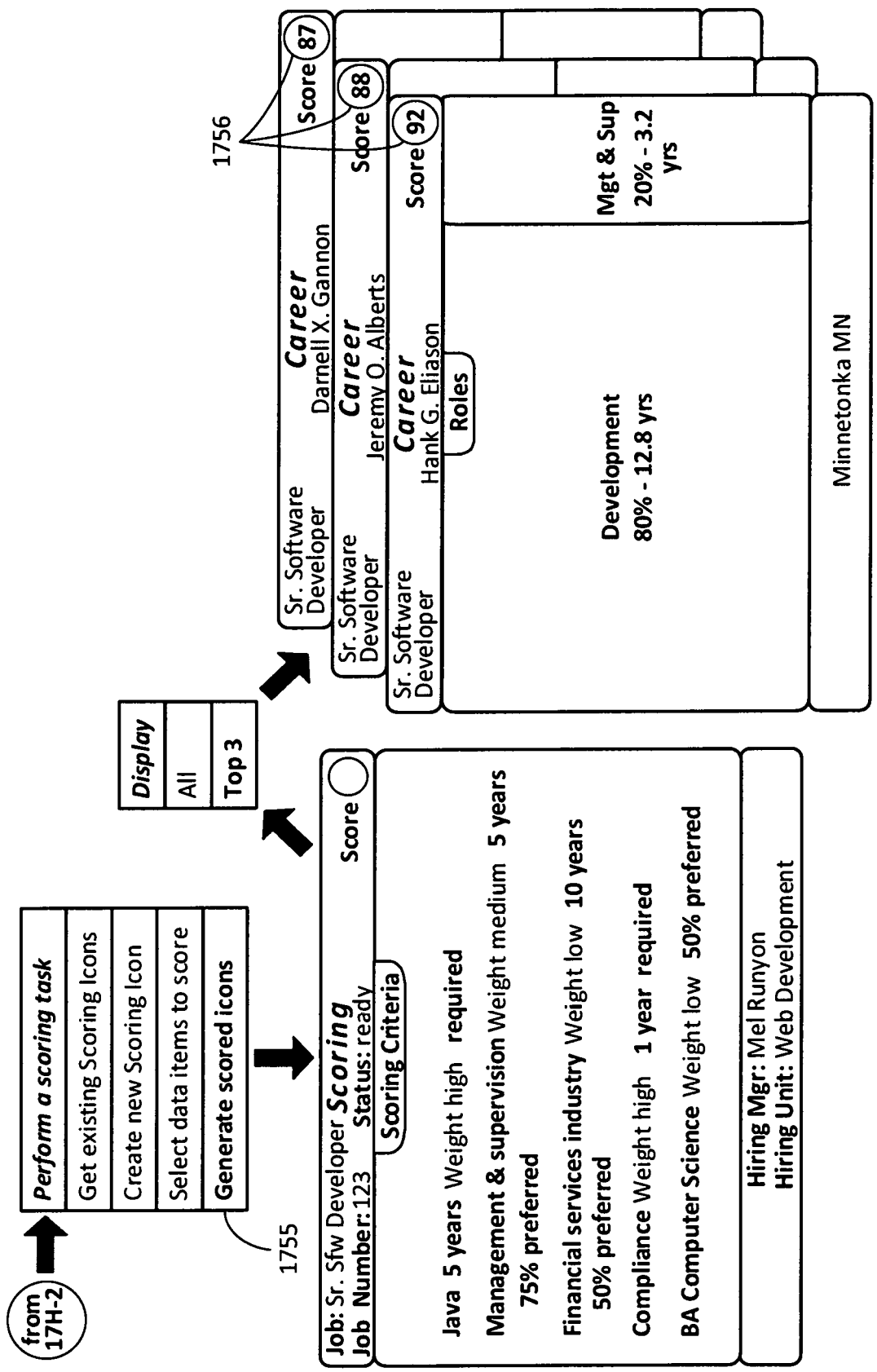

FIG. 17H shows in the same staffing example that, upon clicking the "Get existing Scoring Icons" Scoring Term row in the Scoring List Box at 1751, a set of existing Scoring Icons displays, each containing a particular scoring system, whereupon the user selects the desired Scoring Icon at 1752 configured to evaluate applicants for a particular job opening (IT-15-733 in this example). At 1753 the Nav Control at 1400 is used to display job applicant Career Icons at 1754 for applicants who have applied for job IT-15-733. The user at 1755 applies the four scoring criteria in the Scoring Icon at 1739 to the displayed Career Icons to generate scores for each at 1756, which display in the circles at the right side of each scored Career Icon's upper bar. The career scores are scored by applying the four scoring criteria at 1739 against the ILDS records for the same in Job Icons contained beneath each Career Icon in the icon hierarchy at 1754.

Figure 18A:
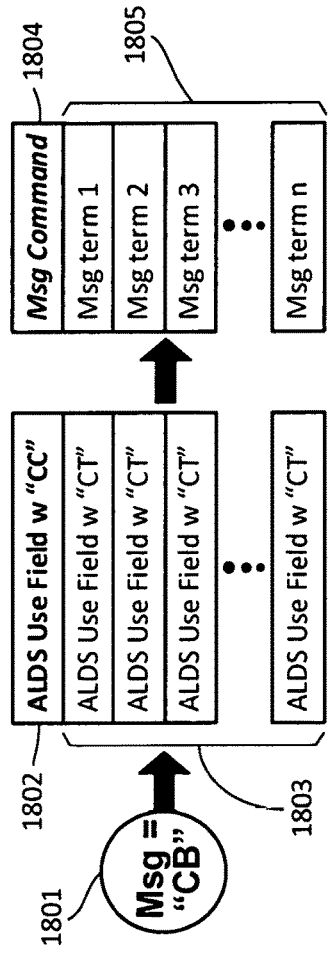
FIG. 18A is a mockup illustration of the components of the Messaging Mode Control.

FIG. 18A depicts the components of the Messaging Control. To display the Messaging Control, the DisplayMgr object collects ALDS records with "CB", "CC" and "CT" in the ALDS Use Field at 331 ("C" stands for communication). The Msg button at 1801 displays the payload of the ALDS record with "CB" in its ALDS Use Field. Upon pressing the button, the payload of the ALDS record with "CC" in its ALDS Use Field at 1802 displays as the Msg Command row at 1804, and the payloads of ALDS records with "CT" at 1803 display in Msg Term rows at 1804 in the order specified for each in the ALDS Order Field at 339. There is a variable number of Msg Term rows.

Figure 18B:
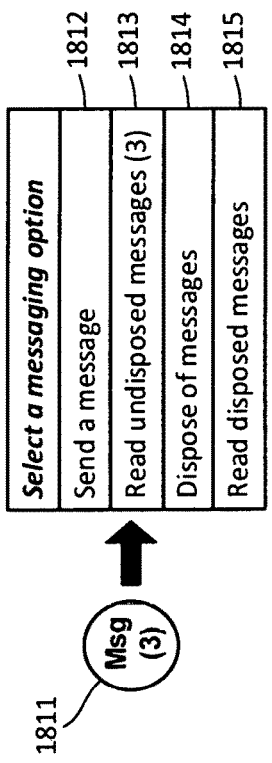
FIG. 18B is a mockup illustrating the preferred embodiment of the Messaging Mode Control.

FIG. 18B illustrates the Messaging button and the Msg List Box displays the four messaging options in the preferred embodiment of the invention: (1) "Send a message" at 1812, (2) "Read undisposed messages" at 1813, (3) "Dispose of messages" at 1814, and "Read old messages" at 1815.

The number in the "Msg (3)" button label at 1811 and the "Read undisposed messages (3)" Msg Term row at 1813 is a dynamic total of unread messages for the user compiled by the MsgMgr object upon display of each control. If there are no unread messages, no dynamic number displays in parentheses in the control.

The MsgMgr object collects ILDS records for each of the four messaging options by status code values in the Tracking Field at 359: "UNS" for draft Message Icon, "SNT" for sent Message Icon, "UNR" for unread received message, "RED" for read received message, "RDF" for draft response Message Icon, "RST" for sent response Message Icon, and "DSP" for disposed message.

At 1812, when the user selects the option "Send a message", the MsgMgr collects ILDS records with the value "UNS" and displays the messages they comprise, the user selects the desired message, selects the command to send it and its value is changed to SNT, whereupon the message can be displayed by its recipient(s).

At 1813, when the user selects the option "Read undisposed messages", the MsgMgr collects ILDS records with the value "UNR" and displays the messages they comprise, the user selects the desired message in order to read it and closes it, whereupon the value in its Tracking Status Field at 859 changes to "RED".

At 1814, when the user selects the option "Dispose of messages", the MsgMgr object collects ILDS records with the value "RED" and "UNR" and displays the messages they comprise, the user selects the desired message and selects the command to dispose of it, whereupon the status of each message changes to "DSP".

At 1815, when the user selects the option "Read old messages", the MsgMgr collects ILDS records with the values "UNR" and "RED" and displays the messages they comprise, the user selects the desired message in order to read it, and closes it.

Figure 18C:
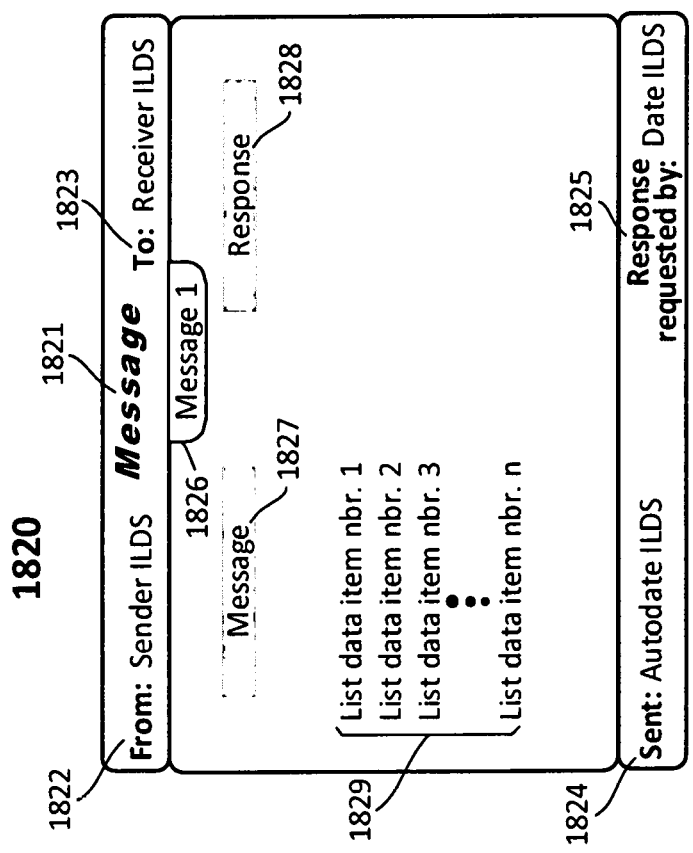
FIG. 18C is a mockup illustrating a Message Icon with example bar fields and lexicon-based messaging components.

FIG. 18C illustrates the Message Icon type at 1821. Bar fields, views and legends on the icon are configured at 2060. At 1822 is the bar field label "From:" adjacent to bar field data component to contain the ILDS payload of the name of the user to send the message. At 1823 is the bar field label "To:" adjacent to bar field data component to contain the ILDS payload(s) of the name of the user(s) to receive the message. At 1824 is the bar field label "Sent:" adjacent to the bar field data component to contain the ILDS payload of the date and time the message is sent. At 1825 is the bar field label "Response requested by:" adjacent to the bar field data component to contain said date that is to be input by the user who will send the message. At 1826 is the view panel name tab to display the particular name configured for a Message Icon at 2055; the user can configure a plurality of views to display ILDS records within the Message Icon. At 1827 is the legend "Message" and at 1828 is the legend "Response" to appear above data items input into the column beneath each. ILDS payloads input into the view display in the Message Icon are depicted at 1829.

Figure 18D:
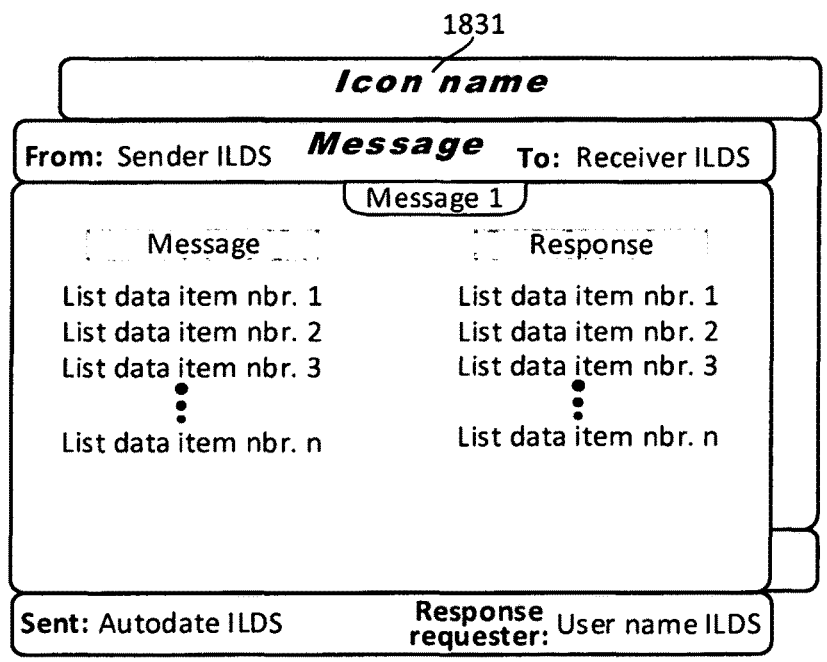
FIG. 18D is a mockup illustrating that one or a plurality of icons can be attached to a Message Icon.

FIG. 18D depicts that the user can attach one or a plurality of production icons to a Message icon at 1831.

Figure 18E:
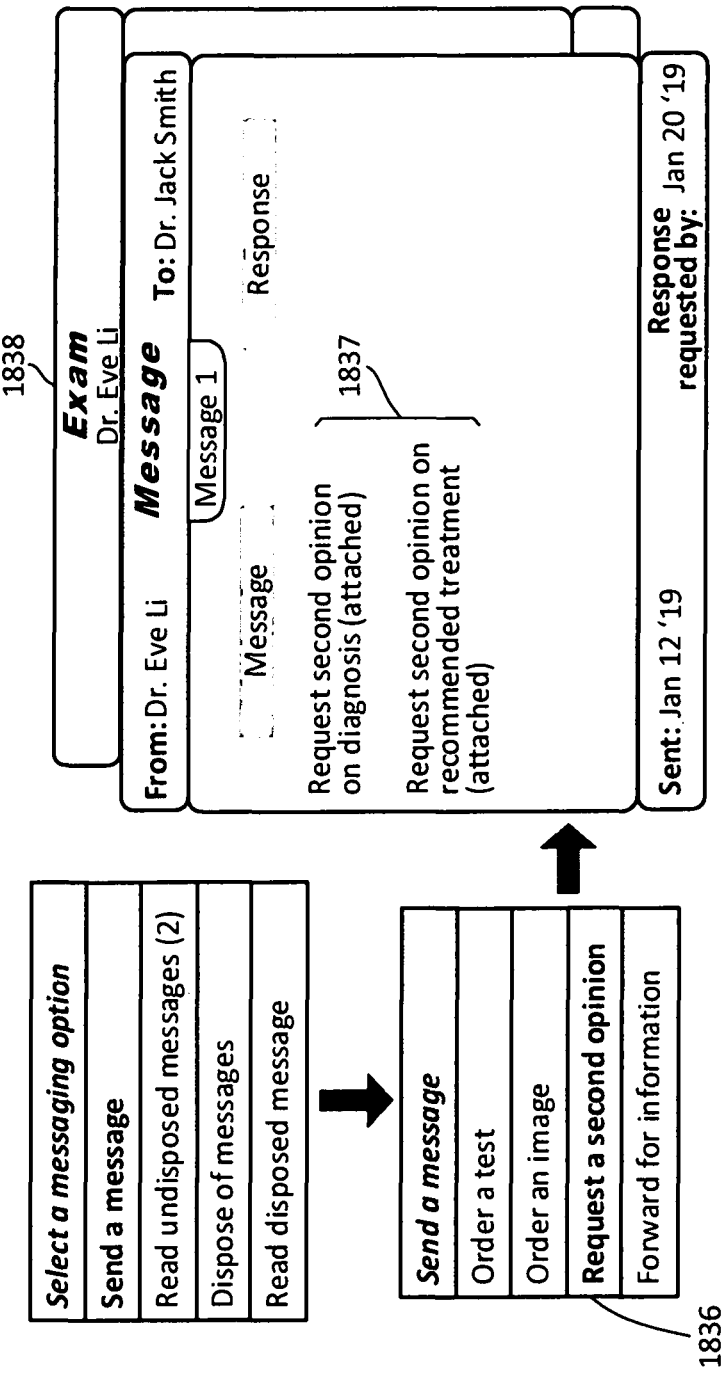
FIG. 18E is a mockup illustrating an example of message content input into a Message Icon to be sent.

FIG. 18E illustrates in a medical example how data items are input into a Message Icon. The user selects the "Send a message" option from the Messaging List Box at 1812, whereupon a Messaging List Box displays at 1836 four Msg Term rows in a list box configured for a medical application. The user selects the "Request a second opinion" Msg Term row and an empty Message Icon view configured for medicine displays (the view is not depicted empty in this mockup illustration). At 1837 the user inputs into the empty view two ILDS records beneath the "Message" legend, and displays the payload of each on separate rows, each requesting a response from the recipient physician. At 1838 an Exam Icon type is attached to the Message Icon for the recipient physician to review.

Figures 1, 18F:
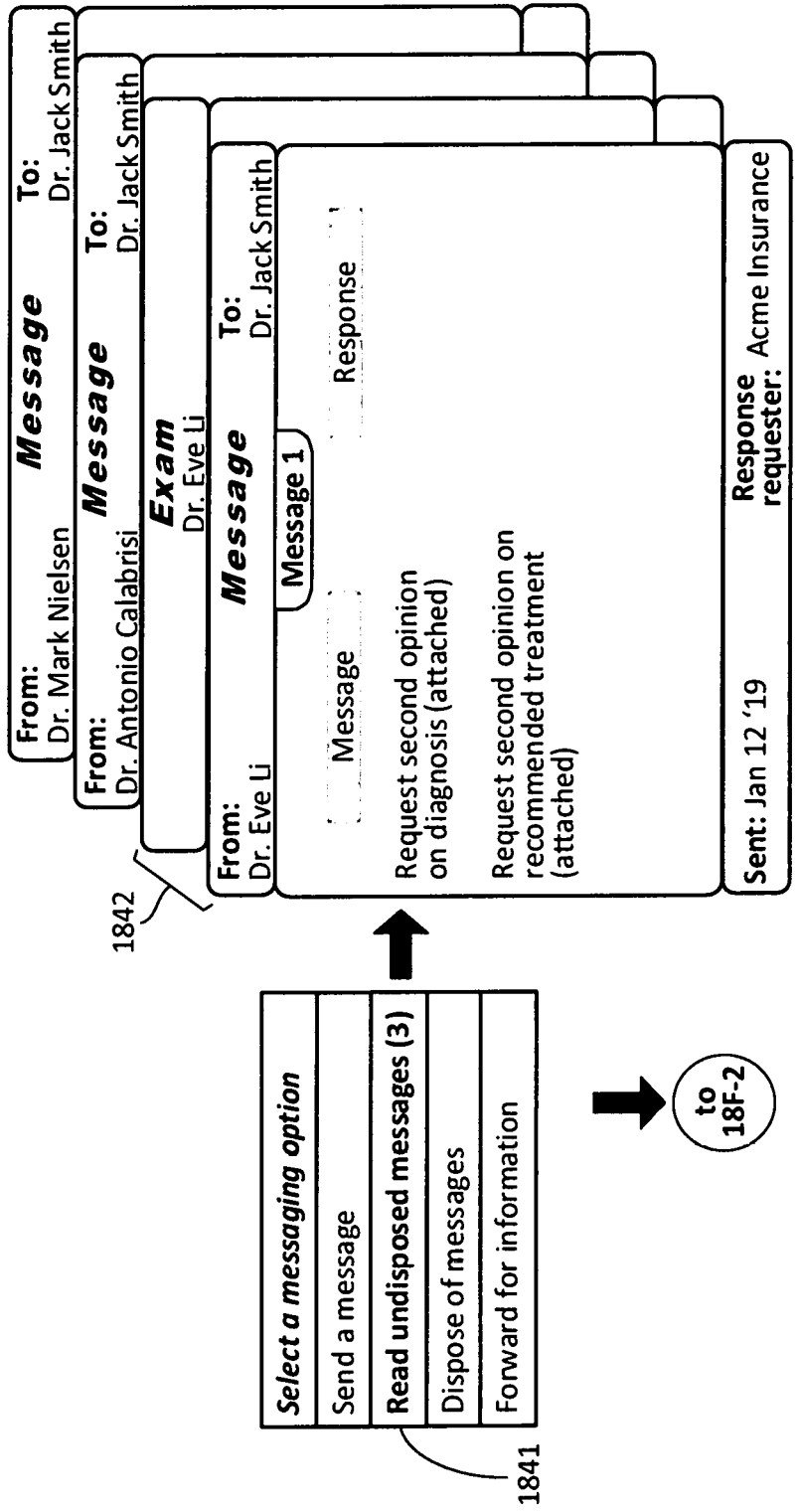
FIG. 18F is a mockup illustrating an example of message content input into a received Message Icon to be sent back as a response.
Figures 2, 18F:
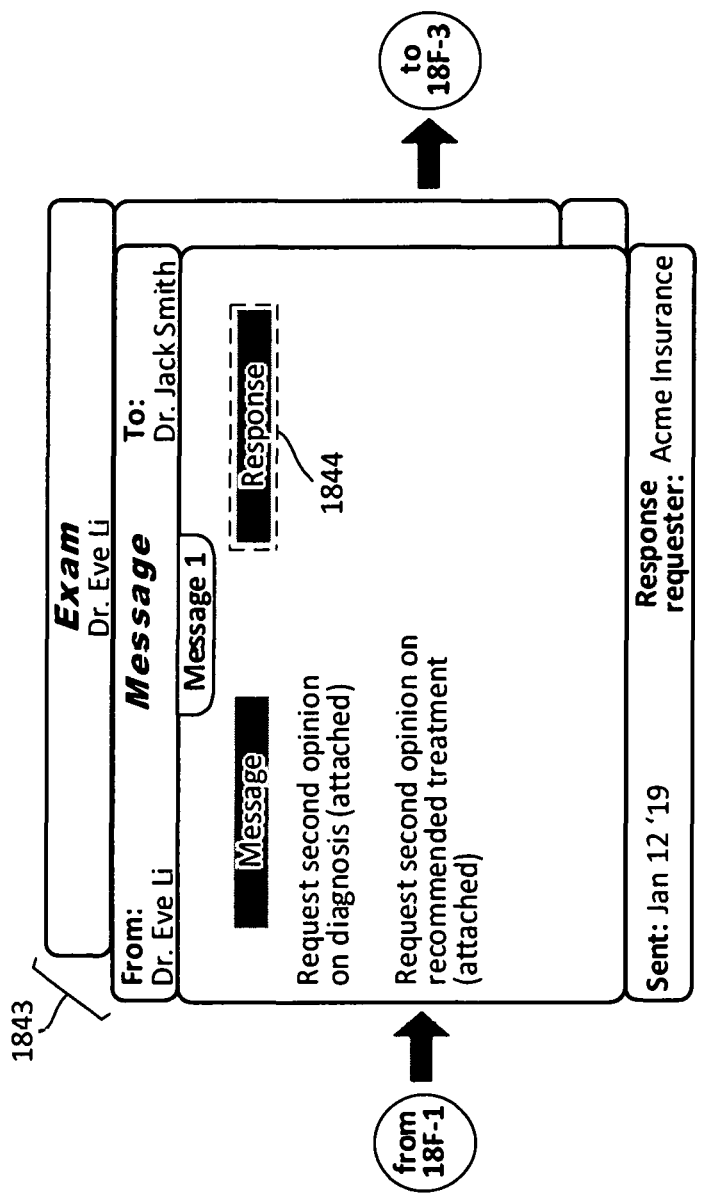
Figures 3, 18F:
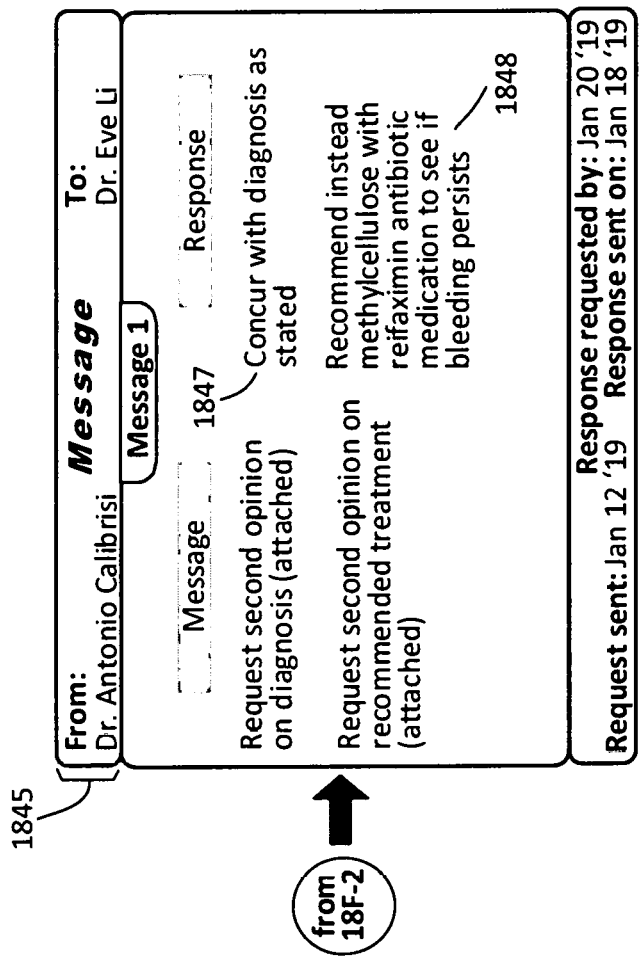

FIG. 18F illustrates in the same medical example how the recipient of a Messaging Icon selects a message and sends back a response. At 1841 the user selects the "Read undisposed messages (3)" option from a Messaging List Box, whereupon at 1842 a group of three Message Icons displays, one with an attached icon. The user selects the Message Icon with an Exam Icon attached at 1843 and double-clicks the "Response" legend at 1844, whereupon the Message Icon displays with a response icon made so by the reformatting of its upper bar at 1845 that displays the recipient physician in the "From" bar field data component (Dr. Antonio Calibrisi in this example). At 1846, upon Dr. Calibrisi sending his response message to Dr. Erik Thorklinsen message, the "Response sent on" bar field is populated with the date is was sent. The user inputs ILDS records into its Response column at 1847 and 1848 by selecting from among ADLS records displayed in list box configured for the Messaging Icon in this medical example (not illustrated here).

Note, the response at 1848 is not free text typed or dictated into an ILDS record and displayed, the response is a concatenation of inputs from List Box Terms configured for medical messaging in this application, as at 1180. In other words, none of this response is non-data information; it is all related data.

Figure 19A:
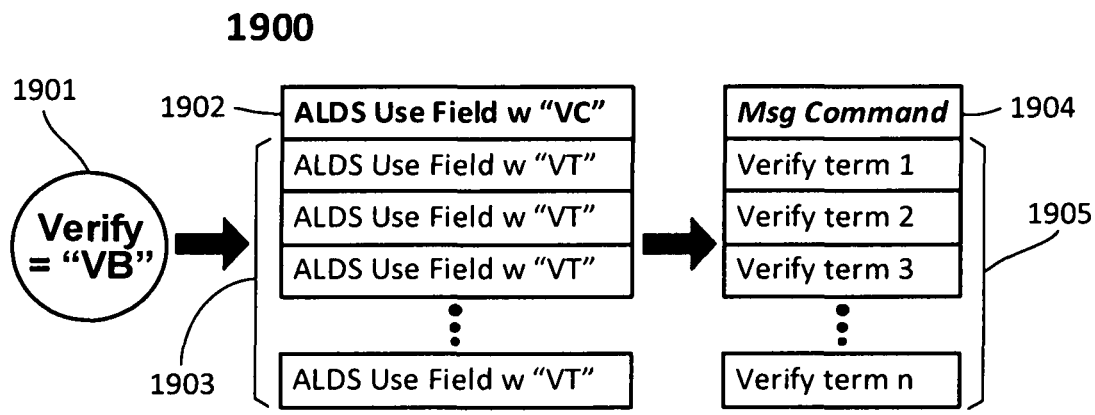
FIG. 19A is a mockup illustration of the components of the Verify Mode Control.

FIG. 19A depicts the components of the Verify Control. To display the Scoring Control, the DisplayMgr object collects ALDS records with "VB", "VC" or "VT" in the ALDS Use Field at 331. The Verify button at 1901 displays the payload of the ALDS record with "VB" in its ALDS Use Field. Upon pressing the button, the payload of the ALDS record with "VC" at 1902 displays as the Verify Command row at 1904, and the payloads of ALDS records with "VT" at 1903 display as Verify Term rows at 1905 in the order specified for each in the ALDS Order Field at 339. There is a variable number of Verify Term rows.

Figure 19B:
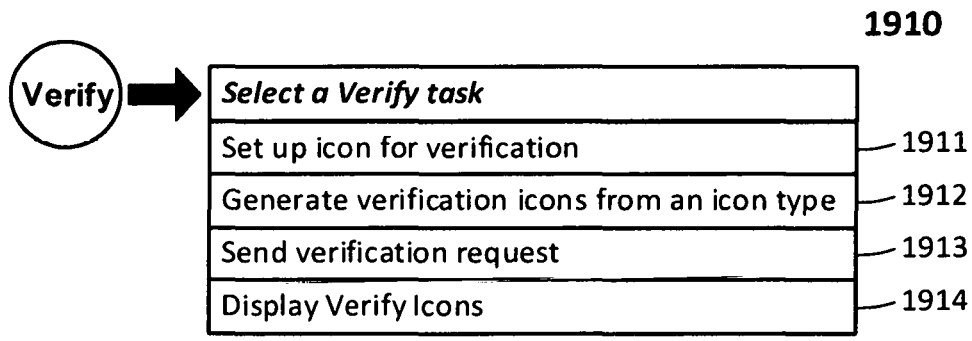
FIG. 19B is a mockup illustrating the preferred embodiment of the Verify Mode Control.

FIG. 19B shows the four Verify Term rows in the Verify List Box in preferred embodiment of the invention:

At 1911 is the "Set up icon for verification" Verify Term row; upon clicking it a list of Verify Icons configured at 20100 displays. The user selects a particular Verify Icon and it displays with its bar fields and view(s) empty.

At 1912 is the "Generate Verify Icons from an icon type" row; upon clicking it the VerifyMgr object collects the requested production icons, extracts the ILDS records from the production icons for the bar fields and views configured for the Verify Icon type at 1920, and displays their payloads.

At 1913 is the "Send verification request" Verify Term row; upon clicking it the system interoperates with the enterprise email system and automatically inserts text into the email announcing the subject to be confirmed, the process of verifying ILDS records in a Verify Icon, and includes a link and a password to the lexical application that the verifying person or organization can use to confirm the Verify Icon.

Note, the verifying person double-clicks the hyperlink embedded in the body of the email, enters the temporary password to log into the lexical application, and proceeds with the verification process hereunder as a verifying user.

At 1914 is the "Display Verify Icons" Verify Term Row; upon clicking it a list of all Verify Icons displays. The user can sort Verify Icons by the view status component at 906 by (1) "In-Preparation" displays a list of configured Verify Icons not yet populated with data from production icons at 1929, (2) "Verify" displays a list of Verify Icons ready to send, or that have been sent but not yet returned at 1948, (3) "Verified" displays all Verify Icons that have been returned and all data items with question marks ("?") are confirmed at 1958, and (4) "Disputed" displays all Verify Icons that have been returned and contain dispute(s) at 1964.

Note, Verify Icon markings the question mark ("?") for verification requested on a data item, the check mark ("√") for the data item is verified, and the ex-mark ("X") for the data item is disputed are used in mockups hereunder for comprehension purposes only; a software product based on this invention may use a color or another display property to mark data items in Verify Icons.

Displaying Verify Icons is using the Nav Control at 1400 to sort Verify Icons by ILDS records other than by the four view statuses at 1910, for example by date or by the name of a person or entity for which there is a Verify Icon.

Note, the examples hereunder illustrate for comprehension purposes Verify Icons generated from production icons of jobs held by a person. Verify Icons can also be generated to confirm data about a particular entity (a thing), for example a Verify Icon containing data items pertaining to a commercial building or a residence up for potential sale.

Figure 19C:
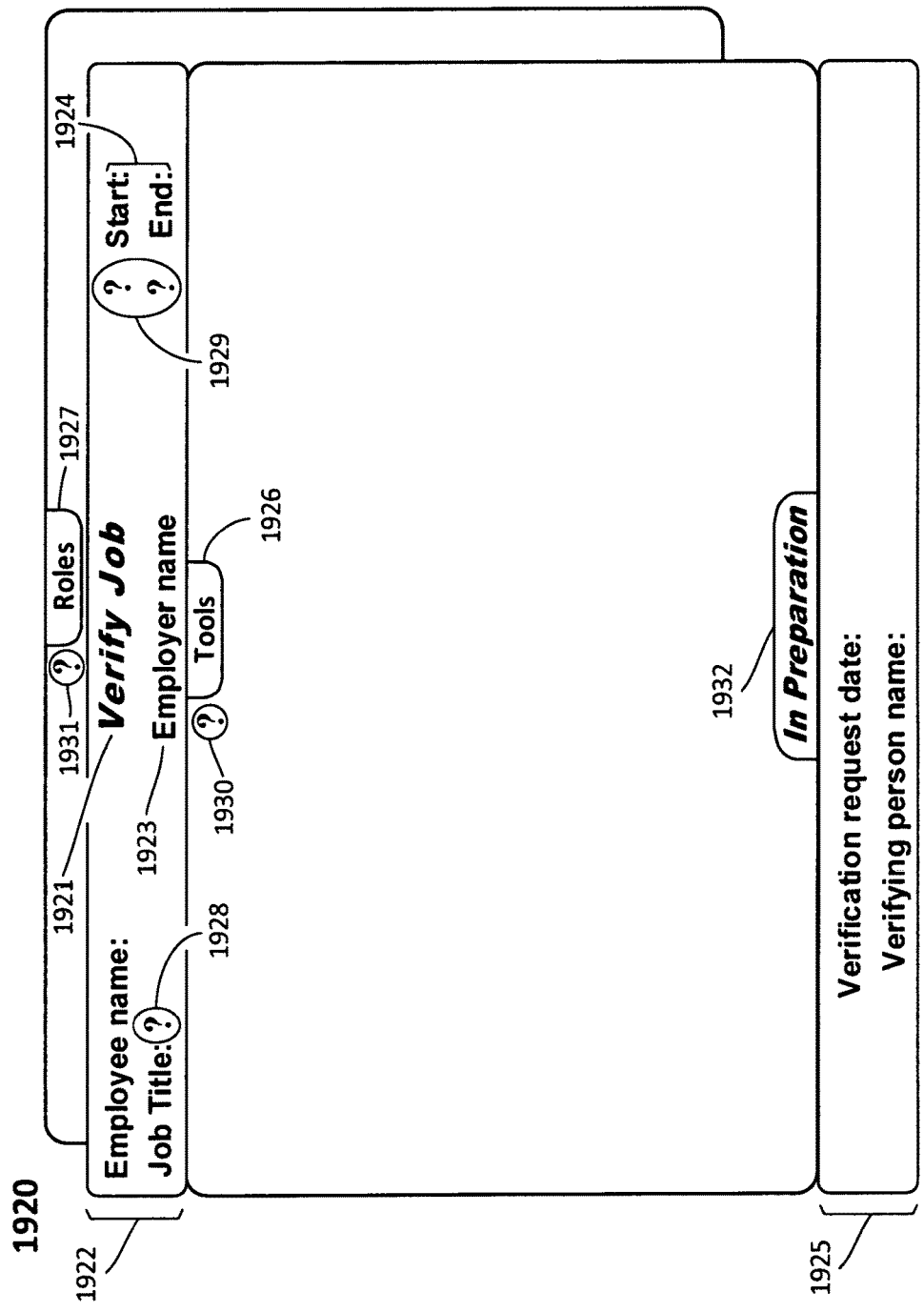
FIG. 19C is a mockup illustrating a blank Verify Icon being configured for an example job opening.

FIG. 19C shows in a staffing example a Verify Job Icon at 1921 configured from a blank Verify Icon type with bar fields at 1922 through 1925 and two views for confirmation at 1926 and 1927. The user then places question mark symbols ("?") on desired bar fields at 1928 and 1929 and on desired views at 1930 and 1931 for confirmation. The ILDS record of each question mark ("?") symbol is accompanied by a second ILDS record with an empty payload for later input by the verifying user. The ILDS record for the data item being verified has the value "VFY" in its What Field at 312; the ILDS record for the verifying user's confirmation has the value "VFP" in its What Field. At 1932 is the view status tab that displays the default label "In-preparation" in each view selected for verification until the user moves the Verify Job Icon to the subsequent status of "Verify".

Figure 19D:
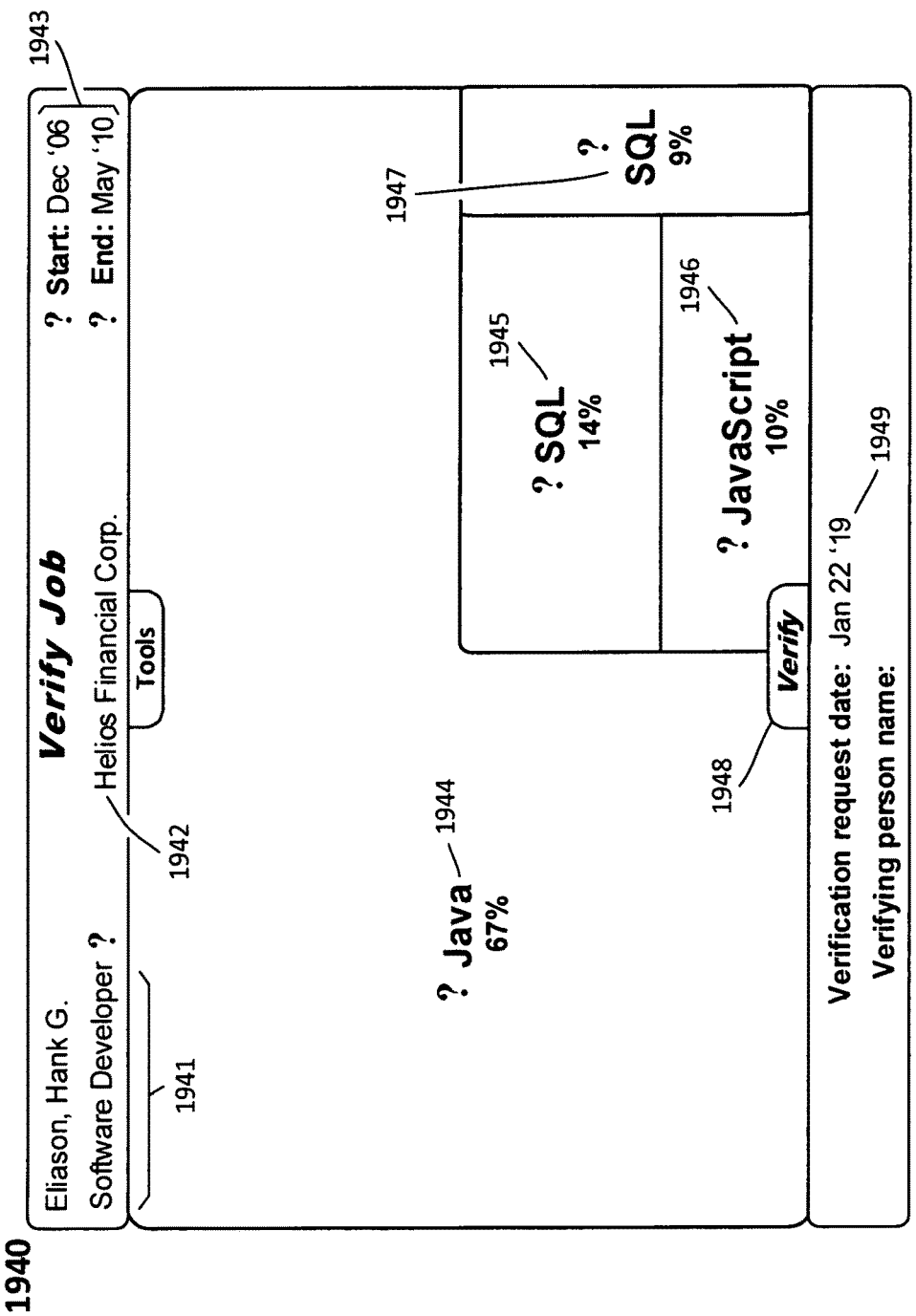
FIG. 19D is a mockup illustrating an example Verify Icon populated with data from a production icon.

FIG. 19D shows in the same staffing example a Verify Job Icon populated with data from a production Job Icon for an example subject Hank G. Eliason. The population of the Verify Job Icon is done by the same process illustrated at 1740 for selecting a set of production Job Icons for scoring using a particular Scoring Icon. At 1941 through 1947 are fields populated with data from the example subject person's Job Icon, both in bar fields and in views. At 1948 is displayed the automatically populated "Verification request date" for the Verify Job Icon. At 1949 is displayed the icon status "Verify" that is entered into upon creation of a Verify Job Icon populated with data from a particular subject person's Job Icon.

Figure 19E:
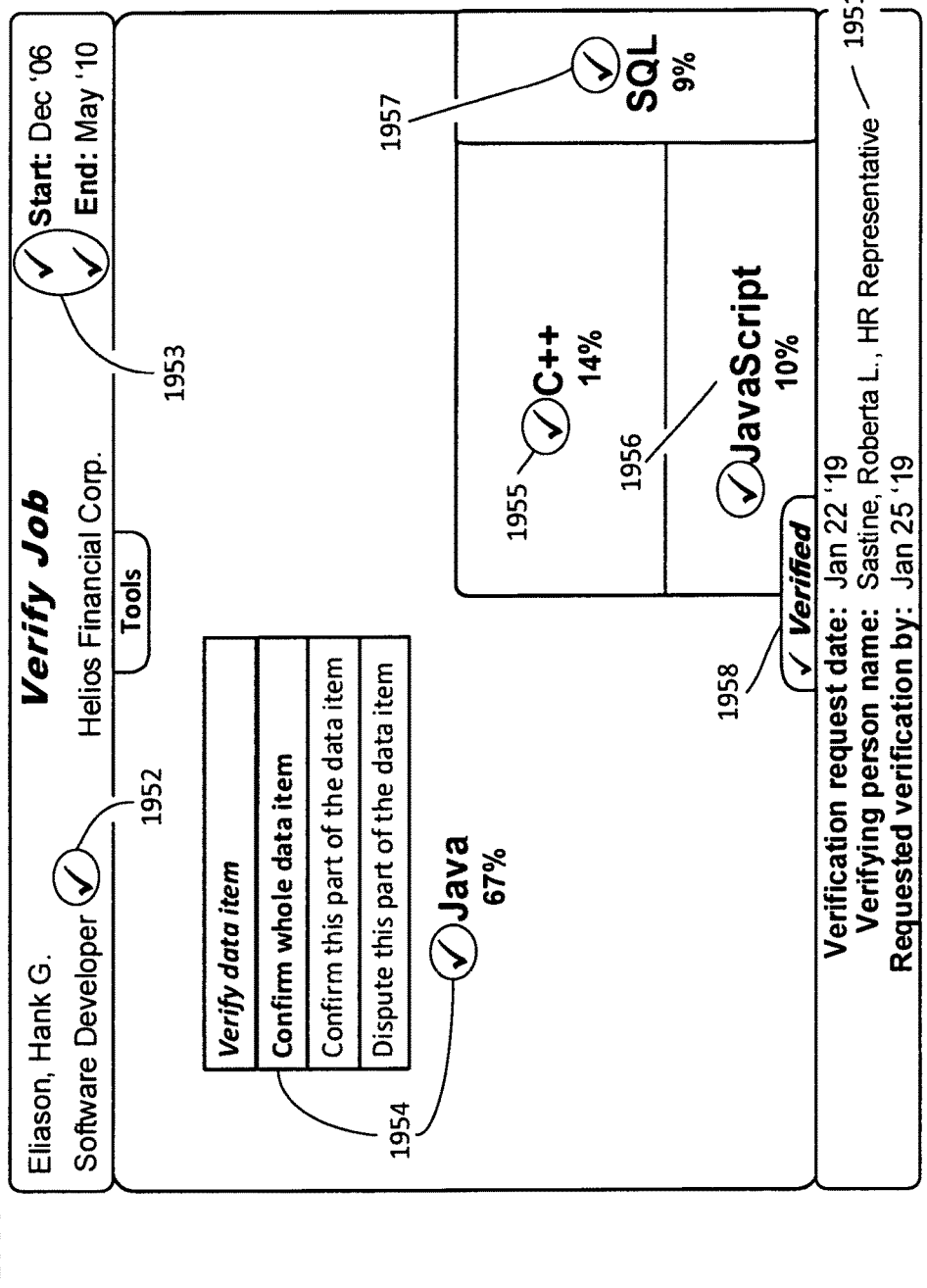
FIG. 19E is a mockup illustrating a Verify Icon completed by a verifying person.

FIG. 19E shows the same staffing example Verify Job Icon with confirmation data input by the verifying person on the data items with question marks ("?"). When the verifying person logs into the lexical application, she enters her name at 1951 and the system stores the person's identity in the Who Field at 311 of the ILDS record for the "Verifying person's name" field. The verifying user then inputs a confirmation on each data item with a question mark ("?") by either inputting a check mark ("J") to confirm it, or by inputting an ex-mark ("X") to dispute it. To do this, the verifying user double-clicks either subpart of a data item (i.e. its label or its percentage number) whereupon the system displays the Verify Data Item List Box with the ILDS payload with the value "VC" in its Command Row, and ILDS payloads with the value "VT" in the Verify Term rows with the row values (1) "Confirm whole data item", (2) "Confirm this part of the data item", and (3) "Dispute this part of the data item".

If the verifying person inputs "Confirm whole data item", a check mark displays adjacent to the data item, as at 1954. In this example, all of the data items with question marks ("?") are verified with a check mark ("√"), the question mark ("?") is automatically removed from beneath the view name tab, and the view status tab displays the status "Verified" at 1958. This process is done on a view-by-view basis in Verify Icons with a plurality of views containing ILDS records with question marks ("?") to request verification.

Figure 19F:
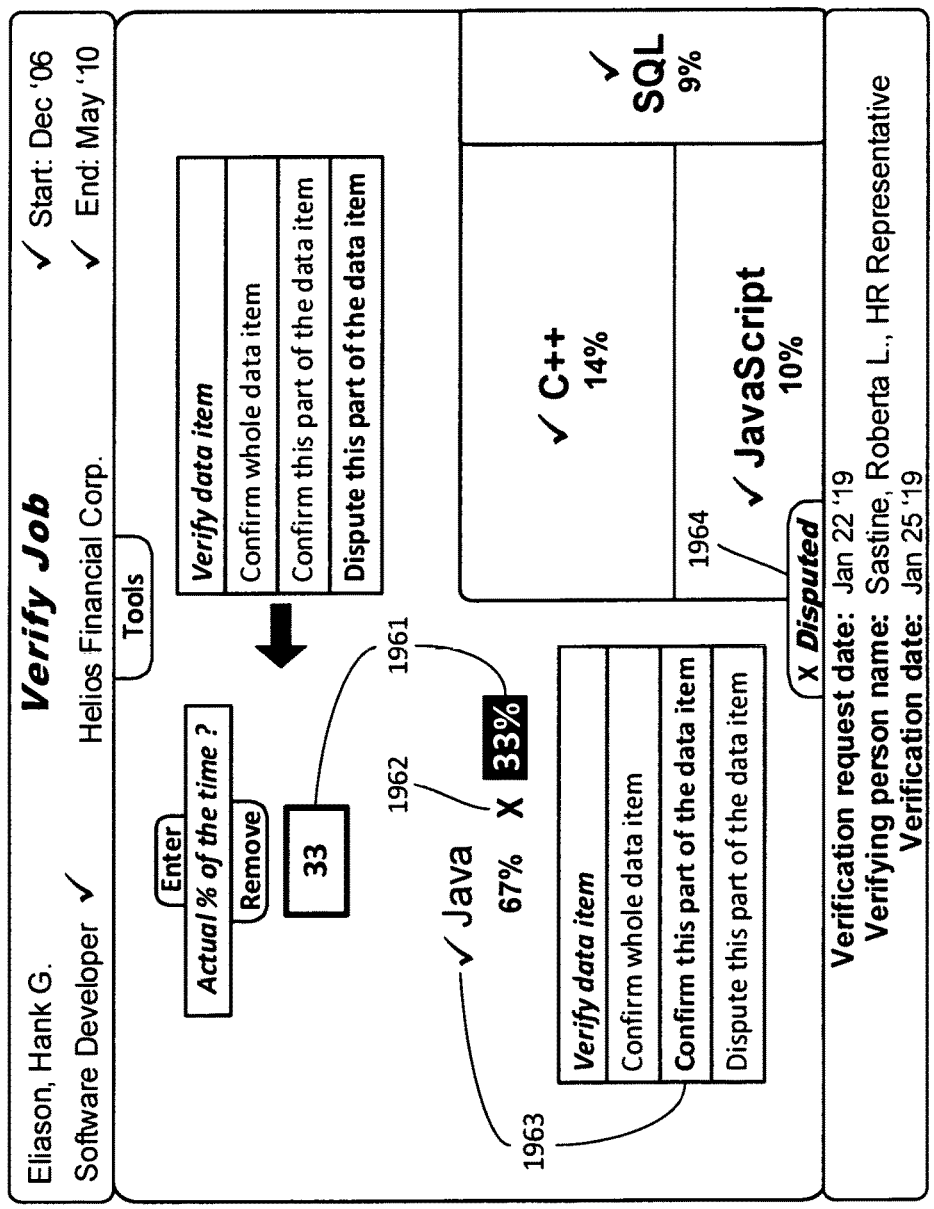
FIG. 19F is a mockup illustrating a Verify Icon completed by a verifying person with a disputed data item.

FIG. 19F shows the staffing example Verify Job Icon with verification input by the verifying user as at 1950. If the verifying person inputs the "Dispute this part of the data item" row in the Verify Data Item List Box, in this example on the percentage subpart of the data item, the Base Control displays with the payload of the ILDS in its Base Command, 67%, and the verifying person types or dictates a different value into the Base Control Data component and inputs it at 1961, whereupon an ex-mark ("X") displays adjacent to the disputed subpart of the data item at 1962. The user then sets focus to the payload "Java" and inputs "Confirm this part of the data item, whereupon a check mark ("√") displays adjacent to it at 1963. If one or more data items are disputed in a view, the view status tab displays "Disputed" as at 1964.

Figure 20A:
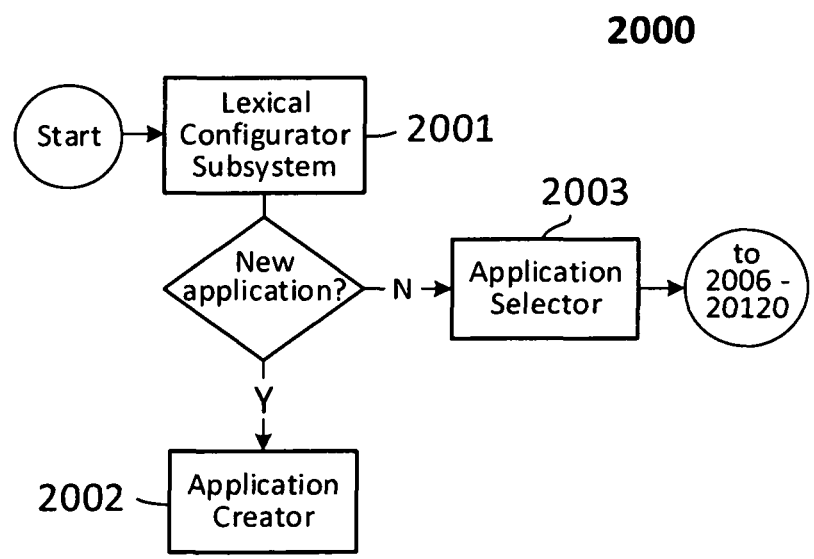
FIG. 20A is a process flow diagram of the lexical configurator used to create a new application or to configure an existing one.

FIG. 20A depicts the lexical configuration subsystem at 2001 in which there is a plurality of screens and interfaces for use in configuring the various components of a lexical application set forth in FIGS. 20B through 20N. The lexical configurator is a subsystem that operates separately from the lexical application, and is connected to it intermittently to configure the application. At 2002 there is the Application Creator interface to create a new application file; when one is created, the developer gives it a name and stores it in memory. At 2003 there is the Application Selector interface that lists lexical applications from which the developer can select in order to perform configuration tasks.

Figure 20B:
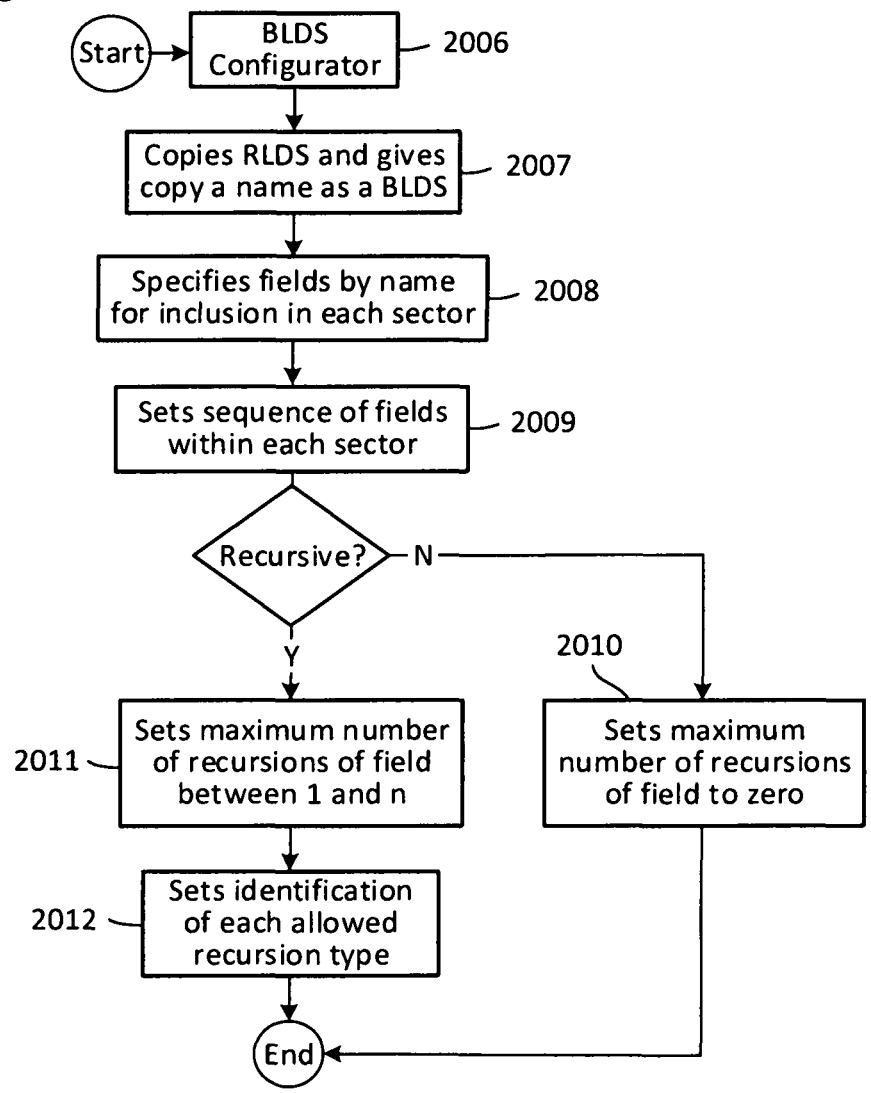
FIG. 20B is a process flow diagram of the lexical configurator used to create a BLDS and configure fields within it.

FIG. 20B depicts the process to create a BLDS and configure its fields for an application. At 2006 there is the BLDS Configurator interface that displays existing BLDS records or create a new one. When a new BLDS is being created, the BLDS configurator displays the RLDS divided into the BLDS Name Bootstrap program and a bootstrap program for each of the Utilities Field Sector, the Subject Fields Sector, the Actor Fields Sector, the Display Control Fields Sector and the Payload Fields Sector, as depicted at 220. The developer copies the RLDS at 2007, gives the copy the name of the BLDS being created, and saves it in memory. The BLDS Configurator then displays the just named BLDS containing the five bootstrap programs at 223 through 227. At 2008 the developer clicks a bootstrap program, creates fields within the sector, names them, and stores them in memory. At 2009 the developer arranges the fields in right or left order to set their sequence, and configures each field for whether it is to allow multiple recursions within it as at 200. At 2010, if the field is to have only a single instance, the developer sets its maximum number of recursions at 206 to one ("1"), thereby making it so that there can be only one instance of the field within an ALDS record created from a copy of the BLDS. At 2011, if the field is to have multiple instances, the developer sets its maximum number of recursions to the desired number, thereby making it so that there can be up to that number of recursion instances within the field within an ALDS record created from a copy of the BLDS. At 2012, if the field is set to allow multiple recursions, the developer gives each recursion instance a name by which software objects can track them.

Figure 20C:
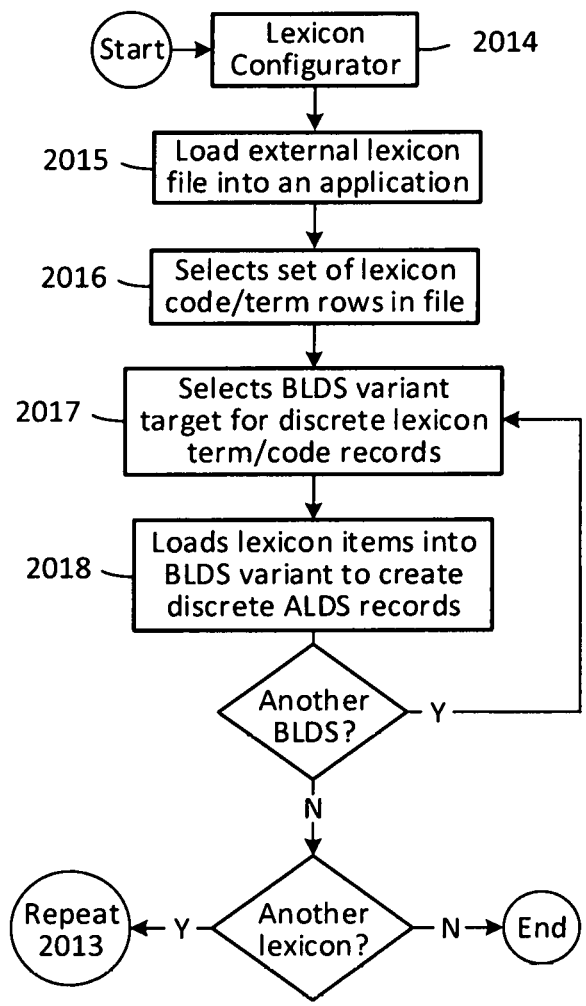
FIG. 20C is a process flow diagram of the lexical configurator used to load a lexicon into an application and create ALDS records from a BLDS.

FIG. 20C depicts the process to load an external lexicon file into a lexical application to create ALDS records. At 2014 there is the Lexicon Configurator interface that displays (1) an option to create a new lexicon, (2) a list of existing lexicons in the application, and (3) a container into which an external file is placed. At 2015 the developer puts an external file containing a lexicon into the interface and displays its contents. At 2016 the developer selects a set of records within the external file. At 2017 the developer selects the desired BLDS variant from which to create ALDS records for the selected lexicon code/term pairs. At 2018 the developer selects the option to create one ALDS record for each lexicon code/term pair record in the external file, whereupon the Lexicon Configurator displays the ALDS records in a panel alongside the corresponding code/term records in the external file. This process is repeated for each BLDS variant used in the lexicon. The process for all BLDS variants is repeated for all lexicons to operate within the application.

Figure 20D:
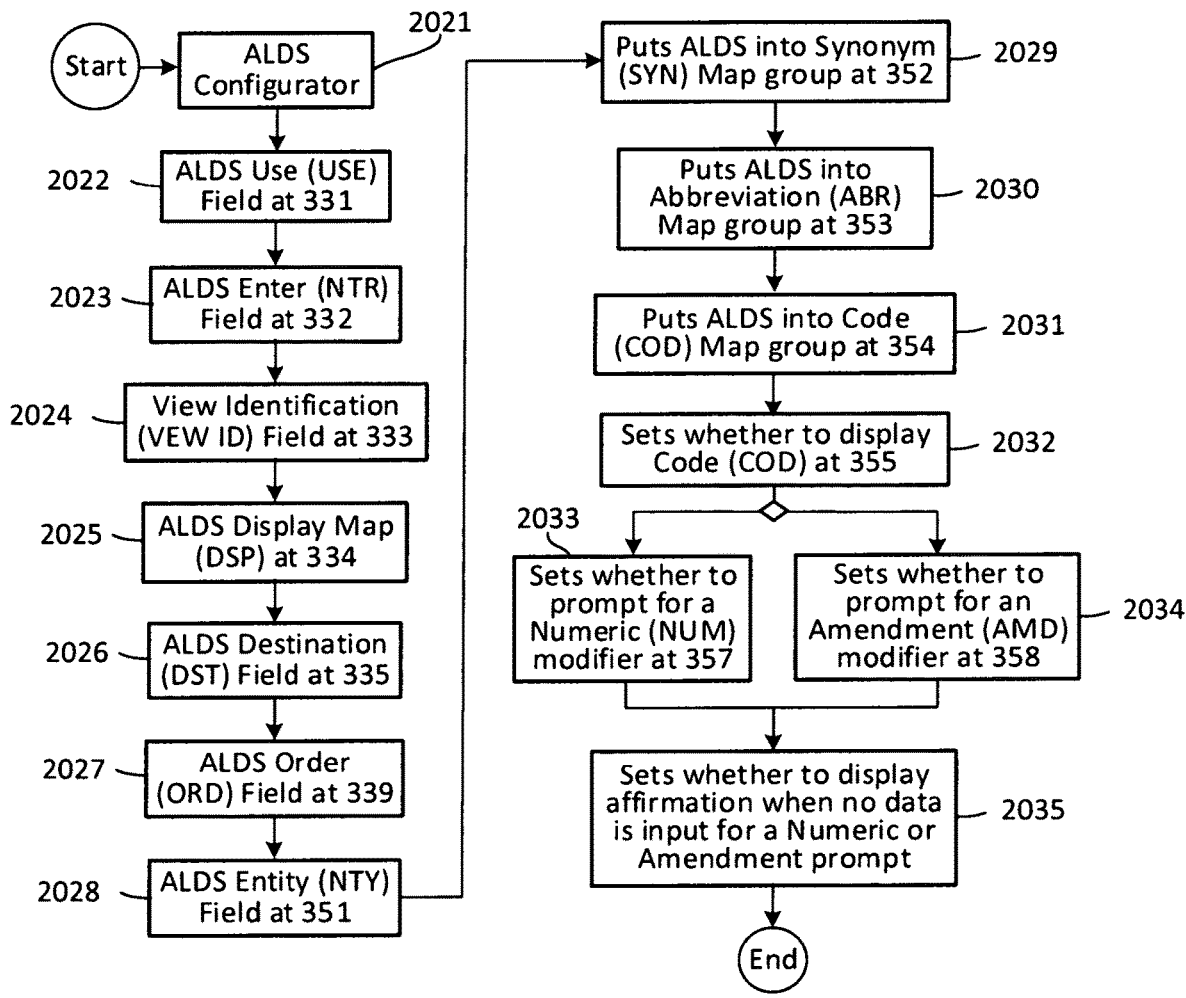
FIG. 20D is a process flow diagram of the lexical configurator used to configure particular ALDS fields.

FIG. 20D depicts the process of configuring individual fields in ALDS records, which can be done for a single ALDS record or for a group of selected ALDS records en masse. At 2021 there is the ALDS Configurator interface that displays (1) a list of ALDS records and (2) the option to select one or a plurality of ALDS records for the purpose of configuring fields within the record(s). Selected record(s) display as depicted at 300A and 300B, with the user able to set focus to (highlight) individual records. If multiple records are selected, there is a single display of the fields with the String Field at 356 empty. When a field is configured with multiple records selected, the configuration field applies to that field in all of selected records.

The ALDS Use Field at 331 is configured at 2022 with a value that defines the control in which the ALDS record's payload displays, as at 800, 840, 850, and 860. The ALDS Enter Field at 332 is configured at 2023 with a value that defines how the ALDS record is input into the system. The View Identification Field at 333 is configured at 2024 with a value that defines the Icon Control view in which the ALDS record's payload is input and displays. The ALDS Display Map Field is configured at 2025 with a value that defines the group of ALDS records with which it is to be displayed. The ALDS Destination Field at 335 is configured at 2026 with a value that defines whether the ALDS record's payload is to be displayed in a subsequent control, or is to be input. The ALDS Order Field at 339 is configured at 2027 with a value that defines the ordinal sequence in which the ALDS record's payload is displayed in a set of displayed list box rows, or, if the ALDS record's destination is a sequence of Base Controls, the order in which the ALDS record displays in a Base Control Command component. For example, if ten ALDS records return with a common ALDS Display Map value at 334 to display in a list box, the record with "001" in this field displays at the top of the List Box Control, the record with "002" second to the top, and so on. The ALDS Entity Field at 351 is configured at 2028 with a value that defines the logical group to which the record belongs; the contents of this field are not displayed, they are for use by various software objects. For example, in a medical example an ALDS Entity Field may contain "MED" for medicine, "PRC" for procedure, "DX" for diagnosis, "RX" for prescription, and so on. The Synonym Map Field at 352 is configured at 2029 with a value that defines a group of ALDS records containing payloads that are synonyms to one another. The ALDS Configurator interface allows the developer to set a preferred synonym lexicon term payload to display by default if no preference is set for a particular user. The synonym payload displayed to an individual user is set at 2084. The Abbreviation Map Field at 353 is configured at 2030 with a value that defines a group of payloads that are the full length payload, a shorter payload, and so on to the smallest payload. The DisplayMgr object selects a particular payload based on the available display space at the moment of display. The Code Map Field at 354 is configured at 2031 with a unique map identifier to define other ALDS records containing codes that are related to its code payload. For example, the official SNOMED medical lexicon has about 1.4 million relationships between certain designated codes among its 311,000 codes. The Code Field at 355 is configured at 2032 with the value "Y" or "N" to define whether the ALDS record's payload is to be displayed along with the contents of the record's String Field at 356. The Numeric Field at 357 is configured at 2033 with the value "Y" or "N" to define whether upon input of its ALDS record to prompt the user to input a numerical qualifier to modify the payload. The Amendment Field at 358 is configured at 2034 with the value "Y" or "N" to define whether upon input of its ALDS record the system prompts the user to input a textual amendment to modify the payload. The value "Y" or "N" is configured at 2035 to define whether the fact of a non-answer (i.e., no input) to a Numeric or Amendment prompt is to display an explicit affirmation that it was not input. For example, in a medical example when a doctor does not input a number of ulcer samples taken during a colonoscopy exam, if the ALDS record for the payload "Ulcer samples" was so configured, it would display "0 ulcer samples".

Note, in the medical example illustrated at 1199, the Numeric Field in the ALDS record payload displayed in the Base Control Command component is not configured to display an explicit affirmation, and thus the affirmation that it was not input is not displayed as a list data item in the example view at 11100.

Figure 20E:
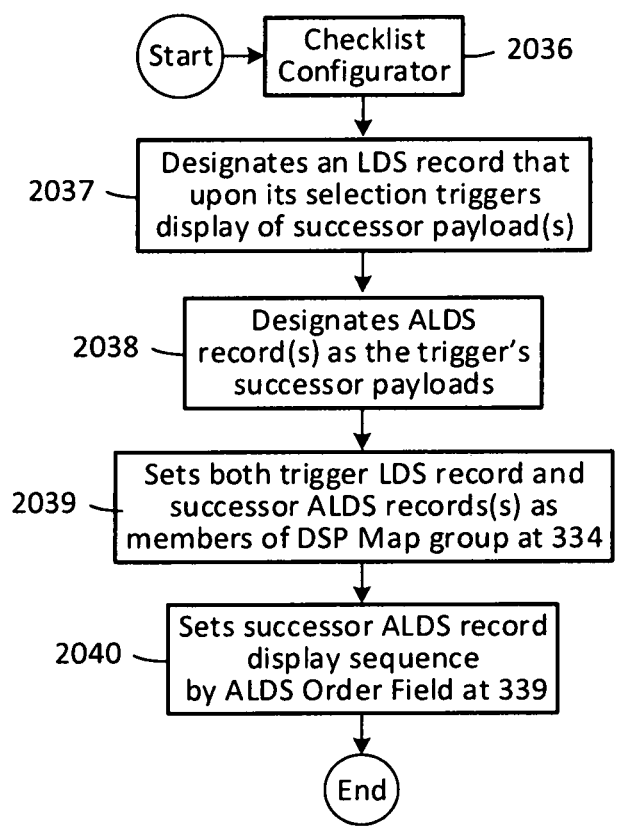
FIG. 20E is a process flow diagram of the lexical configurator used to set up display of a checklist of successor ALDS prompts upon input of an ALDS record.

FIG. 20E depicts the configuration of a particular ALDS payload to display successor ALDS payload(s) upon display of the trigger payload, as in the examples at 1130, 1150, 1160, 1172, 1176, 1180, 1194, 1410, 1430 and 1835. There is the Checklist Configurator interface at 2036 that displays one or a plurality of ALDS records for selection, (2) the option to select one or a set of ALDS records and specify it to be the trigger record at 2037, (3) the option to select ALDS payloads(s) to be displayed upon display of the trigger payload at 2038, (4) an option to assign a unique ALDS Display Map value to the trigger and successor record(s) at 2039, as at 334, and (5) an option to specify the sequence of display of successor payloads when there is a plurality of them by input of a number into the record's ALDS Order Field at 2040, as at 339. For example, input into the ALDS Order Field is the value "XXXT" for the trigger ALDS record, and the values for the successor ALDS records are "XXXS1", "XXXS2", "XXXS3" and so on.

Note, configuring an ALDS record to display a successor control is inherited by the ILDS record upon the record's input, as at 1730.

Figure 20F:
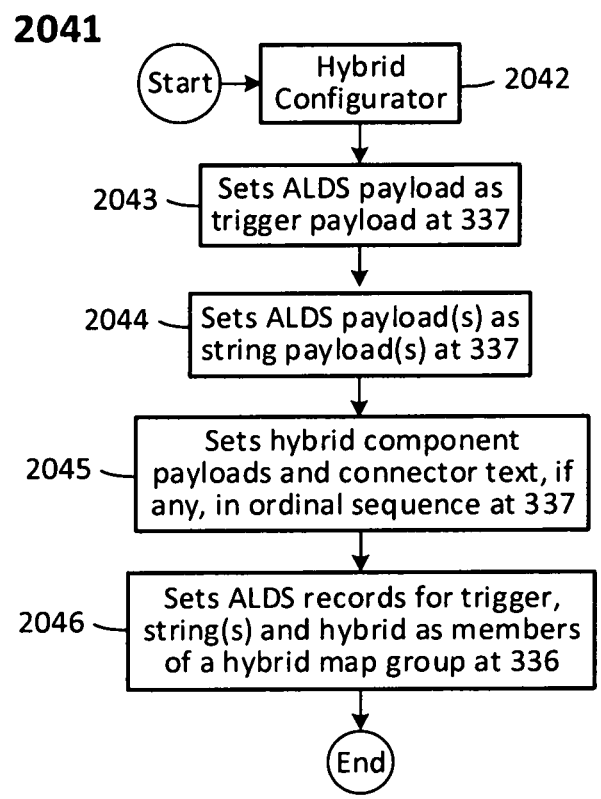
FIG. 20F is a process flow diagram of the lexical configurator used to set up dynamic formation and display of a hybrid natural language-like ALDS payload.

FIG. 20F depicts the configuration of a hybrid ALDS payload based upon one or a plurality of non-hybrid payloads, and a connector text string specific to the hybrid payload, if any. At 2042 there is the Hybrid Configurator interface that displays (1) a list of ALDS records, (2) the option to select an ALDS record and designate its payload as a trigger to forming a hybrid payload, (3) the option to select an ALDS record and designate its payload as a string payload, (4) the option to complete a hybrid payload with a string of connective text, if any, and (5) the option to deploy a completed hybrid payload into production.

The developer at 2043 selects a payload to trigger the formation and whether to display it as part of the hybrid payload. The developer at 2044 selects a payload to be a text strings to display in the hybrid payload; other payload(s) in the set of payloads of which the string payload is a member will display depending on the selection made by a user. The developer at 2045 sets the hybrid payload by putting the set string payload into the desired ordinal position and inputting desired connected text into the hybrid payload, if any; again, other payload(s) in the set of payloads of which the string payload is a member will display depending on the selection made by a user. The developer at 2046 places ALDS records containing the trigger payload, string payload(s) and hybrid payload in an ALDS Hybrid Map group with a unique value at 336.

Figure 20G:
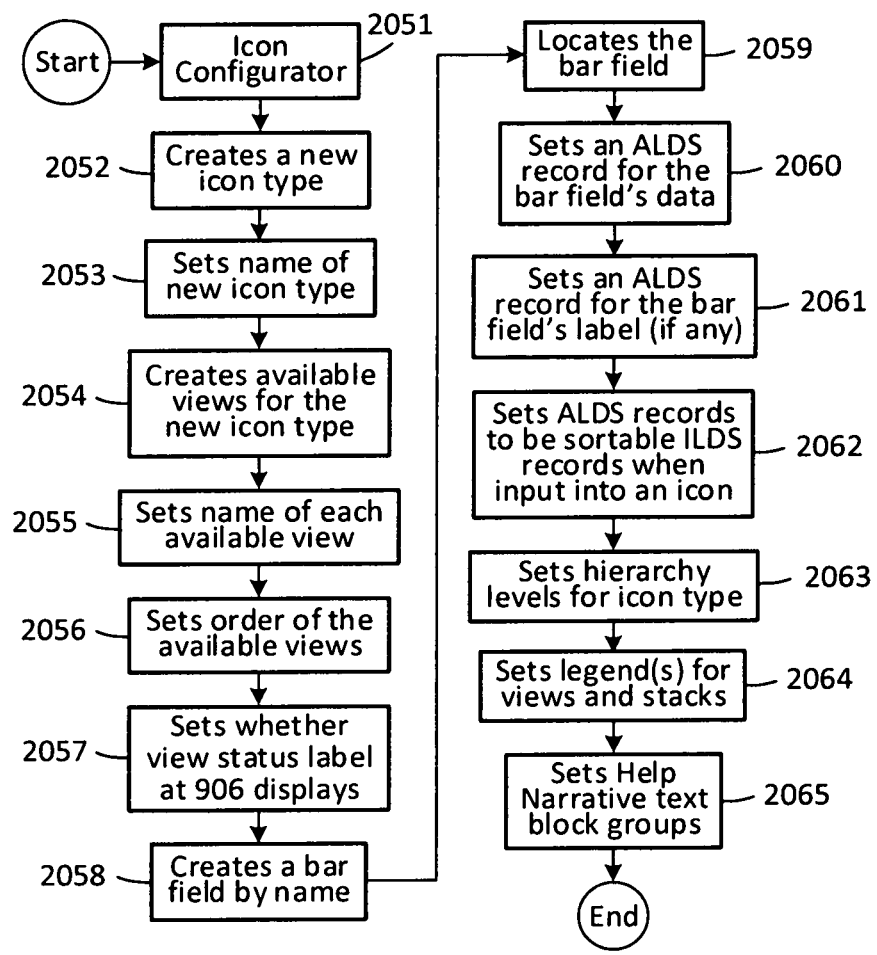
FIG. 20G is a process flow diagram of the lexical configurator used to set up an icon type.

FIG. 20G depicts the configuration of an icon type. At 2051 there is the Icon Configurator interface that displays (1) a list of existing icons types, (2) the option to select and display an existing icon type, (3) the option to create a new icon type, (4) the option to create view panels for the icon type and place them in ordinal sequence, (5) the option to create bar fields for the icon type, (6) the option to set data items in the icon type as sortable for display, (7) the option to set the icon type in the application icon hierarchy, (8) the option to set legends for the icon type, and (9) the option to set Help Narrative text block groups for a particular screen control, icon type or data state.

The developer at 2052 selects the option to create a new icon type, whereupon the interface displays a blank icon, as at 900. At 2053, the developer inputs a name for the new icon type into the "Icon Name" field at the center of the top icon bar, and saves it to memory.

The developer at 2054 creates a view panel to be available in the icon type, and at 2055 inputs a view name for each into the View Menu control, as at 1003, whereupon the selected view displays in the View Name tab at the top center of the view panel at 905. The developer at 2056 sets the display order of the views in the View Menu. At 2057 the developer sets whether to display a View Status tab at 906 at the bottom center of a particular view panel.

The developer at 2058 creates a bar field and gives it a name to display as its field label.

Note, if no label is put on the bar field, its name still exists within the InputMgr object. At 2059, the developer places the field at a location on the upper or lower bar as at 910.

The developer at 2060 connects the desired ALDS record with an empty payload at 913 to receive data input into the data component of the bar field. The developer at 2061 connects a second ALDS record at 914 to the bar field to display its payload as the bar field's label, if any.

The developer at 2062 sets in the DisplayMgr object particular bar fields and view data items to be used as icon sort criteria at 1403, and as depicted in the workforce management example at 1410.

The developer at 2063 sets the icon type within a hierarchy of related icon types in the application. Each hierarchy is manifested as a number to indicate its level, where number "1" is the top level in the hierarchy, "2" is the second highest level, and so on. In a staffing example at 1710, the Career Icon is at level "1" and the Job Icon within a Career Icon is at level "2", and the Assignment Icon within a Job Icon are at level "3". Thus, when the Career Icon is double-clicked, the Job Icons at level "2" within it display, and when a Job Icon is double-clicked, the Assignment Icons within it display, if any. Display of icons that are contained within an icon (i.e., below it in the icon hierarchy) is depicted at 940. A plurality of icons can be set at the same level. For example, the Education & Training Icon is set at level "1" so that it displays paired with the Career Icon, and the Degree & Certification Icon is set at level "2" to display upon double-clicking the Education and Training Icon at level "1", as illustrated in the staffing example at 1710.

The developer at 2064 sets particular legends to display. A legend can be set to display within an icon based upon the presence of a particular ILDS record, as at 1416, or upon the display of a particular icon type, as at 1827 and 1828. A legend can be set to display beneath a group of icons upon the display of one or a plurality of particular types, as at 1417.

The developer at 2065 sets a particular set of Help Narrative text blocks to be present for general use or upon the presence of a particular data state, as at 1211, for example when no icons are displayed, when a view data item has just been input, when the user has just set focus to a bar field (highlighted it), etc., or upon display of one or a plurality of icon or display of a particular view, as at 1221.

Figure 20H:
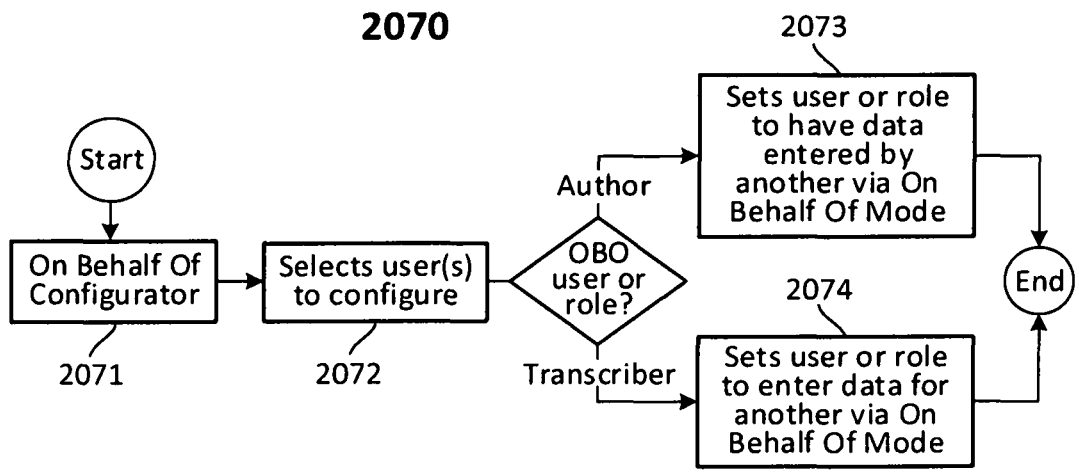
FIG. 20H is a process flow diagram of the lexical configurator used to set up users for On Behalf Of Mode.

FIG. 20H depicts the configuration of the On Behalf Of special operating mode for particular users. There is the On Behalf Of Configurator interface at 2071 that displays (1) a list of users with the option to define one or a plurality of them as authors, as in the medical example at 1610, and (2) a list of users with the option to define one or a plurality of them as transcriber, as in the medical example at 1615. The developer at 2072 selects one or a plurality of users for whom to configure a setting, and at 2073 inserts the user(s) into a group defined as users in the role of author on whose behalf data is to be input, or at 2074 inserts the user(s) into a group defined as users in the role of transcriber to input data on behalf of designated authors. Designation is made for a particular set of transcribers to input data on behalf of a particular set of authors.

Figure 20I:
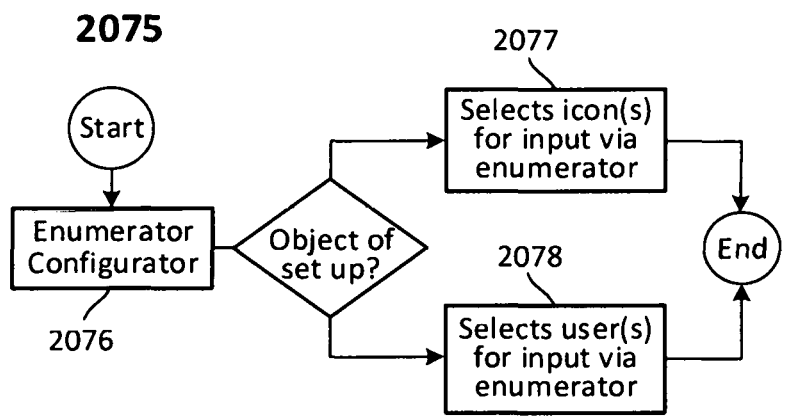
FIG. 20I is a process flow diagram of the lexical configurator used to set up input by the Enumerator in lieu of by payload.

FIG. 20I depicts the configuration of the Enumerator special operate mode for particular Icon Control views. There is at 2076 the Enumerator Configurator interface that displays (1) a list of icon types in an application with a list of views within each icon type, (2) a list of users, and (3) the option to set an icon type or a view within a particular icon type to display enumeration numbers on list boxes to input data items into it. The developer at 2077 sets an icon type, and view(s) within the icon type, to display data item input options with numbers adjacent to a list box command row and term row, as at 11105. The developer at 2078 selects one or a plurality of users to display enumerated numbers when a particular list box displays data items for potential input.

Figure 20J:
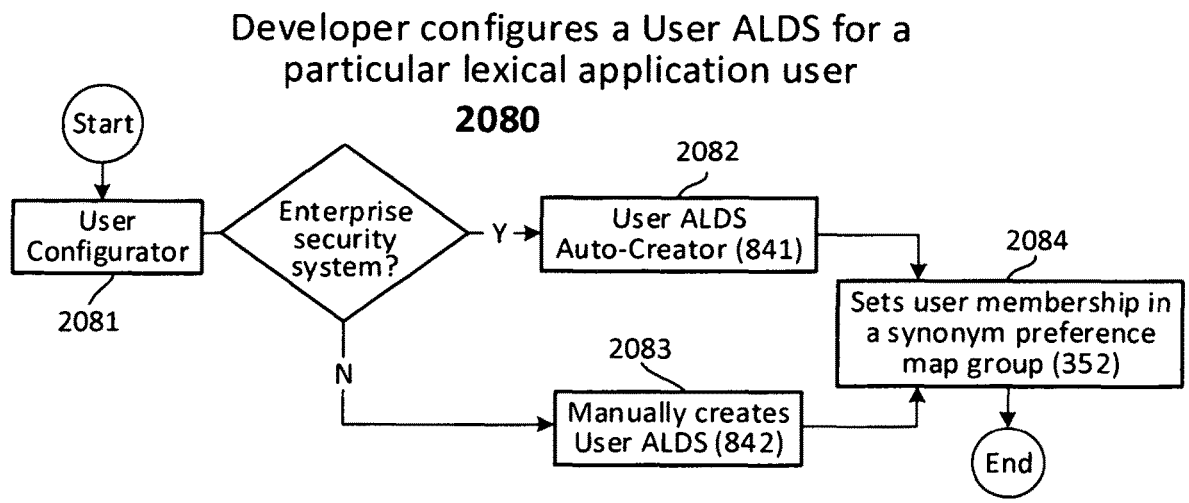
FIG. 20J is a process flow diagram of the lexical configurator used to set up a user for security access and for payload synonyms.

FIG. 20J depicts the configuration of security functions for application users. There is at 2081 the User Configurator that displays (1) a list of all User ALDS records for application users at 844, (2) the option to create new User ALDS records at 2082 from the enterprise security system at 841, (3) the option at 2083 to manually create a User ALDS record at 842, (4) the option at 2084 to display a list of ALDS records in a Synonym Map group, and the option to place a particular user's User ALDS record into a particular Synonym Map group at 352.

Figure 20K:
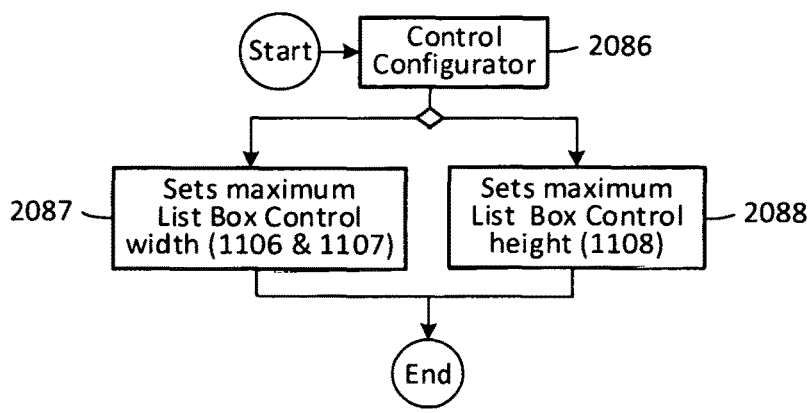
FIG. 20K is a process flow diagram of the lexical configurator used to set parameters of the List Box Control.

FIG. 20K depicts the configuration of List Box Control properties. There is at 2086 the Control Configurator that displays (1) the List Box Control as at 1104 but with the List Box Command row empty and the List Box Term rows empty, (2) the option at 2087 to set the maximum width of the List Box Control, and (3) the option at 2088 to set the maximum height of the List Box Control.

Figure 20L:
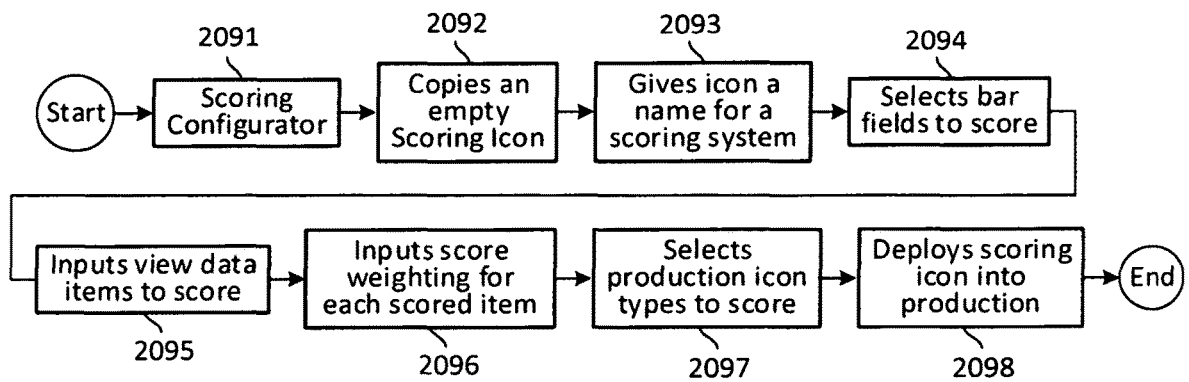
FIG. 20L is a process flow diagram of the lexical configurator used to set up and deploy a Scoring Icon.

FIG. 20L depicts the creation, configuration and deployment of a Scoring Icon containing a scoring system for a particular set of production icons. There is at 2091 the Scoring Configurator that displays (1) a list of production icon types, (2) the option to select a particular production icon type, (3) the option to create a new Scoring Icon, give it a name, and store it in memory, (4) the option to place bar fields on a new Scoring Icon, (5) the option input date items as scoring criteria into a view within a new Scoring Icon, (6) the option to create and name a plurality of views within a Scoring Icon, (7) the option to input a score weighting on each input scoring criterion, (8) the option to populate a Scoring Icon with data from selected production icon type(s), (9) the option to generate from the selected production icons Scoring Icons that contain scores based upon the evaluation of the data in the production icons criteria against the criteria are scored based upon the ILDS records input into Scoring Icon view(s) as scoring criteria, and (9) the option to display a list of existing Scoring Icons.

The developer at 2092 copies an empty Scoring Icon, as shown in the staffing example at 1720. The developer at 2093 gives the Scoring Icon a name to identify it to the application for tracking purposes; this name is not displayed on the icon, it is displayed only in the list of existing Scoring Icons. The developer at 2094 places fields onto the Scoring Icon's bars, as at 1726 and 1727. The developer at 2095 inputs ILDS records into Scoring Icon view(s) for use as scoring criteria, as shown at 1730. The developer at 2096 inputs weighting for input scoring criteria data items, as shown at 1730. The developer at 2097 selects a group of production icons to score using the Scoring Icon as shown at 1753 and 1754. The developer at 2098 deploys the Scoring Icon at 1755 to automatically score each selected production icon at 1756 by evaluating the ILDS records input as scoring criteria against the corresponding data items in the production icons.

Note, bar fields for start date and end date must be present in production icons for a Scoring Icon to evaluate them using a scoring criterion that measures time, as at the staffing example at 1745.

Figure 20M:
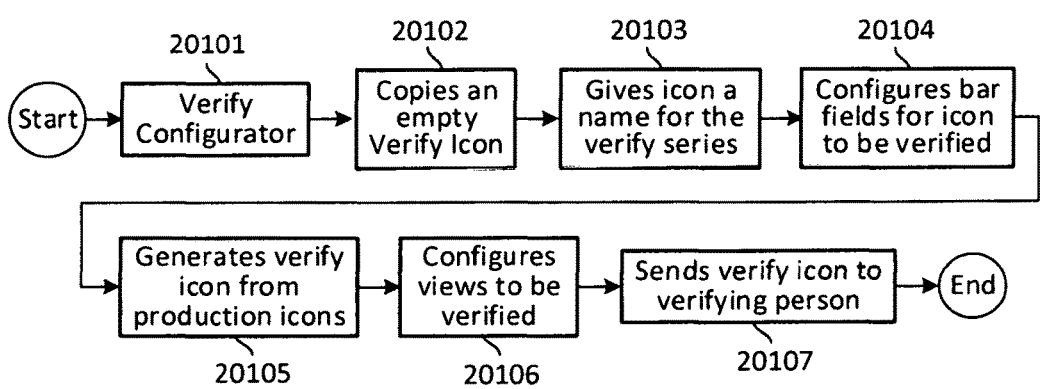
FIG. 20M is a process flow diagram of the lexical configurator used to set up and deploy a Verify Icon.

FIG. 20M depicts the creation, configuration and deployment of a Verify Icon for a particular set of production icons. There is at 20101 the Verify Configurator that displays (1) a list of production icon types, (2) the option to select a particular production icon type, (3) the option to create a new Verify Icon, give it a name, and store it in memory, (4) the option to place question marks ("?") on data items so as to request confirmation of the data items, (5) the option to save a new Verify Icon for deployment, (6) the option to generate from the selected production icons Verify Icons that contain production data along with the input question marks ("?") adjacent to the data items, (7) the option to request that a verifying user confirm the requested data items in the Verify Icon, (8) the option for the verifying user to place a check mark ("√") to confirm a data item or place an ex-mark ("X") on a data item to dispute it, (9) the option to display a list of Verify Icons in the In Preparation state, and (10) the option to display a list of Verify Icons in any state, In Preparation at 1929, Verify at 1948, Verified at 1858 and Disputed at 1964.

The developer at 20102 copies an empty Verify Icon type such as the Verify Job Icon at 1920. The developer at 20103 gives the Verify Job Icon a name to describe the particular series of production icons that is to be verified; this name is not displayed on the icon, it is displayed only in the list of existing Scoring Icons. The developer at 20104 makes desired changes, if any, to bar fields in the Verify Icon series by adding, deleting or relabeling bar fields as desired, as at 1922 through 1925, and places question marks ("?") adjacent to bar fields to be verified, as at 1928 and 1929, and adjacent to the View Name tab(s) of the views to be verified, as at 1930 and 1931. The developer at 20105 generates one Verify Icon for every person or entity with production icons of the icon type(s) selected for verification. Question marks ("?") are automatically placed adjacent to the bar fields and View Name tabs designated for verification, as selected at 20104. The developer at 20106 places a question mark ("?") adjacent to each view data item to be verified. The developer at 20107 issues the populated production icon(s) to the verifying person or organization, as illustrated in the staffing example at 1951.

Verify Icons are "issued" to verifying persons instead of emailed or otherwise sent to them because the verifying person must log into the lexical application as a user to input responses to the items requested for verification, as at 1950 and 1960.

Figure 20N:
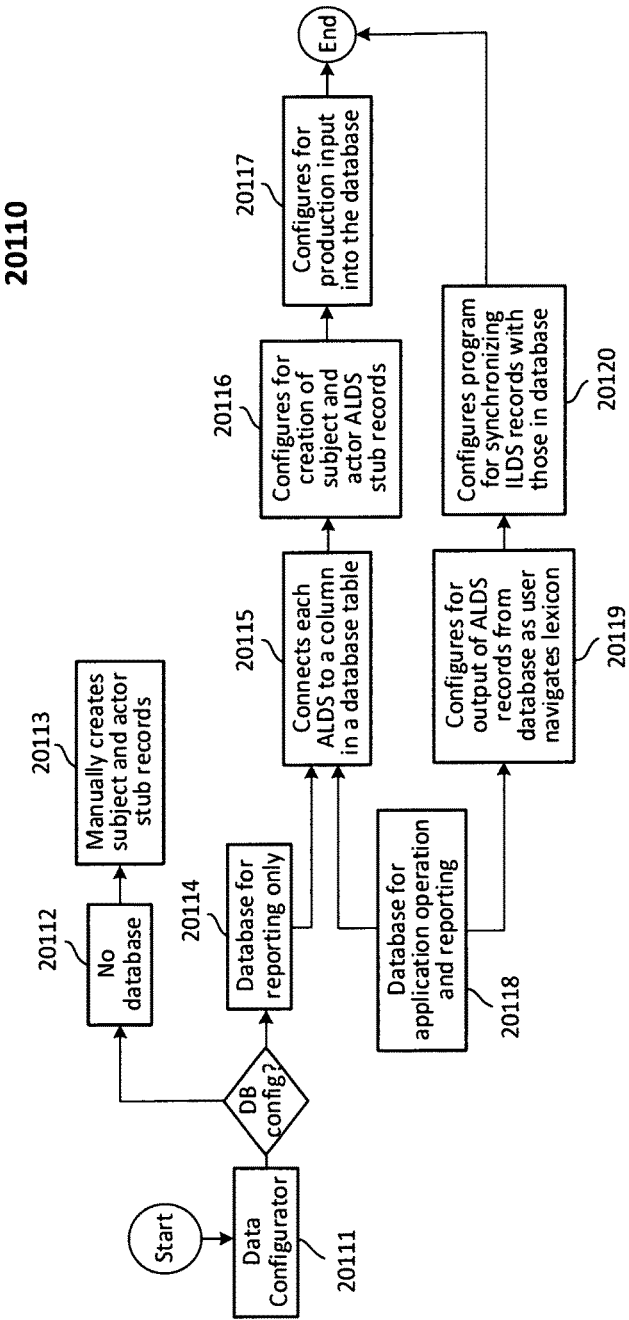
FIG. 20N is a process flow diagram of the lexical configurator used to set up interoperation with a database, if any, and to create stub records.

FIG. 20N depicts the configuration of interoperation of the application with a database, if any, and the creation of stub records. There is at 20111 the Data Configurator that displays (1) a list of all ALDS records in the application, (2) the option to select one or a plurality of databases for interoperation with the application, or to select no database interoperation, (3) the option to input and edit a database table name and column name for each non-control non-stub non-User ALDS record, (4) the option to set use of the database only for copying ILDS records to the database upon input and to copy stub records from mass storage into memory upon their creation, (5) the option to set use of the whether to store ALDS records in the database and copy them from mass storage into memory upon their requirement for display based upon user navigation through the computerized lexicon, and to copy ILDS records from memory into the database(s) upon input, and to copy stub records from mass storage into memory upon their creation, (6) the option copy subject and actor data from the database to automatically create stub records, (7) the option to manually create a stub record, and (8) the option to set the operation of the program to automatically synchronize LDS records in the connected database, if any, with LDS records in memory.

The developer at 20112 selects the option to operate the application with no database. At 20113 the developer creates a stub record for a subject or actor in memory, as at 601 and 602. At 20114 the developer selects the option for the application to interoperate with a designated database whereby ILDS records upon input are copied into mass storage, and ALDS stub records upon creation are copied into memory. At 20115 the developer connects each production ALDS record to a column in a database table. Production ALDS record is defined as a whole ALDS record as at 604, and does not include stub ALDS records, ALDS records with only a payload and no subject or actor data, as at 603, and ALDS records not for potential input and only for display in controls. At 20116 the developer configures the system to automatically generate a stub record upon the appearance of a new subject and actor record in the database, as at 601 and 602. At 20117 the developer sets the application to automatically copy upon input an ILDS record into its designated database column in a database table, as at 505. At 20118 the developer selects the option for the application to interoperate with a designated database whereby production ALDS records are copied into memory based upon the user's location in the lexicon, as at 513, along with copying ILDS upon input into mass storage, as at 511. At 20119 the developer sets the particular ALDS records to be copied into memory based upon the user's location within the lexicon hierarchy, as at 512. At 20220 the developer sets whether the synchronization program operates continuously or at specified time intervals. If the synchronization program is to operate at specified time intervals, the developer sets the frequency of them, and sets whether the system is to automatically create or delete ALDS records and ILDS records based upon identified mismatches between the application and the database, or is only to display mismatches in a report used to manually create and delete ALDS records and ILDS records.

The invention claimed is:

1. A method for configuring during development-time a plurality of unitary lexicon data structure records that together comprise a curated finite set of discrete information items to form a structured hierarchical lexicon, and storing the unitary lexicon data structure records on a non-transitory computer-readable medium including the instructions stored thereon for operating a lexical software application during a run-time usage session, comprising the steps of:
   a) storing a plurality of records laid out in a uniform format, the boundaries of each record demarcated by a record beginning marker and a successive record end marker;
   b) defining a plurality of data field definition blocks within each record arranged in a format that is uniform among the plurality of records, the boundaries of each data field definition block demarcated by a data field beginning marker and a successive data field end marker forming a block of text character positions within each data field definition block;
   c) assigning a property to each data field definition block defining whether the data field definition block stores a fixed number of text character positions or a variable number of text character positions;
   d) assigning a property to each data field definition block defining whether the record stores multiple instances of the data field definition block or only a single instance of the data field definition block within the record;
   e) inputting a lexicon term text string into a lexicon term display payload data field of each record that is unique among lexicon term display payload text strings held in the plurality of records; and
   f) operating the lexical software application during the run-time usage session without a relational database management system.

2. The method of claim 1, including storing a utility control text string in each of a plurality of data fields defining how each record is used during the run-time usage session, comprising the steps of:
   a) inputting a name of a lexical software application product in which the lexicon term display payload data field of the record is displayed;
   b) inputting a security code defining a user clearance level required to display the lexicon term display payload data field of the record;
   c) inputting a software development stage code defining a software development stage required to display the lexicon term display payload data field of the record; and
   d) inputting a name of the structured hierarchical lexicon to which the record belongs.

3. The method of claim 1, including storing a subject text string of null characters as a placeholder in each data field definition block defining the subject of a record during the run-time usage session, comprising the steps of:
   a) inputting first null placeholder characters in the data field definition block for the name of a person or thing that is a subject;
   b) inputting second null placeholder characters in the data field definition block for the name of a position or role of the person or thing that is the subject;
   c) inputting third null placeholder characters in the data field definition block for the name of an organization unit of the person or thing that is the subject;
   d) inputting fourth null placeholder characters in the data field definition block defining a purpose of the record; and
   e) inputting fifth null placeholder characters in the data field definition block in which the lexical software application automatically inputs the day and time the record was input into a data view polygon.

4. The method of claim 1, including storing an actor text string of null characters as a placeholder in each data field definition block defining an actor acting upon a subject of the record during the run-time usage session, comprising the steps of:
   a) inputting first null placeholder characters in the data field definition block for a name of a person or thing that is the actor; and
   b) inputting second null placeholder characters into the data field definition block for a name of a position or role of the actor.

5. The method of claim 1, including storing a display control text string in each data field definition block controlling the display of a display payload held by the record during the run-time usage session, comprising the steps of:
   a) inputting a use code defining a particular screen control type in which the display payload is to be displayed;
   b) inputting an entry mode code defining whether the display payload is to be input by a user, or is to be input by an external device, or is to be input by a computer;
   c) inputting a name of a particular data view polygon that displays as a field name defining a category of payloads the data view polygon accepts and displays as input;
   d) inputting a display group mapping code defining a particular group of other payloads with which the display payload simultaneously displays;
   e) inputting a destination code defining whether user selection of the display payload is to display a successor screen control or is to input the display payload into a persistent record held within a data icon;
   f) inputting a hybrid mapping code defining a particular group in which the display payload is one text string component among a plurality of text string component payloads of other records that are combined to build a hybrid natural language text string for display;
   g) inputting an ordinal number defining a sequential order position in which each text string component payload is to be displayed within a natural language text string as a component among the plurality of text string component payloads of other records also displayed within the hybrid natural language text string;
   h) inputting a successor mapping code defining that upon user selection of the payload a particular set of successor payloads display for potential selection; and
   i) inputting a display mode code defining whether the display payload upon input into a data view icon displays as a row in a list or as a graphical shape.

6. The method of claim 1, including storing a payload control text string in each data field definition block controlling the display of the lexicon term display payload data field of the record, comprising the steps of:
   a) inputting an entity code defining an entity type category of the payload control text string;
   b) inputting a synonym mapping code that maps the payload control text string to payloads of one or more other records that are synonyms of the payload control text string;
   c) inputting an abbreviation mapping code that maps the payload control text string to the payloads of the one or more other records that are abbreviations of the payload control text string;
   d) inputting a structured hierarchical lexicon mapping code that links the payload control text string to the payloads of the one or more other records to relate the payload control text string to the payloads of the one or more other records;
   e) inputting a lexicon code defining a position of the payload control text string within a structured hierarchy of a particular lexicon to which the record belongs;
   f) assigning a property defining a type of number that is input by a user upon the user inputting a lexicon term display payload into a data icon, comprising:
      i) inputting a quantity number type, or
      ii) a percentage number type, and
   g) inputting a particular list of amendment text strings, each a potential payload, displayed for potential input by the user inputting the lexicon term display payload into the data icon.

\* \* \* \* \*